United States Patent
Zhang et al.

(10) Patent No.: US 12,392,940 B2
(45) Date of Patent: Aug. 19, 2025

(54) COATING COMPOSITION AND PLANARIZATION OF HIGH REFRACTIVE INDEX OVERCOAT ON GRATINGS

(71) Applicant: Meta Platforms Technologies, LLC, Menlo Park, CA (US)

(72) Inventors: Keren Zhang, Kirkland, WA (US); Ankit Vora, Bothell, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 682 days.

(21) Appl. No.: 17/327,060

(22) Filed: May 21, 2021

(65) Prior Publication Data
US 2022/0373725 A1    Nov. 24, 2022

(51) Int. Cl.
*G02B 5/18* (2006.01)
*B05D 7/00* (2006.01)
*G02B 27/42* (2006.01)

(52) U.S. Cl.
CPC ........... *G02B 5/1809* (2013.01); *B05D 7/546* (2013.01); *G02B 27/4205* (2013.01); *G02B 2207/101* (2013.01)

(58) Field of Classification Search
CPC .. G02B 5/1809; G02B 5/1819; G02B 5/1842; G02B 5/1871; G02B 27/4205; G02B 27/0172; G02B 2207/101; G02B 1/04; G02B 2005/1804; B05D 7/546
See application file for complete search history.

(56) References Cited

U.S. PATENT DOCUMENTS

| | | | | |
|---|---|---|---|---|
| 5,082,629 A | * | 1/1992 | Burgess, Jr. | G01N 21/552 385/12 |
| 12,104,784 B2 | * | 10/2024 | Nishikawa | G02B 5/0808 |
| 2003/0068657 A1 | * | 4/2003 | Lin | G02B 5/008 506/14 |
| 2006/0262250 A1 | * | 11/2006 | Hobbs | G02B 5/3058 349/96 |
| 2007/0053030 A1 | * | 3/2007 | Hoshino | G02B 5/0252 359/15 |

(Continued)

OTHER PUBLICATIONS

International Search report and Written Opinion for International Application No. PCT/US2022/029976, mailed Sep. 30, 2022, 10 pages.

(Continued)

*Primary Examiner* — Ricky L Mack
*Assistant Examiner* — Anna Smith
(74) *Attorney, Agent, or Firm* — Greenberg Traurig, LLP

(57) ABSTRACT

An optical device includes an overcoat layer on a surface-relief grating. The overcoat layer is formed by a process including: depositing a layer of a first resin material that is curable by heat or electromagnetic radiation on a surface-relief grating that includes a plurality of grating ridges and a plurality of grating grooves to at least partially fill the plurality of grating grooves, curing the layer of the first resin material, depositing a layer of a second resin material that is curable by heat or electromagnetic radiation and has a higher flowability than the first resin material on the layer of the first resin material, annealing the layer of the second resin material to allow the second resin material to flow and form a planar top surface, and curing the layer of the second resin material.

8 Claims, 19 Drawing Sheets

(56) References Cited

U.S. PATENT DOCUMENTS

| | | | | |
|---|---|---|---|---|
| 2012/0127547 A1* | 5/2012 | Gocho | ................ | G02B 5/0284 |
| | | | | 359/2 |
| 2014/0314374 A1* | 10/2014 | Fattal | .................... | G02B 6/124 |
| | | | | 385/33 |
| 2019/0227316 A1* | 7/2019 | Lee | ...................... | G02B 6/0016 |
| 2020/0209483 A1 | 7/2020 | Mohanty | | |
| 2020/0213579 A1 | 7/2020 | Mohanty | | |
| 2020/0301051 A1* | 9/2020 | Josell | .................. | G02B 5/1857 |
| 2024/0418928 A1* | 12/2024 | Traub | .................. | G02B 6/0065 |

OTHER PUBLICATIONS

Park S., et al., "Optimization of Saw-Tooth Surface Planarization for Ultra-Low Blaze Angle Gratings for ALS-U," SPIE Proceedings [Proceedings of SPIE ISSN 0277-786X], vol. 11491, Aug. 21, 2020, 10 pages.

Pradana A., et al., "Tailoring the Refractive Index of Nanoimprint Resist by Blending With TiO2 Nanoparticles," Optical Materials Express, Jan. 24, 2014, vol. 4, No. 2, 9 pages.

\* cited by examiner

COATING COMPOSITION AND PLANARIZATION OF HIGH REFRACTIVE INDEX OVERCOAT ON GRATINGS

BACKGROUND

An artificial reality system, such as a head-mounted display (HMD) or heads-up display (HUD) system, generally includes a near-eye display (e.g., in the form of a headset or a pair of glasses) configured to present content to a user via an electronic or optic display within, for example, about 10-20 mm in front of the user's eyes. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through).

One example of an optical see-through AR system may use a waveguide-based optical display, where light of projected images may be coupled into a waveguide (e.g., a transparent substrate), propagate within the waveguide, and be coupled out of the waveguide at different locations. In some implementations, the light of the projected images may be coupled into or out of the waveguide using diffractive optical elements, such as surface-relief gratings or volume Bragg gratings. Light from the surrounding environment may pass through a see-through region of the waveguide and reach the user's eyes as well.

SUMMARY

This disclosure relates generally to surface-relief gratings. More specifically, disclosed herein are techniques for planarizing a high refractive index overcoat layer on a surface-relief grating and controlling the thickness of the overcoat layer on top of the surface-relief grating. Various inventive embodiments are described herein, including devices, systems, methods, processes, materials, compositions, and the like.

According to certain embodiments, a method may include depositing a layer of a first resin material that is curable by heat or electromagnetic radiation on a surface-relief grating that includes a plurality of grating ridges and a plurality of grating grooves to at least partially fill the plurality of grating grooves, curing the layer of the first resin material, depositing a layer of a second resin material that is curable by heat or electromagnetic radiation and has a higher flowability than the first resin material on the layer of the first resin material, annealing the layer of the second resin material to allow the second resin material to flow and form a planar top surface, and curing the layer of the second resin material.

In some embodiments, the first resin material may be characterized by a first refractive index greater than about 1.8 for visible light, and the second resin material may be characterized by a second refractive index within a range from about 1.5 to about 1.7 for visible light. In some embodiments, the first resin material may include a first base resin, nanoparticles, and a first solvent, whereas the second resin material may include a second base resin and a second solvent. In some embodiments, each of the first base resin and the second base resin may include an actinic light curable moiety including acrylate, epoxide, vinyl, thiols, allyls, vinylether, allylethers, epoxyacrylates, urethane acrylates, polyester acrylates, or a combination thereof. In some embodiments, each of the first solvent and the second solvent may include propylene glycol methyl ether acetate (PGMEA), dipropylene glycol methyl ether, or both.

In some embodiments, the first base resin may include an acrylate resin characterized by a refractive index equal to or greater than about 1.7, and a photo radical or thermal radical generator, whereas the nanoparticles may include nanoparticles of titanium oxide, zirconium oxide, hafnium oxide, tungsten oxide, zinc tellurium, gallium phosphide, or a combination thereof, and may include acrylate and non-functional ligand decoration. In some embodiments, the first base resin may include an epoxy resin having a refractive index between about 1.6 and about 1.8, and a photo acid or thermal acid generator, whereas the nanoparticles may include nanoparticles of titanium oxide, zirconium oxide, hafnium oxide, tungsten oxide, zinc tellurium, gallium phosphide, or a combination thereof, and may include epoxy and non-functional ligand decoration. In some embodiments, the second base resin may include an epoxy resin having a refractive index greater than about 1.5 and a photo acid generator, or may include an acrylate resin having a refractive index greater than about 1.5 and a photo radical generator. The nanoparticles may be characterized by a linear dimension greater than about 10 nm.

In some embodiments, curing the layer of the first resin material or the layer of the second resin material may include curing the layer of the first resin material or the layer of the second resin material using ultraviolet light. In some embodiments, depositing the layer of the first resin material on the surface-relief grating may include spin-coating the layer of the first resin material on the surface-relief grating, or dispensing a plurality of drops of the first resin material on the surface-relief grating.

In some embodiments, the plurality of grating grooves may be characterized by at least one of a non-uniform depth, a non-uniform pitch, a non-uniform width, or a non-uniform slant angle. Depositing the layer of the first resin material on the surface-relief grating may include dispensing different amounts of the first resin material on two or more different regions of the surface-relief grating. In some embodiments, depositing the layer of the second resin material on the layer of the first resin material may include depositing an amount of the second resin material such that the a total thickness of the layer of the first resin material and the layer of the second resin material on top of the plurality of grating ridges is equal to or less than about 50 nm.

According to certain embodiments, an optical device may include a surface-relief grating including a plurality of ridges and a plurality of grooves, and an overcoat layer in the plurality of grooves and on top of the surface-relief grating. The overcoat layer may include a first overcoat material layer including a first resin material characterized by a first refractive index equal to or greater than about 1.8, and a second overcoat material layer on the first overcoat material layer and including a second resin material, where a surface peak-to-valley height of a top surface of the second overcoat material layer may be equal to or less than about 5 nm.

In some embodiments, a thickness of the overcoat layer on top of the plurality of ridges may be equal to or less than about 50 nm. In some embodiments, the second resin material may include an acrylate resin or an epoxy resin, and a second refractive index of the second resin material may be greater than about 1.5. In some embodiments, the first resin material may include a resin including acrylate or epoxy and characterized by a third refractive index greater than about 1.6, and nanoparticles crosslinked with or dispersed in the resin, where the nanoparticles may include titanium oxide, zirconium oxide, hafnium oxide, tungsten oxide, zinc tellurium, gallium phosphide, a derivative thereof, or a combination thereof. In some embodiments, the nanoparticles may be characterized by a linear dimension greater than about 10 nm and a fourth refractive index greater than the third refractive index of the resin. In some embodiments, a depth of the plurality of grooves may be greater than about 200 nm. In some embodiments, the plurality of grooves may be characterized by a non-uniform depth, a non-uniform pitch, a non-uniform width, a non-uniform slant angle, or a combination thereof.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

Figure 1:
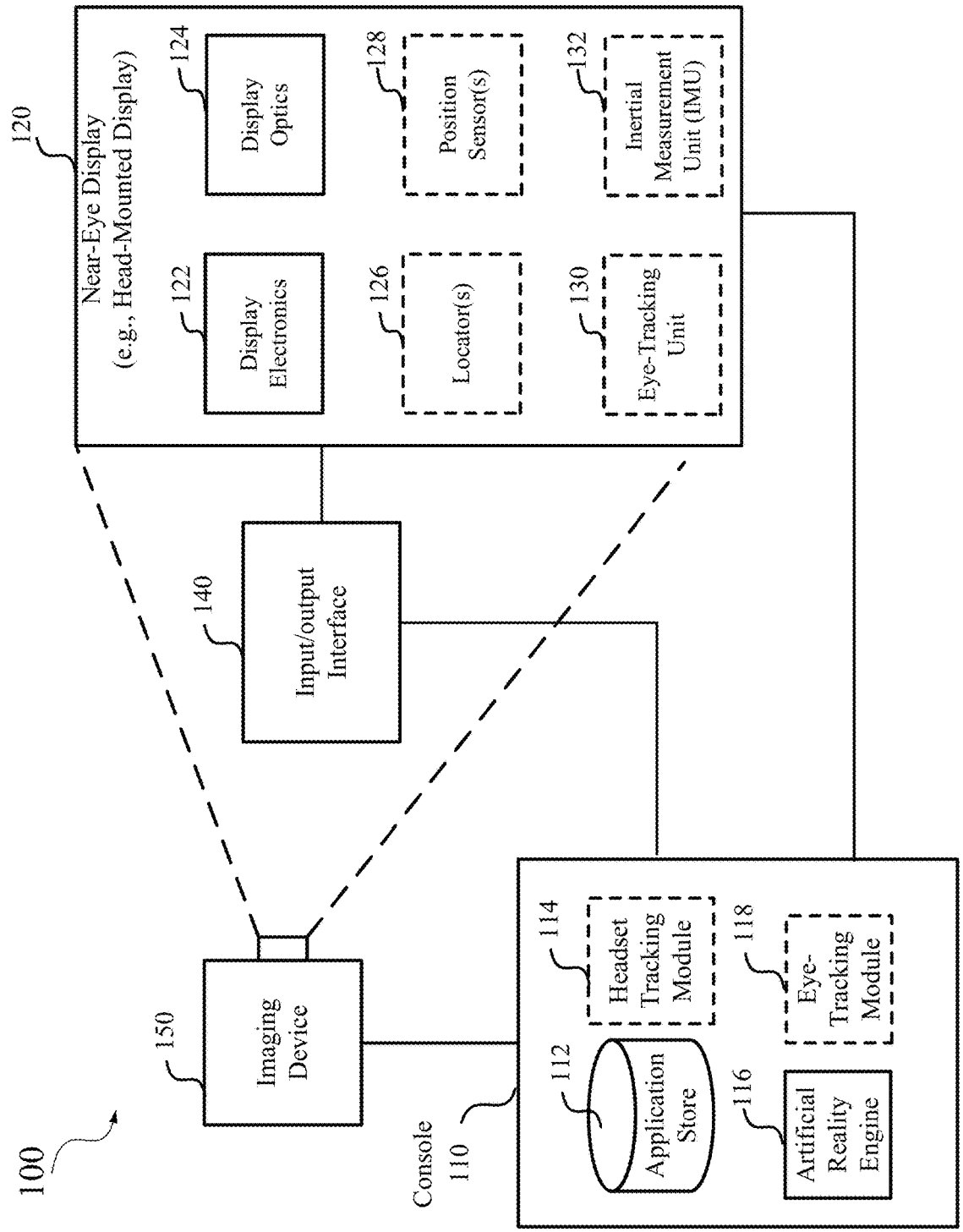
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to surface-relief gratings. More specifically, disclosed herein are techniques for planarizing a high refractive index overcoat layer on a surface-relief grating and controlling the thickness of the overcoat layer on top of the surface-relief grating. Various inventive embodiments are described herein, including devices, systems, methods, processes, materials, compositions, and the like.

Surface-relief structures, such as slanted surface-relief gratings, may be used in some optical devices to manipulate behavior of light. For example, slanted surface-relief gratings may be used in near-eye display systems to couple display light into or out of a waveguide. An overcoat layer having a refractive index different from the refractive index of the grating ridges of the surface-relief grating may be formed on the slanted surface-relief gratings to fill the grating grooves, protect the slanted structures, and adjust diffraction efficiency. In general, it is desirable to have a large refractive index contrast between the grating ridges and the overcoat layer to improve, for example, the light coupling efficiency, the field-of-view range, and the wavelength range of the near-eye display system. The overcoat layer may be formed on surface-relief gratings by, for example, spin-on techniques or other deposition techniques (e.g., inkjet technique). Spin-on techniques and other deposition techniques may offer a relatively low-cost and simple solution, but the top surface of the overcoat layer may not be planar because the deposited material may follow the topography of the underlying surface-relief grating, which may have varying grating parameters, such as periods, duty cycles, depths, slant angles, and the like. For example, the top surface of the overcoat layer at the grating groove regions may be lower than the top surface of the overcoat layer on the grating ridges.

The uneven surface of the overcoat layer may degrade the performance of the surface-relief grating, such as causing stray light, reducing the coupling efficiency, increasing display leakage, and the like. In many artificial reality applications, it may be desirable to precisely control the thickness and the surface roughness of the overcoat layer to improve the performance of the surface-relief grating and the display system. For example, it may be desirable that the thickness of the overburden of the overcoat layer (e.g., the portion of the overcoat layer above the grating ridges) is less than about 50 nm (e.g., less than about 40 nm, less than about 30 nm, or less than about 20 nm), and the surface peak-to-valley height is less than about 5 nm (e.g., less than about 4 nm, less than about 3 nm, less than about 2 nm, or less than about 1 nm). Some techniques, such as chemical mechanical polishing (CMP) techniques or etching techniques (e.g., slanted etching or gray scale etching), may be used to planarize the top surface of the overcoat layer on the surface-relief grating. However, the CMP techniques may not precisely control the thickness of the overcoat layer above the surface-relief grating (i.e., the overburden). In addition, CMP may not achieve desired results (e.g., the surface roughness) for hybrid overcoat materials that include organic materials mixed with nanoparticles (e.g., having a linear dimension about 10 to 15 nm, which is greater than the desired surface peak-to-valley height or surface roughness), and may increase the complexity and the cost. Etching techniques may not precisely control the thickness of the overburden either. In addition, the etching process may not properly etch hybrid overcoat materials that include organic materials mixed with nanoparticles. For example, nanoparticles and other residues may accumulate at the etched surface.

According to certain embodiments, a method of forming an overcoat layer having a planar top surface on a surface-relief grating may include depositing a layer of a first resin material on a surface-relief grating that includes a plurality of grating ridges and a plurality of grating grooves to at least partially fill the plurality of grating grooves; curing the layer of the first resin material by heat or electromagnetic radiation; depositing a layer of a second resin material (without nanoparticles, or with fewer and/or smaller nanoparticles) that has a higher flowability (and smaller grains) than the first resin material on the layer of the first resin material; annealing the layer of the second resin material to allow the second resin material to flow and form a planar top surface; and curing the layer of the second resin material by heat or electromagnetic radiation.

According to certain embodiments, the first resin material may be a high refractive index resin material that includes a base resin, nanoparticles with ligands decoration, and a solvent blend with one or more solvents. The base resin may be crosslinked or polymerized by heat or electromagnetic radiation (e.g., UV light curing). In some embodiments, the base resin may include, for example, a high refractive index resin (e.g., an acrylate or epoxy resin), a crosslinker, a surface cure modifier, a fluorinated additive, a photo-initiator, or a combination thereof. The high refractive index resin may have a refractive index between about 1.6 and about 1.8, such as about 1.7. The type and/or number of nanoparticles that have high refractive indices in the first resin material may be selected to tune the index of first resin material to, for example, greater than about 1.8 or greater than about 1.9. When the first resin material include more nanoparticles, the refractive index of the first resin material may be higher and the flowability of the first resin material may be lower. The solvent blend may be used to mix the base resin and the nanoparticles and improve the flowability of the first resin material.

In one example, the base resin of the first resin material may include an acrylate resin including a photo radical generator or a thermal radical generator and having a refractive index about 1.7. The photo radical generator may include a photo-initiator that creates reactive species (e.g., free radicals) when exposed to radiation (e.g., UV or visible light). The photo-initiator may include, for example, Diphenyl(2,4,6 trimethylbenzoyl)phosphine oxide and/or 2-Hydroxy-2-methylpropiophenone. The nanoparticles may include, for example, about 90 weight percentage (90 wt. %) loading of $TiO_x$, $ZrO_x$, and/or $NbO_x$ nanoparticles with acrylate and/or non-functional ligands decoration. The solvent may include, for example, propylene glycol methyl ether acetate (PGMEA) or dipropylene glycol methyl ether. In some embodiments, the solvent may have a boiling point greater than about 160° C. The nanoparticles may be dispersed in the PGMEA solvent.

In another example, the base resin may include an epoxy resin with a photo acid generator or thermal acid generator and having a refractive index between about 1.6 and about 1.8. The photo acid generator may initiate cationic photo-polymerization and may include, for example, triphenylsulfonium triflate or other triflates. The nanoparticles may include TiOx nanoparticles with epoxy and non-functional ligands. The solvent may include, for example, propylene glycol methyl ether acetate (PGMEA) or dipropylene glycol methyl ether. In some embodiments, the solvent may have a boiling point greater than about 160° C. The nanoparticles may be dispersed in the PGMEA solvent. Many other base resin, nanoparticles, and solvent may be used in the second resin material.

According to certain embodiments, the second resin material may be a high flowability curable resin material that includes a base resin, fewer and/or smaller (or no) nanoparticles, and a solvent blend. The base resin may be similar to the base resin used in the first resin material. The second resin material may have a refractive index close to but lower than that of the first resin material. For example, the refractive index of the second resin material may be greater than 1.4, such as greater than about 1.5, or greater than about 1.7. The second resin material may have smaller grains and/or a lower viscosity (or a higher flowability). For example, the second resin material may have a viscosity less than about 400 centipoises (cps), less than about 200 cps, less than about 100 cps, less than about 60 cps, less than about 50 cps, less than about 40 cps, less than about 30 cps, less than about 20 cps, less than about 10 cps, less than about 5 cps, less than about 4 cps, less than about 3 cps, less than about 2 cps, or less than about 1 cps.

In one example, the second resin material may include an epoxy resin (e.g., grade PG-100 fluorene epoxy resin) with a refractive index about 1.6 or greater and linked with a photo acid generator (e.g., CPI-310B that may generates a low corrosive borate anion), and a solvent blend including one or more solvents having a boiling point greater than about 160° C., such as dipropylene glycol methyl ether. In another example, the second resin material may include an acrylate resin with a photo radical generator and a solvent blend. Many other base resin, nanoparticles (if used), and solvent may be used in the second resin material.

Unless defined otherwise, all technical and scientific terms used herein have the same meaning as is commonly understood by one of skill in the art to which this disclosure belongs. All patents and publications referred to herein are incorporated by reference in their entireties.

As used herein, the terms "crosslinkable moiety" or "polymerizable moiety" refer to a chemical group capable of participating in a crosslinking or polymerization reaction, at any level, for example, initiation, propagation, etc. Crosslinkable or polymerizable moieties include, but are not limited to, addition crosslinkable or polymerizable moieties and condensation crosslinkable or polymerizable moieties. Crosslinkable or polymerizable moieties include, but are not limited to, double bonds, triple bonds, and the like.

As used herein, the term "inhibitor" refers to one or more compositions, compounds, molecules, etc., that are capable of inhibiting or substantially inhibiting the polymerization of the polymerizable component when the photo-initiating light source is on or off. Polymerization inhibitors typically react very quickly with radicals and effectively stop a polymerization reaction. Inhibitors cause an inhibition time during which little to no photopolymer forms, e.g., only very small chains. Typically, photopolymerization occurs only after nearly 100% of the inhibitor is reacted.

As used herein, the term "oligomer" refers to a polymer having a limited number of repeating units, for example, but without limitation, approximately 30 repeat units or less, or any large molecule able to diffuse at least about 100 nm in approximately 2 minutes at room temperature when dissolved in an article of the present disclosure. Such oligomers may contain one or more crosslinkable or polymerizable groups whereby the crosslinkable or polymerizable groups may be the same or different from other possible monomers in the crosslinkable or polymerizable component. Furthermore, when more than one crosslinkable or polymerizable group is present on the oligomer, they may be the same or different. Additionally, oligomers may be dendritic. Oligomers are considered herein to be photoactive monomers, although they are sometimes referred to as "photoactive oligomer(s)".

As used herein, the terms "photo acid generators," "photo base generators," and "photo radical generators," refer to one or more compositions, compounds, molecules, etc., that, when exposed to a light source, generate one or more compositions, compounds, molecules, etc., that are acidic, basic, or a free radical.

As used herein, the term "alkyl" refers to a straight or branched hydrocarbon chain radical consisting solely of carbon and hydrogen atoms, containing no unsaturation, having from one to ten carbon atoms (e.g., $(C_{1-10})$alkyl or $C_{1-10}$ alkyl). Whenever it appears herein, a numerical range such as "1 to 10" refers to each integer in the given range—e.g., "1 to 10 carbon atoms" means that the alkyl group may consist of 1 carbon atom, 2 carbon atoms, 3 carbon atoms, etc., up to and including 10 carbon atoms, although the definition is also intended to cover the occurrence of the term "alkyl" where no numerical range is specifically designated. Typical alkyl groups include, but are in no way limited to, methyl, ethyl, propyl, isopropyl, n-butyl, isobutyl, sec-butyl isobutyl, tertiary butyl, pentyl, isopentyl, neopentyl, hexyl, septyl, octyl, nonyl and decyl. The alkyl moiety may be attached to the rest of the molecule by a single bond, such as for example, methyl (Me), ethyl (Et), n-propyl (Pr), 1-methylethyl (isopropyl), n-butyl, n-pentyl, 1,1-dimethylethyl (t-butyl) and 3-methylhexyl. Unless stated otherwise specifically in the specification, an alkyl group is optionally substituted by one or more substituents which are independently heteroalkyl, alkenyl, alkynyl, cycloalkyl, heterocycloalkyl, aryl, arylalkyl, heteroaryl, heteroarylalkyl, hydroxy, halo, cyano, trifluoromethyl, trifluoromethoxy, nitro, trimethylsilanyl, —OR$^a$, —SR$^a$, —OC(O)—R$^a$, —SC(O)—R$^a$, —N(R$^a$)$_2$, —C(O)R$^a$, —C(O)OR$^a$, —C(O)SR$^a$, —OC(O)N(R$^a$)$_2$, —C(O)N(R$^a$)$_2$, —N(R$^a$)C(O)OR$^a$, —N(R$^a$)C(O)R$^a$, —N(R$^a$)C(O)N(R$^a$)$_2$, N(R$^a$)C(NR$^a$)N(R$^a$)$_2$, —N(R$^a$)S(O)$_t$R$^a$ (where t is 1 or 2), —S(O)$_t$R$^a$ (where t is 1 or 2), —S(O)$_t$OR$^a$ (where t is 1 or 2), —S(O)$_t$N(R$^a$)$_2$ (where t is 1 or 2), or PO$_3$(R$^a$)$_2$ where each R$^a$ is independently hydrogen, fluoroalkyl, carbocyclyl, carbocyclylalkyl, aryl, aralkyl, heterocycloalkyl, heterocycloalkylalkyl, heteroaryl or heteroarylalkyl.

As used herein, the term "alkenyl" refers to a straight or branched hydrocarbon chain radical group consisting solely of carbon and hydrogen atoms, containing at least one double bond, and having from two to ten carbon atoms (i.e., $(C_{2-10})$alkenyl or $C_{2-10}$ alkenyl). Whenever it appears herein, a numerical range such as "2 to 10" refers to each integer in the given range—e.g., "2 to 10 carbon atoms" means that the alkenyl group may consist of 2 carbon atoms, 3 carbon atoms, etc., up to and including 10 carbon atoms. The alkenyl moiety may be attached to the rest of the molecule by a single bond, such as for example, ethenyl (i.e., vinyl), prop-1-enyl (i.e., allyl), but-1-enyl, pent-1-enyl and penta-1,4-dienyl. Unless stated otherwise specifically in the specification, an alkenyl group is optionally substituted by one or more substituents which are independently alkyl, heteroalkyl, alkenyl, alkynyl, cycloalkyl, heterocycloalkyl, aryl, arylalkyl, heteroaryl, heteroarylalkyl, hydroxy, halo, cyano, trifluoromethyl, trifluoromethoxy, nitro, trimethylsilanyl, —OR$^a$, —SR$^a$, —OC(O)—R$^a$, —SC(O)—R$^a$, —N(R$^a$)$_2$, —C(O)R$^a$, —C(O)OR$^a$, —C(O)SR$^a$, —OC(O)N(R$^a$)$_2$, —C(O)N(R$^a$)$_2$, —N(R$^a$)C(O)OR$^a$, —N(R$^a$)C(O)R$^a$, —N(R$^a$)C(O)N(R$^a$)$_2$, N(R$^a$)C(NR$^a$)N(R$^a$)$_2$, —N(R$^a$)S(O)$_t$R$^a$ (where t is 1 or 2), —S(O)$_t$R$^a$ (where t is 1 or 2), —S(O)$_t$OR$^a$ (where t is 1 or 2), —S(O)$_t$N(R$^a$)$_2$ (where t is 1 or 2), or PO$_3$(R$^a$)$_2$, where each R$^a$ is independently hydrogen, alkyl, fluoroalkyl, carbocyclyl, carbocyclylalkyl, aryl, aralkyl, heterocycloalkyl, heterocycloalkylalkyl, heteroaryl or heteroarylalkyl.

As used herein, the term "alkynyl" refers to a straight or branched hydrocarbon chain radical group consisting solely of carbon and hydrogen atoms, containing at least one triple bond, having from two to ten carbon atoms (i.e., $(C_{2-10})$ alkynyl or $C_{2-10}$ alkynyl). Whenever it appears herein, a numerical range such as "2 to 10" refers to each integer in the given range—e.g., "2 to 10 carbon atoms" means that the alkynyl group may consist of 2 carbon atoms, 3 carbon atoms, etc., up to and including 10 carbon atoms. The alkynyl may be attached to the rest of the molecule by a single bond, for example, ethynyl, propynyl, butynyl, pentynyl and hexynyl. Unless stated otherwise specifically in the specification, an alkynyl group is optionally substituted by one or more substituents which independently are: alkyl, heteroalkyl, alkenyl, alkynyl, cycloalkyl, heterocycloalkyl, aryl, arylalkyl, heteroaryl, heteroarylalkyl, hydroxy, halo, cyano, trifluoromethyl, trifluoromethoxy, nitro, trimethylsilanyl, —OR$^a$, —SR$^a$, —OC(O)—R$^a$, —SC(O)—R$^a$, —N(R$^a$)$_2$, —C(O)R$^a$, —C(O)OR$^a$, —C(O)SR$^a$, —OC(O)N(R$^a$)$_2$, —C(O)N(R$^a$)$_2$, —N(R$^a$)C(O)OR$^a$, —N(R$^a$)C(O)R$^a$, —N($R^a$)C(O)N($R^a$)$_2$, N($R^a$)C(N$R^a$)N($R^a$)$_2$, —N($R^a$)S(O)$_t$$R^a$ (where t is 1 or 2), —S(O)$_t$$R^a$ (where t is 1 or 2), —S(O)$_t$O$R^a$ (where t is 1 or 2), —S(O)$_t$N($R^a$)$_2$ (where t is 1 or 2), or PO$_3$($R^a$)$_2$, where each $R^a$ is independently hydrogen, alkyl, fluoroalkyl, carbocyclyl, carbocyclylalkyl, aryl, aralkyl, heterocycloalkyl, heterocycloalkylalkyl, heteroaryl or heteroarylalkyl.

As used herein, the term "carboxaldehyde" refers to a —(C═O)H radical.

As used herein, the term "carboxyl" refers to a —(C═O)OH radical.

As used herein, the term "cyano" refers to a —CN radical.

As used herein, the term "cycloalkyl" refers to a monocyclic or polycyclic radical that contains only carbon and hydrogen, and may be saturated, or partially unsaturated. Cycloalkyl groups include groups having from 3 to 10 ring atoms (i.e. $C_{3-10}$)cycloalkyl or $C_{3-10}$ cycloalkyl). Whenever it appears herein, a numerical range such as "3 to 10" refers to each integer in the given range—e.g., "3 to 10 carbon atoms" means that the cycloalkyl group may consist of 3 carbon atoms, etc., up to and including 10 carbon atoms. Illustrative examples of cycloalkyl groups include, but are not limited to the following moieties: cyclopropyl, cyclobutyl, cyclopentyl, cyclopentenyl, cyclohexyl, cyclohexenyl, cycloheptyl, cyclooctyl, cyclononyl, cyclodecyl, norbornyl, and the like. Unless stated otherwise specifically in the specification, a cycloalkyl group is optionally substituted by one or more substituents which independently are: alkyl, heteroalkyl, alkenyl, alkynyl, cycloalkyl, heterocycloalkyl, aryl, arylalkyl, heteroaryl, heteroarylalkyl, hydroxy, halo, cyano, trifluoromethyl, trifluoromethoxy, nitro, trimethylsilanyl, —O$R^a$, —S$R^a$, —OC(O)—$R^a$, —SC(O)—$R^a$, —N($R^a$)$_2$, —C(O)$R^a$, —C(O)O$R^a$, —C(O)S$R^a$, —OC(O)N($R^a$)$_2$, —C(O)N($R^a$)$_2$, —N($R^a$)C(O)O$R^a$, —N($R^a$)C(O)$R^a$, —N($R^a$)C(O)N($R^a$)$_2$, N($R^a$)C(N$R^a$)N($R^a$)$_2$, —N($R^a$)S(O)$_t$$R^a$ (where t is 1 or 2), —S(O)$_t$$R^a$ (where t is 1 or 2), —S(O)$_t$O$R^a$ (where t is 1 or 2), —S(O)$_t$N($R^a$)$_2$ (where t is 1 or 2), or PO$_3$($R^a$)$_2$, where each $R^a$ is independently hydrogen, alkyl, fluoroalkyl, carbocyclyl, carbocyclylalkyl, aryl, aralkyl, heterocycloalkyl, heterocycloalkylalkyl, heteroaryl or heteroarylalkyl.

The term "alkoxy" refers to the group —O-alkyl, including from 1 to 8 carbon atoms of a straight, branched, cyclic configuration and combinations thereof attached to the parent structure through an oxygen. Examples include, but are not limited to, methoxy, ethoxy, propoxy, isopropoxy, cyclopropyloxy and cyclohexyloxy. "Lower alkoxy" refers to alkoxy groups containing one to six carbons.

The term "substituted alkoxy" refers to alkoxy wherein the alkyl constituent is substituted (i.e., —O-(substituted alkyl)). Unless stated otherwise specifically in the specification, the alkyl moiety of an alkoxy group is optionally substituted by one or more substituents which independently are: alkyl, heteroalkyl, alkenyl, alkynyl, cycloalkyl, heterocycloalkyl, aryl, arylalkyl, heteroaryl, heteroarylalkyl, hydroxy, halo, cyano, trifluoromethyl, trifluoromethoxy, nitro, trimethylsilanyl, —O$R^a$, —S$R^a$, —OC(O)—$R^a$, —SC(O)—$R^a$, —N($R^a$)$_2$, —C(O)$R^a$, —C(O)O$R^a$, —C(O)S$R^a$, —OC(O)N($R^a$)$_2$, —C(O)N($R^a$)$_2$, —N($R^a$)C(O)O$R^a$, —N($R^a$)C(O)$R^a$, —N($R^a$)C(O)N($R^a$)$_2$, —N($R^a$)C(N$R^a$)N($R^a$)$_2$, —N($R^a$)S(O)$_t$$R^a$ (where t is 1 or 2), —S(O)$_t$$R^a$ (where t is 1 or 2), —S(O)$_t$O$R^a$ (where t is 1 or 2), —S(O)$_t$N($R^a$)$_2$ (where t is 1 or 2), or PO$_3$($R^a$)$_2$, where each $R^a$ is independently hydrogen, alkyl, fluoroalkyl, carbocyclyl, carbocyclylalkyl, aryl, aralkyl, heterocycloalkyl, heterocycloalkylalkyl, heteroaryl or heteroarylalkyl.

As used herein, the term "amino" or "amine" refers to a —N($R^a$)$_2$ radical group, where each $R^a$ is independently hydrogen, alkyl, fluoroalkyl, carbocyclyl, carbocyclylalkyl, aryl, aralkyl, heterocycloalkyl, heterocycloalkylalkyl, heteroaryl or heteroarylalkyl, unless stated otherwise specifically in the specification. When a —N($R^a$)$_2$ group has two $R^a$ substituents other than hydrogen, they can be combined with the nitrogen atom to form a 4-, 5-, 6- or 7-membered ring. For example, —N($R^a$)$_2$ is intended to include, but is not limited to, 1-pyrrolidinyl and 4-morpholinyl. Unless stated otherwise specifically in the specification, an amino group is optionally substituted by one or more substituents which independently are: alkyl, heteroalkyl, alkenyl, alkynyl, cycloalkyl, heterocycloalkyl, aryl, arylalkyl, heteroaryl, heteroarylalkyl, hydroxy, halo, cyano, trifluoromethyl, trifluoromethoxy, nitro, trimethylsilanyl, —O$R^a$, —S$R^a$, —OC(O)—$R^a$, —SC(O)—$R^a$, —N($R^a$)$_2$, —C(O)$R^a$, —C(O)O$R^a$, —C(O)S$R^a$, —OC(O)N($R^a$)$_2$, —C(O)N($R^a$)$_2$, —N($R^a$)C(O)O$R^a$, —N($R^a$)C(O)$R^a$, —N($R^a$)C(O)N($R^a$)$_2$, N($R^a$)C(N$R^a$)N($R^a$)$_2$, —N($R^a$)S(O)$_t$$R^a$ (where t is 1 or 2), —S(O)$_t$$R^a$ (where t is 1 or 2), —S(O)$_t$O$R^a$ (where t is 1 or 2), —S(O)$_t$N($R^a$)$_2$ (where t is 1 or 2), or PO$_3$($R^a$)$_2$, where each $R^a$ is independently hydrogen, alkyl, fluoroalkyl, carbocyclyl, carbocyclylalkyl, aryl, aralkyl, heterocycloalkyl, heterocycloalkylalkyl, heteroaryl or heteroarylalkyl.

As used herein, the term "aromatic" or "aryl" or "Ar" refers to an aromatic radical with six to ten ring atoms (e.g., $C_6$-$C_{10}$ aromatic or $C_6$-$C_{10}$ aryl) which has at least one ring having a conjugated pi electron system which is carbocyclic (e.g., phenyl, fluorenyl, and naphthyl). Bivalent radicals formed from substituted benzene derivatives and having the free valences at ring atoms are named as substituted phenylene radicals. Bivalent radicals derived from univalent polycyclic hydrocarbon radicals whose names end in "-yl" by removal of one hydrogen atom from the carbon atom with the free valence are named by adding "-idene" to the name of the corresponding univalent radical, e.g., a naphthyl group with two points of attachment is termed naphthylidene. Whenever it appears herein, a numerical range such as "6 to 10" refers to each integer in the given range; e.g., "6 to 10 ring atoms" means that the aryl group may consist of 6 ring atoms, 7 ring atoms, etc., up to and including 10 ring atoms. The term includes monocyclic or fused-ring polycyclic (i.e., rings which share adjacent pairs of ring atoms) groups. Unless stated otherwise specifically in the specification, an aryl moiety is optionally substituted by one or more substituents which are independently alkyl, heteroalkyl, alkenyl, alkynyl, cycloalkyl, heterocycloalkyl, aryl, arylalkyl, heteroaryl, heteroarylalkyl, hydroxy, halo, cyano, trifluoromethyl, trifluoromethoxy, nitro, trimethylsilanyl, —O$R^a$, —S$R^a$, —OC(O)—$R^a$, —SC(O)—$R^a$, —N($R^a$)$_2$, —C(O)$R^a$, —C(O)O$R^a$, —C(O)S$R^a$, —OC(O)N($R^a$)$_2$, —C(O)N($R^a$)$_2$, —N($R^a$)C(O)O$R^a$, —N($R^a$)C(O)$R^a$, —N($R^a$)C(O)N($R^a$)$_2$, N($R^a$)C(N$R^a$)N($R^a$)$_2$, —N($R^a$)S(O)$_t$$R^a$ (where t is 1 or 2), —S(O)$_t$$R^a$ (where t is 1 or 2), —S(O)$_t$O$R^a$ (where t is 1 or 2), —S(O)$_t$N($R^a$)$_2$ (where t is 1 or 2), or PO$_3$($R^a$)$_2$, where each $R^a$ is independently hydrogen, alkyl, fluoroalkyl, carbocyclyl, carbocyclylalkyl, aryl, aralkyl, heterocycloalkyl, heterocycloalkylalkyl, heteroaryl or heteroarylalkyl.

As used herein, the term "aralkyl" or "arylalkyl" refers to an (aryl)alkyl-radical where aryl and alkyl are as disclosed herein and which are optionally substituted by one or more of the substituents described as suitable substituents for aryl and alkyl respectively.

As used herein, the term "ester" refers to a chemical radical of formula —COOR, where R is selected from the group consisting of alkyl, cycloalkyl, aryl, heteroaryl (bonded through a ring carbon) and heteroalicyclic (bonded through a ring carbon). The procedures and specific groups to make esters are known to those of skill in the art and can readily be found in seminal sources. Unless stated otherwise specifically in the specification, an ester group is optionally substituted by one or more substituents which independently are: alkyl, heteroalkyl, alkenyl, alkynyl, cycloalkyl, heterocycloalkyl, aryl, arylalkyl, heteroaryl, heteroarylalkyl, hydroxy, halo, cyano, trifluoromethyl, trifluoromethoxy, nitro, trimethylsilanyl, —OR$^a$, —SR$^a$, —OC(O)—R$^a$, —SC(O)—R$^a$, —N(R$^a$)$_2$, —C(O)R$^a$, —C(O)OR$^a$, —C(O)SR$^a$, —OC(O)N(R$^a$)$_2$, —C(O)N(R$^a$)$_2$, —N(R$^a$)C(O)OR$^a$, —N(R$^a$)C(O)R$^a$, —N(R$^a$)C(O)N(R$^a$)$_2$, N(R$^a$)C(NR$^a$)N(R$^a$)$_2$, —N(R$^a$)S(O)$_t$R$^a$ (where t is 1 or 2), —S(O)$_t$R$^a$ (where t is 1 or 2), —S(O)$_t$OR$^a$ (where t is 1 or 2), —S(O)$_t$N(R$^a$)$_2$ (where t is 1 or 2), or PO$_3$(R$^a$)$_2$, where each R$^a$ is independently hydrogen, alkyl, fluoroalkyl, carbocyclyl, carbocyclylalkyl, aryl, aralkyl, heterocycloalkyl, heterocycloalkylalkyl, heteroaryl or heteroarylalkyl.

As used herein, the term "halo," "halide," or, alternatively, "halogen" is intended to mean fluoro, chloro, bromo or iodo. The terms "haloalkyl," "haloalkenyl," "haloalkynyl," and "haloalkoxy" include alkyl, alkenyl, alkynyl and alkoxy structures that are substituted with one or more halo groups or with combinations thereof. For example, the terms "fluoroalkyl" and "fluoroalkoxy" include haloalkyl and haloalkoxy groups, respectively, in which the halo is fluorine.

As used herein, the terms "heteroalkyl," "heteroalkenyl," and "heteroalkynyl" refer to optionally substituted alkyl, alkenyl and alkynyl radicals and which have one or more skeletal chain atoms selected from an atom other than carbon, e.g., oxygen, nitrogen, sulfur, phosphorus or combinations thereof. A numerical range may be given—e.g., $C_1$-$C_4$ heteroalkyl which refers to the chain length in total, which in this example is 4 atoms long. A heteroalkyl group may be substituted with one or more substituents which independently are: alkyl, heteroalkyl, alkenyl, alkynyl, cycloalkyl, heterocycloalkyl, aryl, arylalkyl, heteroaryl, heteroarylalkyl, hydroxy, halo, cyano, nitro, oxo, thioxo, trimethylsilanyl, —OR$^a$, —SR$^a$, —OC(O)—R$^a$, —SC(O)—R$^a$, —N(R$^a$)$_2$, —C(O)R$^a$, —C(O)OR$^a$, —C(O)SR$^a$, —OC(O)N(R$^a$)$_2$, —C(O)N(R$^a$)$_2$, —N(R$^a$)C(O)OR$^a$, —N(R$^a$)C(O)R$^a$, —N(R$^a$)C(O)N(R$^a$)$_2$, N(R$^a$)C(NR$^a$)N(R$^a$)$_2$, —N(R$^a$)S(O)$_t$R$^a$ (where t is 1 or 2), —S(O)$_t$R$^a$ (where t is 1 or 2), —S(O)$_t$OR$^a$ (where t is 1 or 2), —S(O)$_t$N(R$^a$)$_2$ (where t is 1 or 2), or PO$_3$(R$^a$)$_2$, where each R$^a$ is independently hydrogen, alkyl, fluoroalkyl, carbocyclyl, carbocyclylalkyl, aryl, aralkyl, heterocycloalkyl, heterocycloalkylalkyl, heteroaryl or heteroarylalkyl.

As used herein, the term "heteroaryl" or "heteroaromatic" or "HetAr" or "Het" refers to a 5- to 18-membered aromatic radical (e.g., $C_5$-$C_{13}$ heteroaryl) that includes one or more ring heteroatoms selected from nitrogen, oxygen and sulfur, and which may be a monocyclic, bicyclic, tricyclic or tetracyclic ring system. Whenever it appears herein, a numerical range such as "5 to 18" refers to each integer in the given range—e.g., "5 to 18 ring atoms" means that the heteroaryl group may consist of 5 ring atoms, 6 ring atoms, etc., up to and including 18 ring atoms. Bivalent radicals derived from univalent heteroaryl radicals whose names end in "-yl" by removal of one hydrogen atom from the atom with the free valence are named by adding "-idene" to the name of the corresponding univalent radical—e.g., a pyridyl group with two points of attachment is a pyridylidene. A N-containing "heteroaromatic" or "heteroaryl" moiety refers to an aromatic group in which at least one of the skeletal atoms of the ring is a nitrogen atom. The polycyclic heteroaryl group may be fused or non-fused. The heteroatom(s) in the heteroaryl radical are optionally oxidized. One or more nitrogen atoms, if present, are optionally quaternized. The heteroaryl may be attached to the rest of the molecule through any atom of the ring(s). Examples of heteroaryls include, but are not limited to, azepinyl, acridinyl, benzimidazolyl, benzindolyl, 1,3-benzodioxolyl, benzofuranyl, benzooxazolyl, benzo[d]thiazolyl, benzothiadiazolyl, benzo[b][1,4]dioxepinyl, benzo[b][1,4]oxazinyl, 1,4-benzodioxanyl, benzonaphthofuranyl, benzoxazolyl, benzodioxolyl, benzodioxinyl, benzoxazolyl, benzopyranyl, benzopyranonyl, benzofuranyl, benzofuranonyl, benzofurazanyl, benzothiazolyl, benzothienyl(benzothiophenyl), benzothieno[3,2-d]pyrimidinyl, benzotriazolyl, benzo[4,6]imidazo[1,2-a]pyridinyl, carbazolyl, cinnolinyl, cyclopenta[d]pyrimidinyl, 6,7-dihydro-5H-cyclopenta[4,5]thieno[2,3-d]pyrimidinyl, 5,6-dihydrobenzo[h]quinazolinyl, 5,6-dihydrobenzo[h]cinnolinyl, 6,7-dihydro-5H-benzo[6,7]cyclohepta[1,2-c]pyridazinyl, dibenzofuranyl, dibenzothiophenyl, furanyl, furazanyl, furanonyl, furo[3,2-c]pyridinyl, 5,6,7,8,9,10-hexahydrocycloocta[d]pyrimidinyl, 5,6,7,8,9,10-hexahydrocycloocta[d]pyridazinyl, 5,6,7,8,9,10-hexahydrocycloocta[d]pyridinyl, isothiazolyl, imidazolyl, indazolyl, indolyl, indazolyl, isoindolyl, indolinyl, isoindolinyl, isoquinolyl, indolizinyl, isoxazolyl, 5,8-methano-5,6,7,8-tetrahydroquinazolinyl, naphthyridinyl, 1,6-naphthyridinonyl, oxadiazolyl, 2-oxoazepinyl, oxazolyl, oxiranyl, 5,6,6a,7,8,9,10,10a-octahydrobenzo[h]quinazolinyl, 1-phenyl-1H-pyrrolyl, phenazinyl, phenothiazinyl, phenoxazinyl, phthalazinyl, pteridinyl, purinyl, pyranyl, pyrrolyl, pyrazolyl, pyrazolo[3,4-d]pyrimidinyl, pyridinyl, pyrido[3,2-d]pyrimidinyl, pyrido[3,4-d]pyrimidinyl, pyrazinyl, pyrimidinyl, pyridazinyl, pyrrolyl, quinazolinyl, quinoxalinyl, quinolinyl, isoquinolinyl, tetrahydroquinolinyl, 5,6,7,8-tetrahydroquinazolinyl, 5,6,7,8-tetrahydrobenzo[4,5]thieno[2,3-d]pyrimidinyl, 6,7,8,9-tetrahydro-5H-cyclohepta[4,5]thieno[2,3-d]pyrimidinyl, 5,6,7,8-tetrahydropyrido[4,5-c]pyridazinyl, thiazolyl, thiadiazolyl, thiapyranyl, triazolyl, tetrazolyl, triazinyl, thieno[2,3-d]pyrimidinyl, thieno[3,2-d]pyrimidinyl, thieno[2,3-c]pyridinyl, and thiophenyl (i.e., thienyl). Unless stated otherwise specifically in the specification, a heteroaryl moiety is optionally substituted by one or more substituents which are independently: alkyl, heteroalkyl, alkenyl, alkynyl, cycloalkyl, heterocycloalkyl, aryl, arylalkyl, heteroaryl, heteroarylalkyl, hydroxy, halo, cyano, nitro, oxo, thioxo, trimethylsilanyl, —OR$^a$, —SR$^a$, —OC(O)R$^a$, —SC(O)—R$^a$, —N(R$^a$)$_2$, —C(O)R$^a$, —C(O)OR$^a$, —C(O)SR$^a$, —OC(O)N(R$^a$)$_2$, —C(O)N(R$^a$)$_2$, —N(R$^a$)C(O)OR$^a$, —N(R$^a$)C(O)R$^a$, —N(R$^a$)C(O)N(R$^a$)$_2$, N(R$^a$)C(NR$^a$)N(R$^a$)$_2$, —N(R$^a$)S(O)$_t$R$^a$ (where t is 1 or 2), —S(O)$_t$R$^a$ (where t is 1 or 2), —S(O)$_t$OR$^a$ (where t is 1 or 2), —S(O)$_t$N(R$^a$)$_2$ (where t is 1 or 2), or PO$_3$(R$^a$)$_2$, where each R$^a$ is independently hydrogen, alkyl, fluoroalkyl, carbocyclyl, carbocyclylalkyl, aryl, aralkyl, heterocycloalkyl, heterocycloalkylalkyl, heteroaryl or heteroarylalkyl.

Substituted heteroaryl also includes ring systems substituted with one or more oxide (—O—) substituents, such as, for example, pyridinyl N-oxides.

As used herein, the term "heteroarylalkyl" refers to a moiety having an aryl moiety, as described herein, connected to an alkylene moiety, as described herein, wherein the connection to the remainder of the molecule is through the alkylene group.

As used herein, the term "heterocycloalkyl" refers to a stable 3- to 18-membered non-aromatic ring radical that comprises two to twelve carbon atoms and from one to six heteroatoms selected from nitrogen, oxygen and sulfur. Whenever it appears herein, a numerical range such as "3 to 18" refers to each integer in the given range—e.g., "3 to 18 ring atoms" means that the heterocycloalkyl group may consist of 3 ring atoms, 4 ring atoms, etc., up to and including 18 ring atoms. Unless stated otherwise specifically in the specification, the heterocycloalkyl radical is a monocyclic, bicyclic, tricyclic or tetracyclic ring system, which may include fused or bridged ring systems. The heteroatoms in the heterocycloalkyl radical may be optionally oxidized. One or more nitrogen atoms, if present, are optionally quaternized. The heterocycloalkyl radical is partially or fully saturated. The heterocycloalkyl may be attached to the rest of the molecule through any atom of the ring(s). Examples of such heterocycloalkyl radicals include, but are not limited to, dioxolanyl, thienyl[1,3]dithianyl, decahydroisoquinolyl, imidazolinyl, imidazolidinyl, isothiazolidinyl, isoxazolidinyl, morpholinyl, octahydroindolyl, octahydroisoindolyl, 2-oxopiperazinyl, 2-oxopiperidinyl, 2-oxopyrrolidinyl, oxazolidinyl, piperidinyl, piperazinyl, 4-piperidonyl, pyrrolidinyl, pyrazolidinyl, quinuclidinyl, thiazolidinyl, tetrahydrofuryl, trithianyl, tetrahydropyranyl, thiomorpholinyl, thiamorpholinyl, 1-oxo-thiomorpholinyl, and 1,1-dioxo-thiomorpholinyl. Unless stated otherwise specifically in the specification, a heterocycloalkyl moiety is optionally substituted by one or more substituents which independently are: alkyl, heteroalkyl, alkenyl, alkynyl, cycloalkyl, heterocycloalkyl, aryl, arylalkyl, heteroaryl, heteroarylalkyl, hydroxy, halo, cyano, nitro, oxo, thioxo, trimethylsilanyl, —$OR^a$, —$SR^a$, —$OC(O)$—$R^a$, —$SC(O)$—$R^a$, —$N(R^a)_2$, —$C(O)R^a$, —$C(O)OR^a$, —$C(O)SR^a$, —$OC(O)N(R^a)_2$, —$C(O)N(R^a)_2$, —$N(R^a)C(O)OR^a$, —$N(R^a)C(O)R^a$, —$N(R^a)C(O)N(R^a)_2$, $N(R^a)C(NR^a)N(R^a)_2$, —$N(R^a)S(O)_tR$ (where t is 1 or 2), —$S(O)_tR^a$ (where t is 1 or 2), —$S(O)_tOR^a$ (where t is 1 or 2), —$S(O)_tN(R^a)_2$ (where t is 1 or 2), or $PO_3(R^a)_2$, where each $R^a$ is independently hydrogen, alkyl, fluoroalkyl, carbocyclyl, carbocyclylalkyl, aryl, aralkyl, heterocycloalkyl, heterocycloalkylalkyl, heteroaryl or heteroarylalkyl.

As used herein, the term "heterocycloalkyl" also includes bicyclic ring systems wherein one non-aromatic ring, usually with 3 to 7 ring atoms, contains at least 2 carbon atoms in addition to 1-3 heteroatoms independently selected from oxygen, sulfur, and nitrogen, as well as combinations comprising at least one of the foregoing heteroatoms; and the other ring, usually with 3 to 7 ring atoms, optionally contains 1-3 heteroatoms independently selected from oxygen, sulfur, and nitrogen and is not aromatic.

As used herein, the term "nitro" refers to the —$NO_2$ radical.

As used herein, the term "oxa" refers to the —O— radical.

As used herein, the term "oxo" refers to the =O radical.

As used herein, the term "moiety" refers to a specific segment or functional group of a molecule. Chemical moieties are often recognized chemical entities embedded in or appended to a molecule.

As used herein, the term "substituted" means that the referenced group may have attached one or more additional groups, radicals or moieties individually and independently selected from, for example, acyl, alkyl, alkylaryl, cycloalkyl, aralkyl, aryl, carbohydrate, carbonate, heteroaryl, heterocycloalkyl, hydroxy, alkoxy, aryloxy, mercapto, alkylthio, arylthio, cyano, halo, carbonyl, ester, thiocarbonyl, isocyanato, thiocyanato, isothiocyanato, nitro, oxo, perhaloalkyl, perfluoroalkyl, phosphate, silyl, sulfinyl, sulfonyl, sulfonamidyl, sulfoxyl, sulfonate, urea, and amino, including mono- and di-substituted amino groups, and protected derivatives thereof. The substituents themselves may be substituted, for example, a cycloalkyl substituent may itself have a halide substituent at one or more of its ring carbons. The term "optionally substituted" means optional substitution with the specified groups, radicals or moieties.

As used herein, the term "sulfanyl" refers to groups that include —S-(optionally substituted alkyl), —S-(optionally substituted aryl), —S-(optionally substituted heteroaryl) and —S-(optionally substituted heterocycloalkyl).

Compounds of the present disclosure also include crystalline and amorphous forms of those compounds, including, for example, polymorphs, pseudopolymorphs, solvates, hydrates, unsolvated polymorphs (including anhydrates), conformational polymorphs, and amorphous forms of the compounds, as well as mixtures thereof. "Crystalline form" and "polymorph" are intended to include all crystalline and amorphous forms of the compound, including, for example, polymorphs, pseudopolymorphs, solvates, hydrates, unsolvated polymorphs (including anhydrates), conformational polymorphs, and amorphous forms, as well as mixtures thereof, unless a particular crystalline or amorphous form is referred to.

Unless otherwise stated, the chemical structures depicted herein are intended to include compounds which differ only in the presence of one or more isotopically enriched atoms. For example, compounds where one or more hydrogen atoms is replaced by deuterium or tritium, or where one or more carbon atoms is replaced by $^{13}C$- or $^{14}C$-enriched carbons, are within the scope of this disclosure.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments.

Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (LED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an antireflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be a light-emitting diode (LED), a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IU 132 may be an electronic device that generates fast calibration data based on measurement signals received from one or more of position sensors 128. Position sensors 128 may be located external to IMU 132, internal to IU 132, or any combination thereof. Based on the one or more measurement signals from one or more position sensors 128, IU 132 may generate fast calibration data indicating an estimated position of near-eye display 120 relative to an initial position of near-eye display 120. For example, IU 132 may integrate measurement signals received from accelerometers over time to estimate a velocity vector and integrate the velocity vector over time to determine an estimated position of a reference point on near-eye display 120. Alternatively, IU 132 may provide the sampled measurement signals to console 110, which may determine the fast calibration data. While the reference point may generally be defined as a point in space, in various embodiments, the reference point may also be defined as a point within near-eye display 120 (e.g., a center of IU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future location of near-eye display 120. Headset tracking module 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

Figure 2:
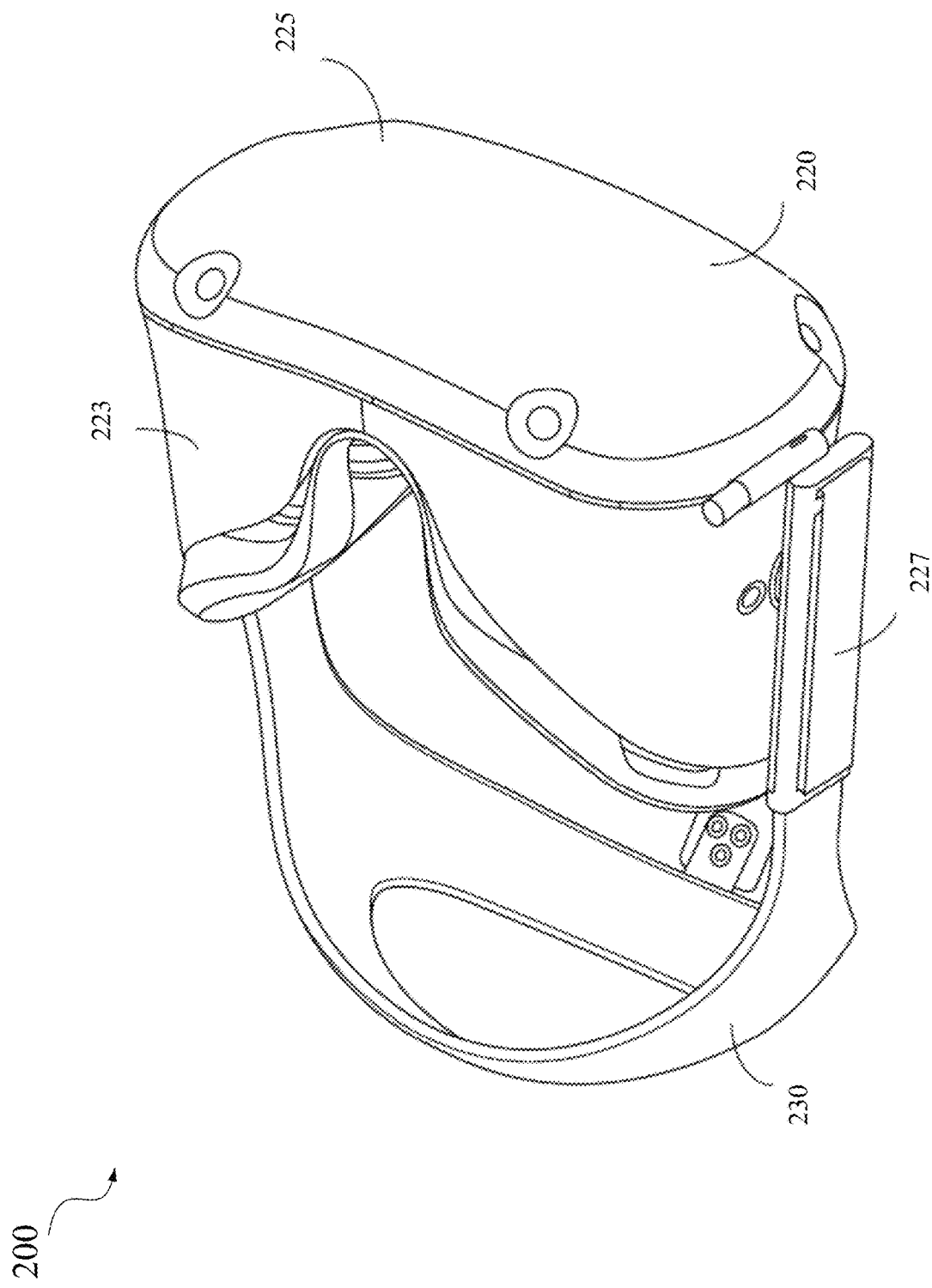
FIG. 2 is a perspective view of an example of a near-eye display in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a µLED display, an AMOLED, a TOLED, some other display, or any combination thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
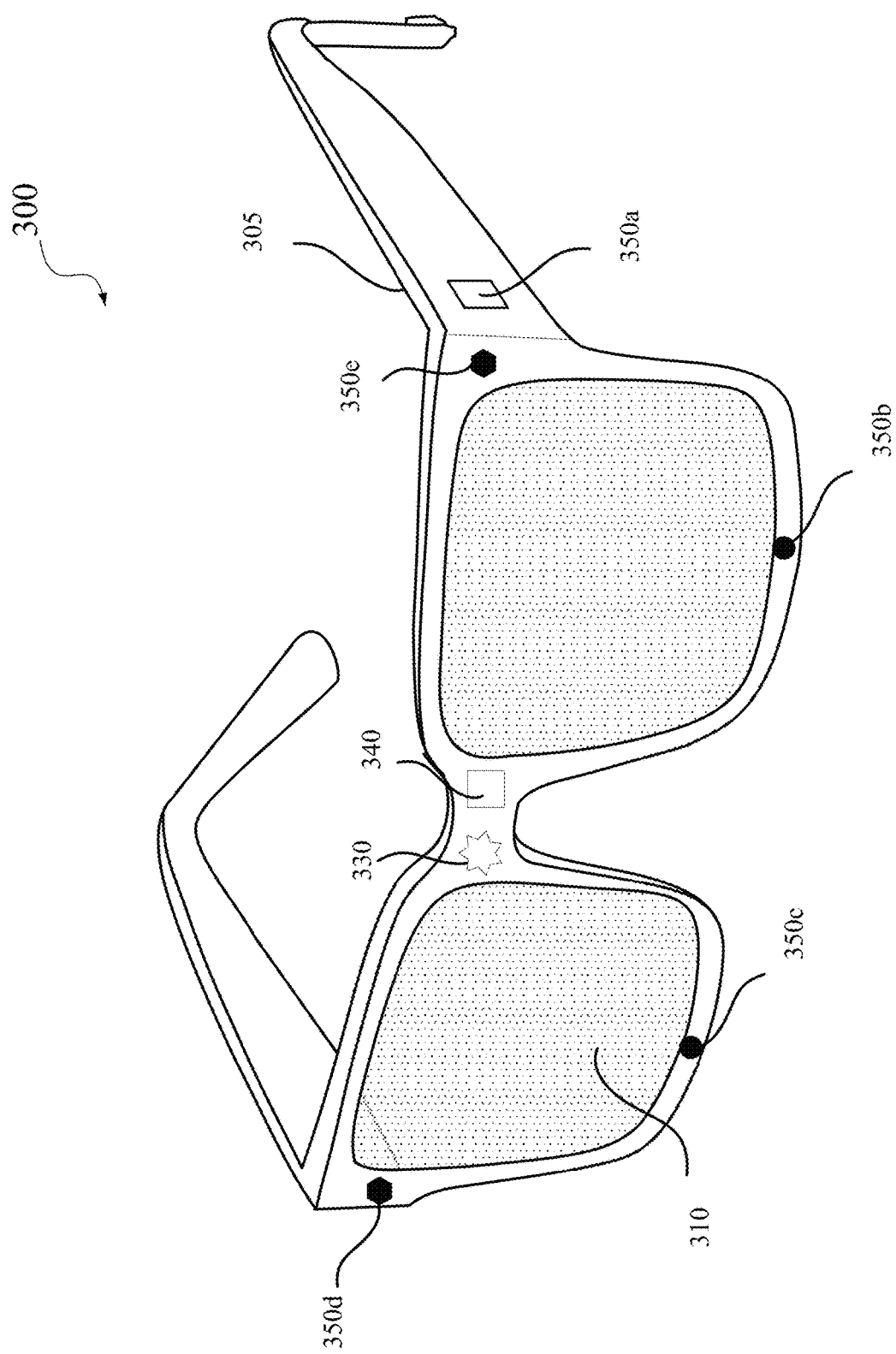
FIG. 3 is a perspective view of an example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light patterns onto the objects within the environment. In some embodiments, illuminator(s) 330 may be used as locators, such as locators 126 described above with respect to FIG. 1.

In some embodiments, near-eye display 300 may also include a high-resolution camera 340. High-resolution camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
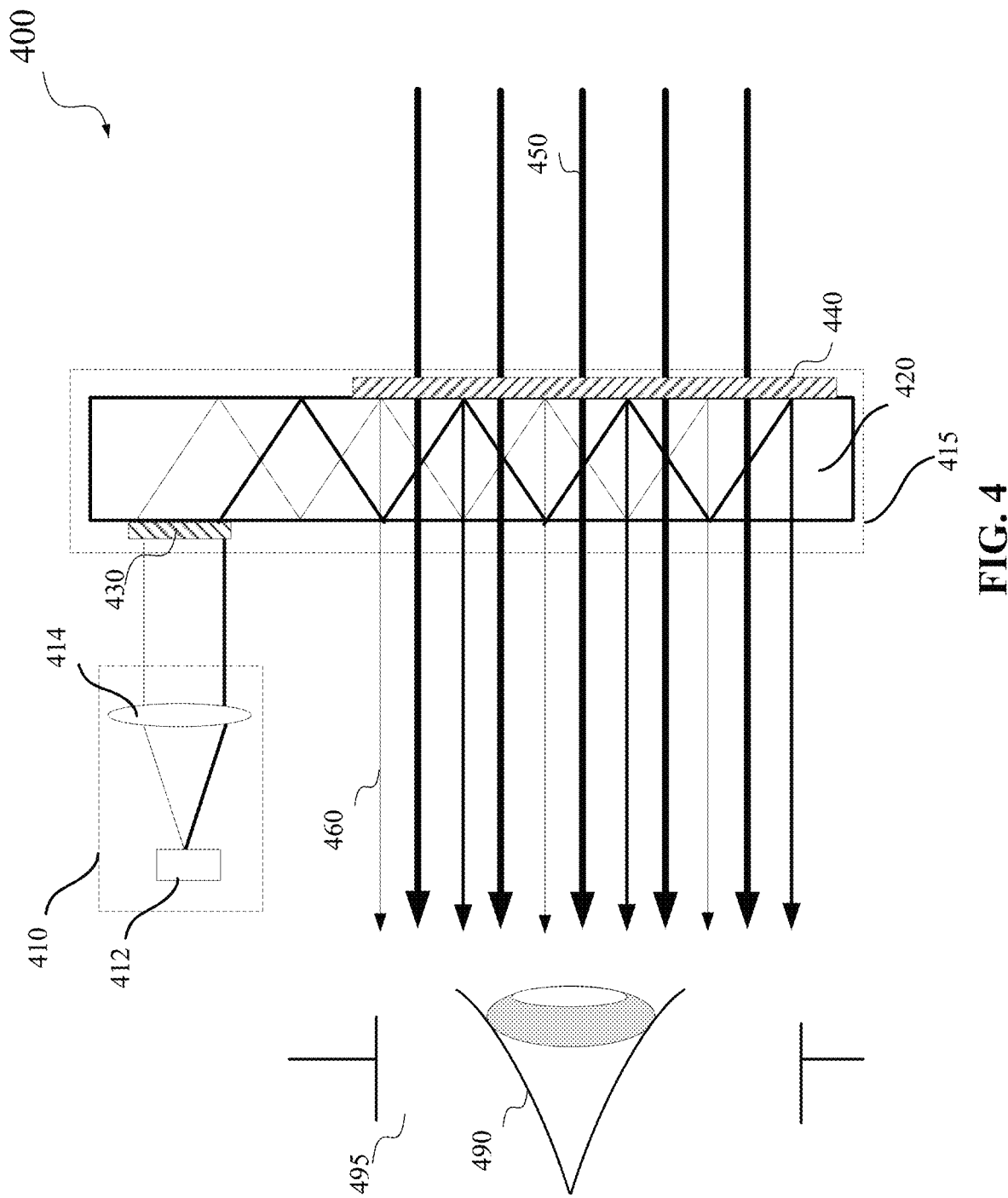
FIG. 4 illustrates an example of an optical see-through augmented reality system including a waveguide display according to certain embodiments.

FIG. 4 illustrates an example of an optical see-through augmented reality system 400 including a waveguide display according to certain embodiments. Augmented reality system 400 may include a projector 410 and a combiner 415. Projector 410 may include a light source or image source 412 and projector optics 414. In some embodiments, light source or image source 412 may include one or more micro-LED devices described above. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, an LED, and/or a micro-LED described above. In some embodiments, image source 412 may include a plurality of light sources (e.g., an array of micro-LEDs described above), each emitting a monochromatic image light corresponding to a primary color (e.g., red, green, or blue). In some embodiments, image source 412 may include three two-dimensional arrays of micro-LEDs, where each two-dimensional array of micro-LEDs may include micro-LEDs configured to emit light of a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. For example, in some embodiments, image source 412 may include one or more one-dimensional arrays or elongated two-dimensional arrays of micro-LEDs, and projector optics 414 may include one or more one-dimensional scanners (e.g., micro-mirrors or prisms) configured to scan the one-dimensional arrays or elongated two-dimensional arrays of micro-LEDs to generate image frames. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Combiner 415 may transmit at least 50% of light in a first wavelength range and reflect at least 25% of light in a second wavelength range. For example, the first wavelength range may be visible light from about 400 nm to about 650 nm, and the second wavelength range may be in the infrared band, for example, from about 800 nm to about 1000 nm. Input coupler 430 may include a volume holographic grating, a diffractive optical element (DOE) (e.g., a surface-relief grating), a slanted surface of substrate 420, or a refractive coupler (e.g., a wedge or a prism). For example, input coupler 430 may include a reflective volume Bragg grating or a transmissive volume Bragg grating. Input coupler 430 may have a coupling efficiency of greater than 30%, 50%, 75%, 90%, or higher for visible light. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light.

Substrate 420 may include or may be coupled to a plurality of output couplers 440, each configured to extract at least a portion of the light guided by and propagating within substrate 420 from substrate 420, and direct extracted light 460 to an eyebox 495 where an eye 490 of the user of augmented reality system 400 may be located when augmented reality system 400 is in use. The plurality of output couplers 440 may replicate the exit pupil to increase the size of eyebox 495 such that the displayed image is visible in a larger area. As input coupler 430, output couplers 440 may include grating couplers (e.g., volume holographic gratings or surface-relief gratings), other diffraction optical elements, prisms, etc. For example, output couplers 440 may include reflective volume Bragg gratings or transmissive volume Bragg gratings. Output couplers 440 may have different coupling (e.g., diffraction) efficiencies at different locations. Substrate 420 may also allow light 450 from the environment in front of combiner 415 to pass through with little or no loss. Output couplers 440 may also allow light 450 to pass through with little loss. For example, in some implementations, output couplers 440 may have a very low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 in certain desired directions (i.e., diffraction angles) with little loss. As a result, the user may be able to view combined images of the environment in front of combiner 415 and images of virtual objects projected by projector 410.

Figure 5:
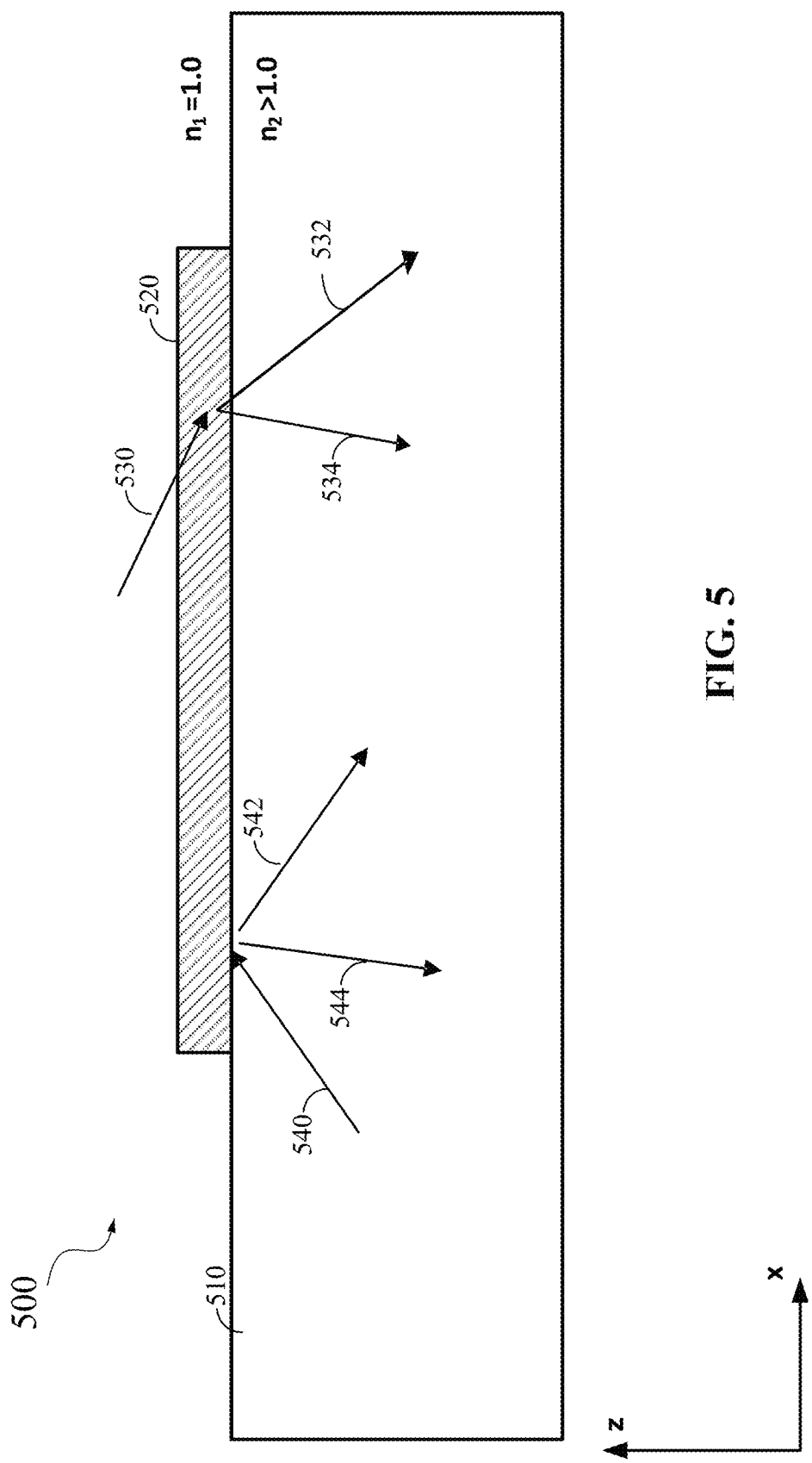
FIG. 5 illustrates examples of propagations of display light and external light in an example of a waveguide display.

FIG. 5 illustrates propagations of display light 540 and external light 530 in an example waveguide display 500 including a waveguide 510 and a grating coupler 520. Waveguide 510 may be a flat or curved transparent substrate with a refractive index $n_2$ greater than the free space refractive index $n_1$ (e.g., 1.0). Grating coupler 520 may be, for example, a Bragg grating or a surface-relief grating.

Display light 540 may be coupled into waveguide 510 by, for example, input coupler 430 of FIG. 4 or other couplers (e.g., a prism or slanted surface) described above. Display light 540 may propagate within waveguide 510 through, for example, total internal reflection. When display light 540 reaches grating coupler 520, display light 540 may be diffracted by grating coupler 520 into, for example, a $0^{th}$ order diffraction (i.e., reflection) light 542 and a −1st order diffraction light 544. The $0^{th}$ order diffraction may propagate within waveguide 510, and may be reflected by the bottom surface of waveguide 510 towards grating coupler 520 at a different location. The −1st order diffraction light 544 may be coupled (e.g., refracted) out of waveguide 510 towards the user's eye, because a total internal reflection condition may not be met at the bottom surface of waveguide 510 due to the diffraction angle.

External light 530 may also be diffracted by grating coupler 520 into, for example, a $0^{th}$ order diffraction light 532 and a −1st order diffraction light 534. Both the $0^{th}$ order diffraction light 532 and the −1st order diffraction light 534 may be refracted out of waveguide 510 towards the user's eye. Thus, grating coupler 520 may act as an input coupler for coupling external light 530 into waveguide 510, and may also act as an output coupler for coupling display light 540 out of waveguide 510. As such, grating coupler 520 may act as a combiner for combining external light 530 and display light 540. In general, the diffraction efficiency of grating coupler 520 (e.g., a surface-relief grating coupler) for external light 530 (i.e., transmissive diffraction) and the diffraction efficiency of grating coupler 520 for display light 540 (i.e., reflective diffraction) may be similar or comparable.

In order to diffract light at a desired direction towards the user's eye and to achieve a desired diffraction efficiency for certain diffraction orders, grating coupler 520 may include a blazed or slanted grating, such as a slanted Bragg grating or surface-relief grating, where the grating ridges and grooves may be tilted relative to the surface normal of grating coupler 520 or waveguide 510.

Figure 6:
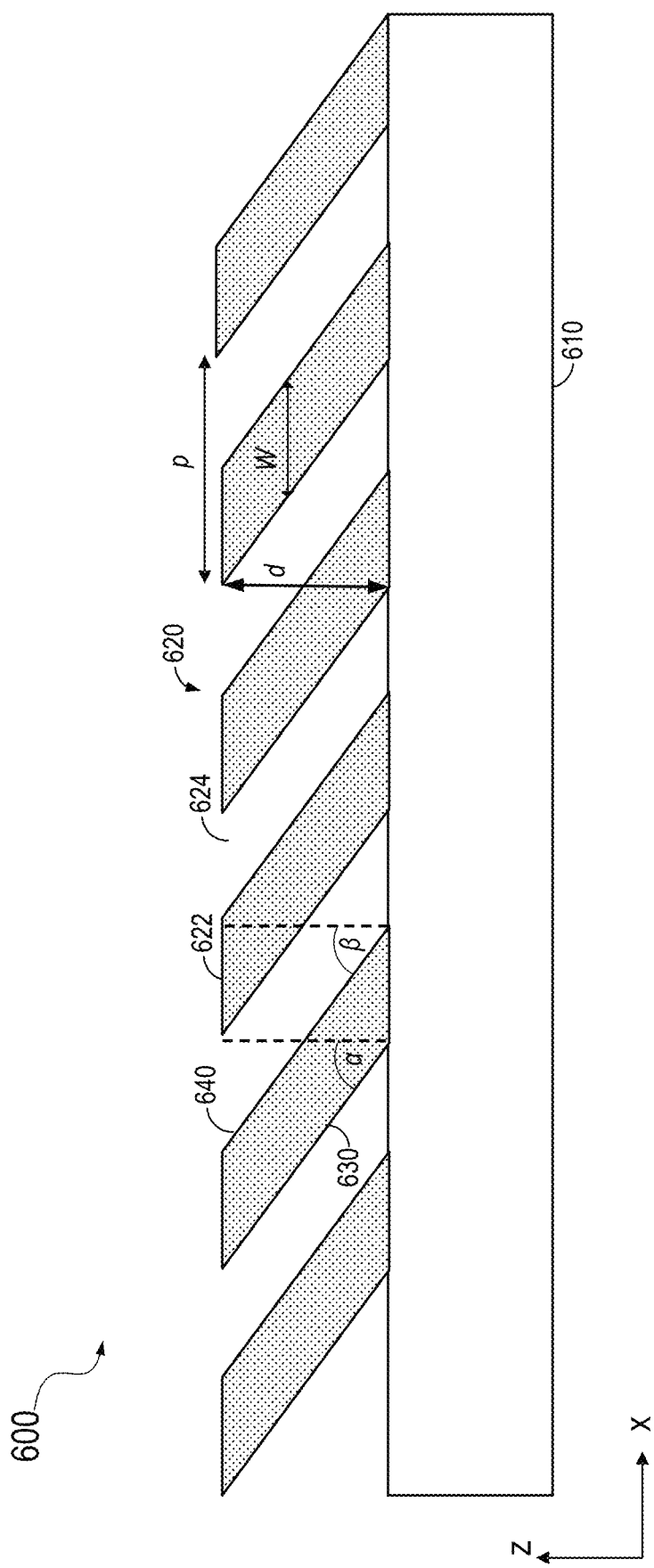
FIG. 6 illustrates an example of a slanted grating coupler in a waveguide display according to certain embodiments.

FIG. 6 illustrates an example of a slanted grating 620 in a waveguide display 600 according to certain embodiments. Slanted grating 620 may be an example of input coupler 430, output couplers 440, or grating coupler 520. Waveguide display 600 may include slanted grating 620 on a waveguide 610, such as substrate 420 or waveguide 510. Slanted grating 620 may act as a grating coupler for couple light into or out of waveguide 610. In some embodiments, slanted grating 620 may include a one-dimensional periodic structure with a period p. For example, slanted grating 620 may include a plurality of ridges 622 and grooves 624 between ridges 622. Each period of slanted grating 620 may include a ridge 622 and a groove 624, which may be an air gap or a region filled with a material with a refractive index $n_{g2}$. The ratio between the width d of a ridge 622 and the grating period p may be referred to as duty cycle. Slanted grating 620 may have a duty cycle ranging, for example, from about 10% to about 90% or greater. In some embodiments, the duty cycle may vary from period to period. In some embodiments, the period p of the slanted grating may vary from one area to another on slanted grating 620, or may vary from one period to another (i.e., chirped) on slanted grating 620.

Ridges 622 may be made of a material with a refractive index of $n_{g1}$, such as silicon containing materials (e.g., $SiO_2$, $Si_3N_4$, SiC, $SiO_xN_y$, or amorphous silicon), organic materials (e.g., spin on carbon (SOC) or amorphous carbon layer (ACL) or diamond like carbon (DLC)), or inorganic metal oxide layers (e.g., $TiO_x$, $AlO_x$, $TaO_x$, $HfO_x$, etc.). Each ridge 622 may include a leading edge 630 with a slant angel α and a trailing edge 640 with a slant angle β. In some embodiments, leading edge 630 and trailing edge 640 of each ridge 622 may be parallel to each other. In other words, slant angle α is approximately equal to slant angle β. In some embodiments, slant angle α may be different from slant angle β. In some embodiments, slant angle α may be approximately equal to slant angle β. For example, the difference between slant angle α and slant angle β may be less than 20%, 10%, 5%, 1%, or less. In some embodiments, slant angle α and slant angle β may range from, for example, about 30° or less to about 70° or larger.

In some implementations, grooves 624 between the ridges 622 may be over-coated or filled with a material having a refractive index $n_{g2}$ higher or lower than the refractive index of the material of ridges 622. For example, in some embodiments, a high refractive index material, such as Hafnia, Titania, Tantalum oxide, Tungsten oxide, Zirconium oxide, Gallium sulfide, Gallium nitride, Gallium phosphide, silicon, and a high refractive index polymer, may be used to fill grooves 624. In some embodiments, a low refractive index material, such as silicon oxide, alumina, porous silica, or fluorinated low index monomer (or polymer), may be used to fill grooves 624. As a result, the difference between the refractive index of the ridges and the refractive index of the grooves may be greater than 0.1, 0.2, 0.3, 0.5, 1.0, or higher.

The user experience with an artificial reality system may depend on several optical characteristics of the artificial reality system, such as the field of view (FOV), image quality (e.g., resolution), size of the eye box of the system (to accommodate for eye and/or head movement), the distance of eye relief, optical bandwidth, and brightness of the displayed image. In general, the FOV and the eye box need to be as large as possible, the optical bandwidth needs to cover the visible band, and the brightness of the displayed image needs to be high enough (especially for optical see-through AR systems).

In a waveguide-based near-eye display, the output area of the display may be much larger than the size of the eyebox of the near-eye display system. The portion of light that may reach a user's eyes may depend on the ratio between the size of the eyebox and the output area of the display, which, in some cases, may be less than 10% for a certain eye relief and field of view. In order to achieve a desired brightness of the displayed image perceived by user's eyes, the display light from the projector or the light source may need to be increased significantly, which may increase the power consumption and cause some safety concerns.

Figure 7B:
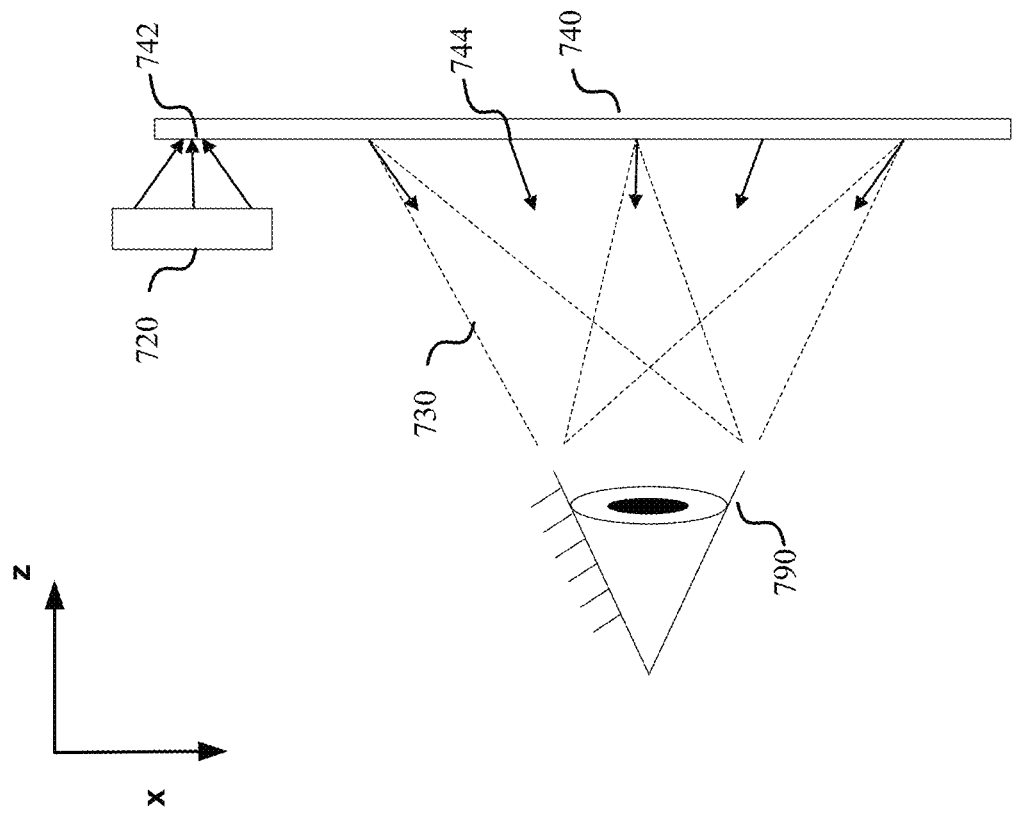
FIG. 7B illustrates an example of a waveguide-based near-eye display where display light may be coupled out of a waveguide display at different angles in different regions of the waveguide display according to certain embodiments.
Figure 7A:
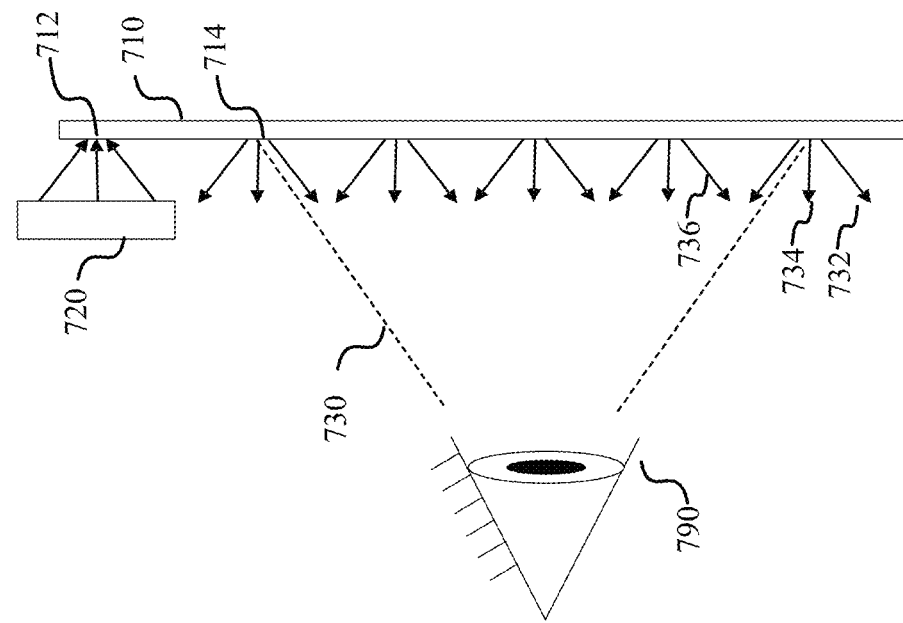
FIG. 7A illustrates an example of a waveguide-based near-eye display where display light for all fields of view is substantially uniformly output from different regions of a waveguide display.

FIG. 7A illustrates an example of a waveguide-based near-eye display where display light for all fields of view is substantially uniformly output from different regions of a waveguide display 710. The near-eye display may include a projector 720 and waveguide display 710. Projector 720 may be similar to projector 410 and may include a light source or image source similar to light source or image source 412 and projector optics similar to projector optics 414. Waveguide display 710 may include a waveguide (e.g., a substrate), one or more input couplers 712, and one or more output couplers 714. Input couplers 712 may be configured to couple display light from different fields of view (or viewing angles) into the waveguide, and output couplers 714 may be configured to couple display light out of the waveguide. The input and output couplers may include, for example, slanted surface-relief gratings or volume Bragg gratings. In the example shown in FIG. 7, output coupler 714 may have similar grating parameters across the full region of the output coupler other than parameters that may be varied to adjust the coupling efficiency for more uniform output light. Thus, the display light may be partially coupled out of the waveguide at different regions of waveguide display 710 in a similar manner as shown in FIG. 7A, where display light from all fields of view of the near-eye display may be partially coupled out of the waveguide at any given region of waveguide display 710.

As also shown in FIG. 7A, the near-eye display system may have an eyebox at a certain eyebox position 790 and having a limited size and thus a limited field of view 730. As such, not all light coupled out of the waveguide in waveguide display 710 may reach the eyebox at eyebox position 790. For example, display light 732, 734, and 736 from waveguide display 710 may not reach the eyebox at eyebox position 790, and thus may not be received by the user's eyes, which may result in significant loss of the optical power from projector 720.

In certain embodiments, an optical coupler (e.g., a slanted surface-relief grating) for a waveguide-based display may include a grating coupler that includes multiple regions (or multiple multiplexed grating), where different regions of the grating coupler may have different angular selectivity characteristics (e.g., constructive interference conditions) for the incident display light such that, at any region of the waveguide-based display, diffraction light that would not eventually reach user's eyes may be suppressed (i.e., may not be diffracted by the grating coupler so as to be coupled into or out of the waveguide and thus may continue to propagate within the waveguide), while light that may eventually reach the user's eyes may be diffracted by the grating coupler and be coupled into or out of the waveguide.

FIG. 7B illustrates an example of a waveguide-based near-eye display where display light may be coupled out of a waveguide display 740 at different angles in different regions of the waveguide display according to certain embodiments. Waveguide display 740 may include a waveguide (e.g., a substrate), one or more input couplers 742, and one or more output couplers 744. Input couplers 742 may be configured to couple display light from different fields of view (e.g., viewing angles) into the waveguide, and output couplers 744 may be configured to couple display light out of the waveguide. The input and output couplers may include, for example, slanted surface-relief gratings or other types of gratings or reflectors. The output couplers may have different grating parameters and thus different angular selectivity characteristics at different regions of the output couplers. Thus, at each region of the output couplers, only display light that would propagate in a certain angular range towards the eyebox at eyebox position 790 of the near-eye display may be coupled out of the waveguide, while other display light may not meet the angular selectivity condition at the region and thus may not be coupled out of the waveguide. In some embodiments, the input couplers may also have different grating parameters and thus different angular selectivity characteristics at different regions of the input couplers, and thus, at each region of an input coupler, only display light from a respective field of view may be coupled into the waveguide. As a result, most of the display light coupled into the waveguide and propagating in the waveguide can be efficiently sent to the eyebox, thus improving the power efficiency of the waveguide-based near-eye display system.

The refractive index modulation of a slanted surface-relief grating, and other parameters of the slanted surface-relief grating, such as the grating period, the slant angle, the duty cycle, the depth, and the like, may be configured to selectively diffract incident light within a certain incident angular range (e.g., FOV) and/or a certain wavelength band at certain diffraction directions (e.g., within an angular range shown by field of view 730). For example, when the refractive index modulation is large (e.g., >0.2), a large angular bandwidth (e.g., >10°) may be achieved at the output couplers to provide a sufficiently large eyebox for the waveguide-based near-eye display system.

Figure 8A:
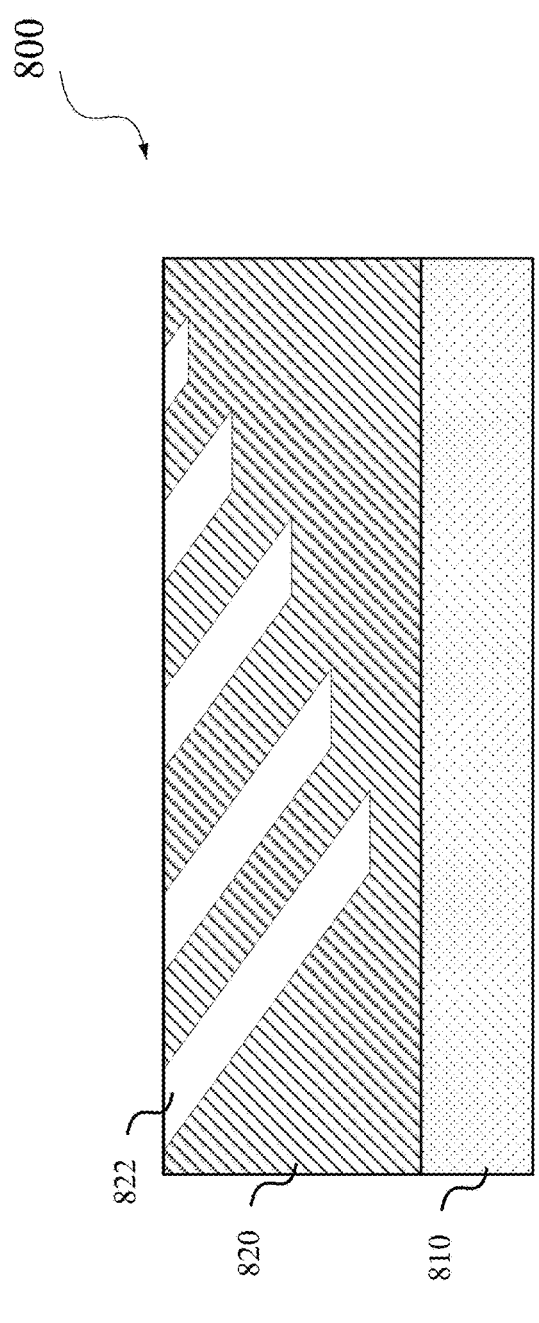
FIG. 8A illustrates an example of a slanted surface-relief grating with variable etch depths according to certain embodiments.

FIG. 8A illustrates an example of a slanted grating 800 with variable etch depths according to certain embodiments. Slanted grating 800 may include a substrate 810 (e.g., a glass substrate) and a grating layer 820 (e.g., a dielectric or polymer layer) formed on substrate 810. A plurality of grating grooves 822 may be etched or otherwise formed (e.g., imprinted) in grating layer 820. Grating grooves 822 may have non-uniform depths, widths, and/or separations. As such, slanted grating 800 may have variable grating periods, depths, and/or duty cycles.

Figure 8B:
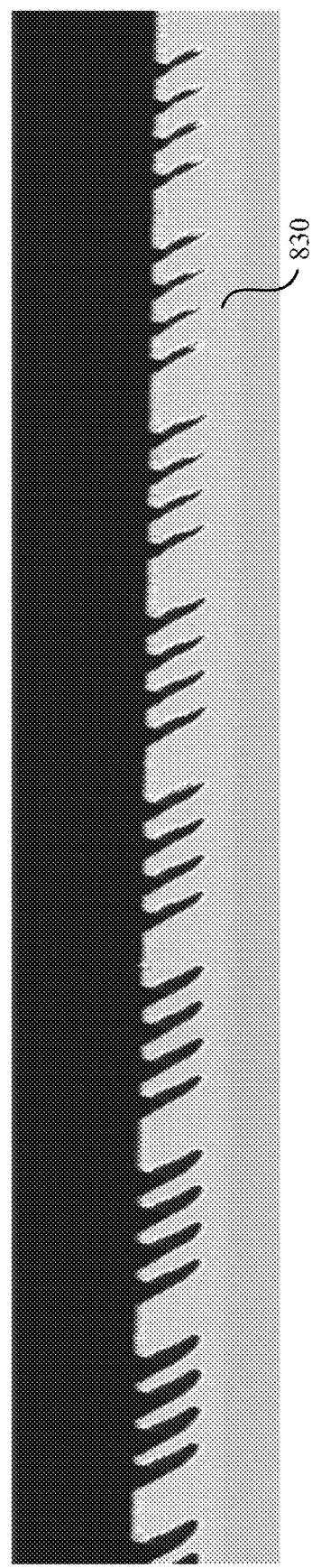
FIG. 8B illustrates an example of a slanted surface-relief grating with variable etch depths and variable duty cycles according to certain embodiments.

FIG. 8B illustrates an example of a slanted grating 805 with variable etch depths and duty cycles according to certain embodiments. In the example shown in FIG. 8B, slanted grating 805 may be etched in a dielectric layer 830, which may have a refractive index, for example, between about 1.46 and about 2.4. As illustrated, slanted grating 805 may have different etch depths and duty cycles at different regions. The grating period may also be different at the different regions. As such, different regions of slanted grating 805 may have different desire diffraction characteristics as described above with respect to, for example, FIG. 7B.

The surface-relief gratings with parameters and configurations (e.g., duty cycles, depths, or refractive index modulations) varying over the regions of the gratings described above and other surface-relief gratings (e.g., gratings used for eye-tracking) may be fabricated using many different nanofabrication techniques. The nanofabrication techniques generally include a patterning process and a post-patterning (e.g., over-coating) process. The patterning process may be used to form slanted ridges or grooves of the slanted grating. There may be many different nanofabrication techniques for forming the slanted ridges. For example, in some implementations, the slanted grating may be fabricated using lithography techniques including slanted etching. In some implementations, the slanted grating may be fabricated using nanoimprint lithography (NIL) molding techniques, where a master mold including slanted structures may be fabricated using, for example, slanted etching techniques, and may then be used to mold slanted gratings or different generations of soft stamps for nanoimprinting. The post-patterning process may be used to over-coat the slanted ridges and/or to fill the gaps between the slanted ridges with a material having a different refractive index than the slanted ridges. The post-patterning process (e.g., overcoating and planarization) may be independent from the patterning process. Thus, a same post-patterning process may be used on slanted gratings fabricated using any patterning technique.

Figure 9A:
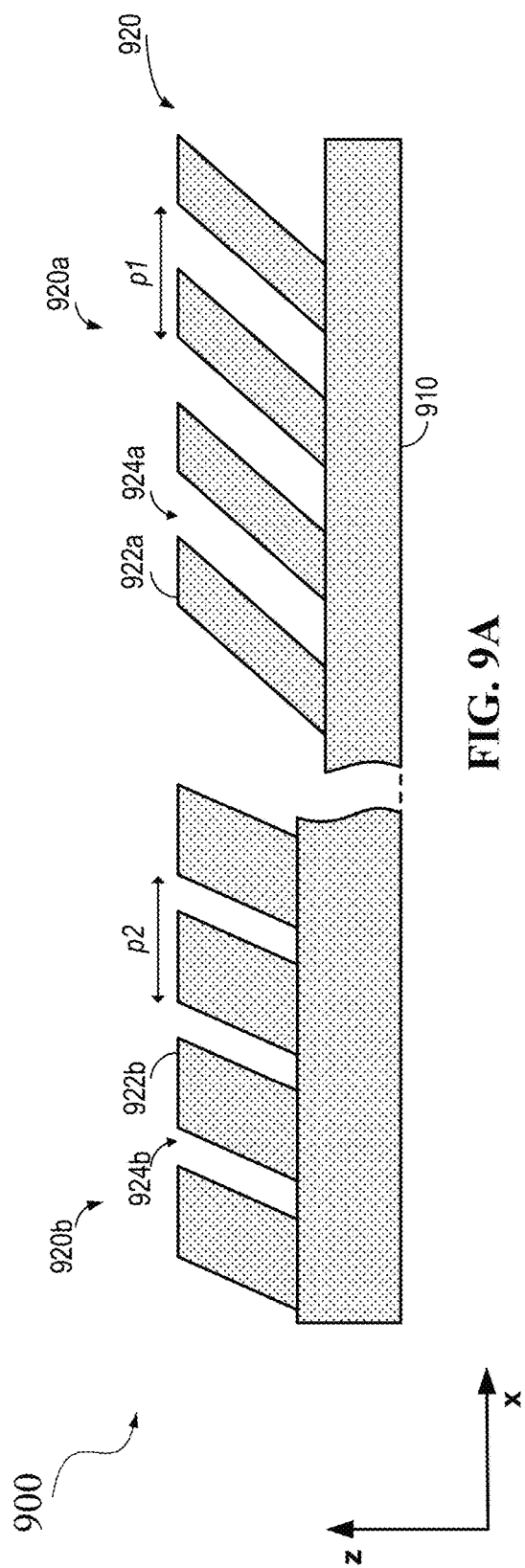
FIG. 9A illustrates an example of a slanted surface-relief grating in an example of a waveguide display according to certain embodiments.

FIG. 9A illustrates an example of a slanted surface-relief grating coupler in a waveguide display 900 according to certain embodiments. The waveguide display 900 may include slanted surface-relief structures, such as slanted surface-relief gratings 920 on a substrate 910 (e.g., a waveguide). As discussed above and also shown in FIG. 9A, the configuration of the slanted surface-relief gratings 920 may vary across substrate 910 so as to increase the coupling efficiency of the light to user's eyes. For example, some slanted gratings 920a may include a period $p_1$ that may be different from the period $p_2$ of other slanted gratings 920b. Period $p_1$ and period $p_2$ may be in the range of, for example, from less than about 100 nm to about a few micrometers. The height of ridges 922a and 922b, the depth of grooves 924a and 924b, and the slant angles of the leading edges and the trailing edges of ridges 922a and 922b may also vary. For example, the depths of the grating grooves may be in the ranges of a few nanometers to a few micrometers. The width of ridges 922a and 922b and/or the width of grooves 924a and 924b may vary as well, leading to varied duty cycles of slanted gratings 920a and 920b. The non-uniform configuration of slanted surface-relief gratings 920 may pose additional challenges to overcoat slanted surface-relief gratings 920 uniformly and/or to form a substantially planar top surface of the overcoat layer.

Figure 9B:
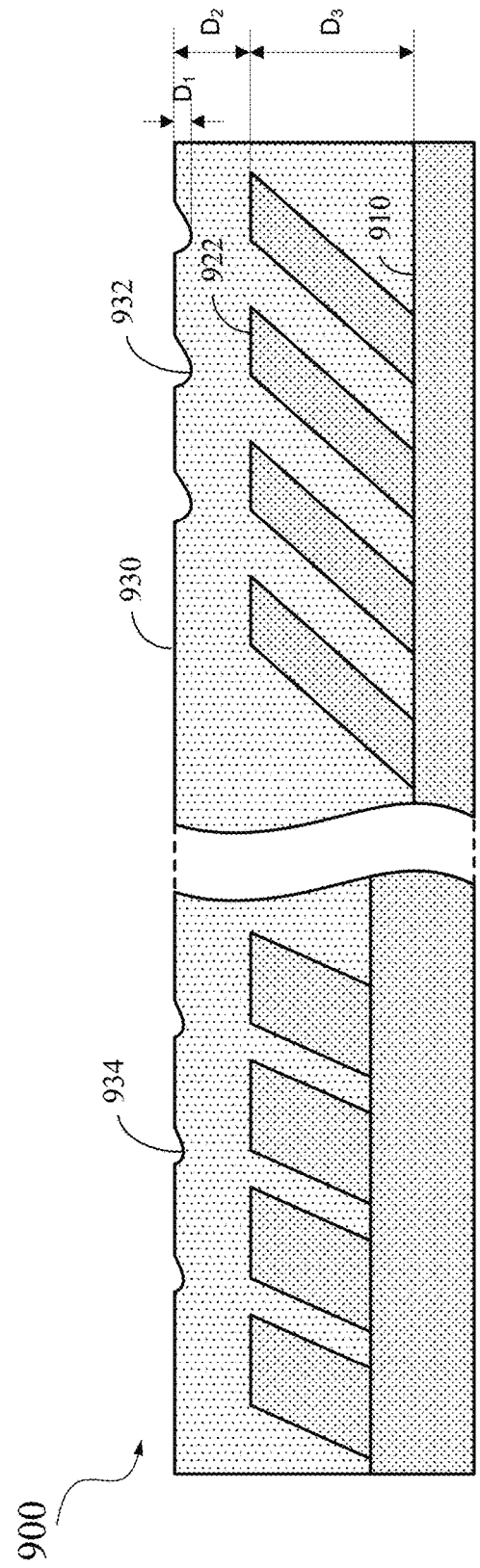
FIG. 9B illustrates an example of a slanted surface-relief grating with an overcoat layer.

FIG. 9B illustrates slanted surface-relief grating 920 of FIG. 9A with an overcoat layer 930. Due to the different grating parameters at different regions of slanted surface-relief grating 920, overcoat layer 930 formed using techniques such as spin-on or inkjet techniques may not have a flat top surface. The depth $D_1$ of surface recesses 932 and 934 and the peak-to-valley height of the top surface may vary depending on the structure of the slanted surface-relief gratings, such as the duty cycles of the slanted gratings, the width of the ridges and/or the grooves, the slant angles of the leading and trailing edges of the ridges, the depths $D_3$ of the grating grooves, and the like. For example, regions of slanted surface-relief grating 920 having a low etch depth and/or having a large duty cycle (and thus shallow and/or narrow grating grooves) may have a lower surface peak-to-valley height as shown by surface recesses 934, whereas regions of slanted surface-relief grating 920 having a high etch depth and/or having a small duty cycle (and thus deep and/or wide grating grooves) may have a higher surface peak-to-valley height as shown by surface recesses 932. In some embodiments, the overburden thickness $D_2$ may also vary across regions of slanted surface-relief grating 920. In some implementations, the depths $D_3$ of the grating grooves may be greater than or about 100 nm, greater than or about 150 nm, greater than or about 200 nm, greater than or about 250 nm, greater than or about 300 nm, or greater.

Figure 10:
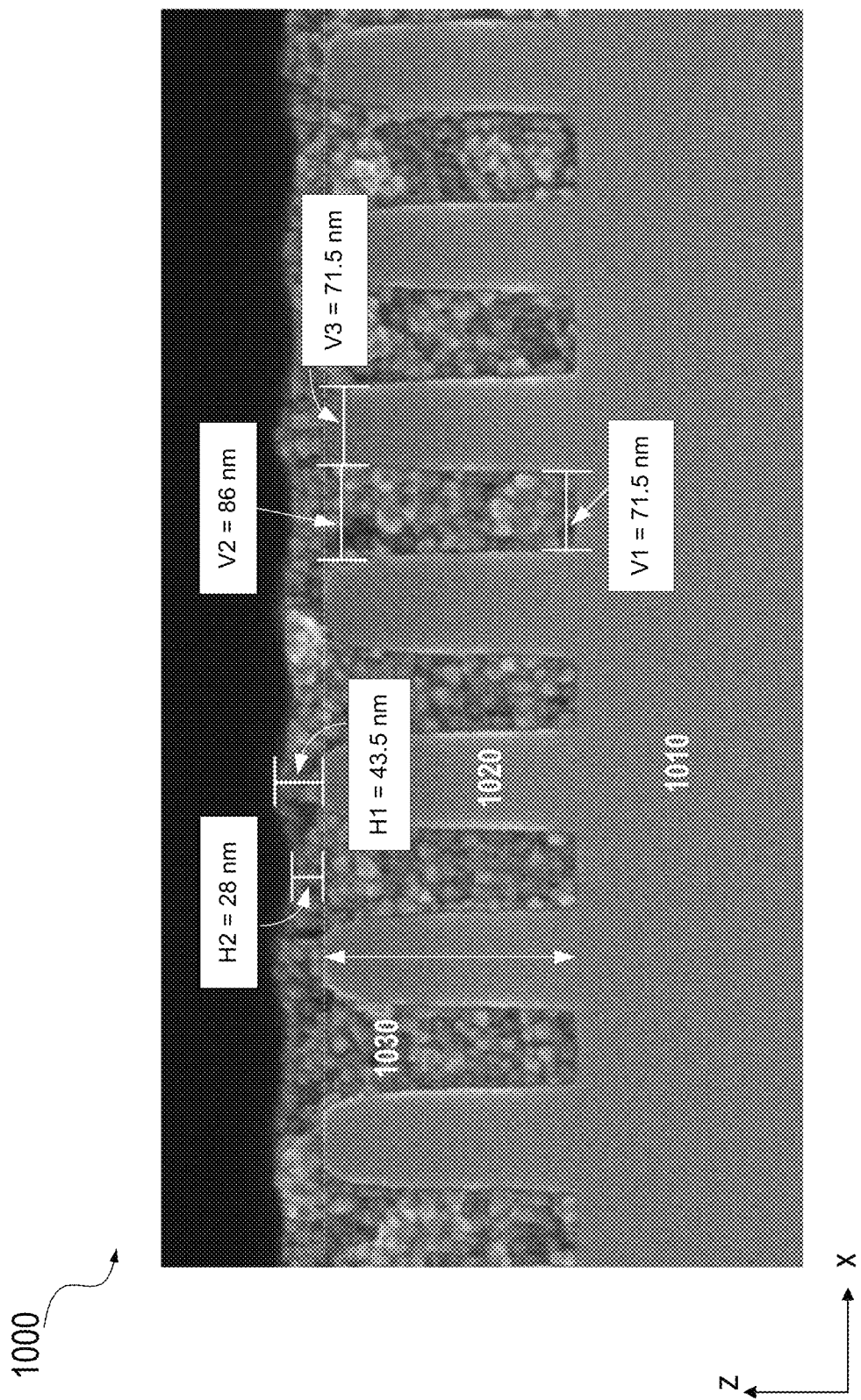
FIG. 10 is a cross-sectional view of an example of a surface-relief grating including an overcoat layer.

FIG. 10 is a cross-sectional view of an example of a surface-relief grating 1000 including an overcoat layer 1030. Surface-relief grating 1000 may include substantially vertical grating ridges 1020 etched or otherwise formed in a substrate 1010 (e.g., a waveguide described above). In the illustrated example, the grating period of surface-relief grating 1000 may be about 160 nm, the width of the grating grooves at the bottom may be about 70 nm, and the height of grating ridges 1020 (or the depth of the grating grooves) is greater than about 220 nm. Overcoat layer 1030 may include a nanoparticle-based material spun on or inkjeted on grating ridges 1020 and substrate 1010. The nanoparticle-based material may include high refractive index nanoparticles immersed in a base resin, and may have a high effective refractive index, such as greater than about 1.8 or 1.9, in order to increase the refractive index contrast between the grating ridges and overcoat layer 1030 for a better system performance. Overcoat layer 1030 may fill the grating grooves and may also be on top of grating ridges 1020. The nanoparticle-based material may have a low flowability or a high viscosity, and thus may not flow freely to achieve a flat top surface. Therefore, the top surface of overcoat layer 1030 may not be planar after the nanoparticle-based material is cured to crosslink the base resin. For example, in the example shown in FIG. 10, the thickness of the portion of overcoat layer 1030 above grating ridges 1020 may be about 43.5 nm in the regions of grating ridges 1020 and may be about 28 nm in the regions of the grating grooves. Thus, the surface peak-to-valley height may be greater than about 15 nm. In addition, the high refractive index nanoparticles in the nanoparticle-based material may have a linear dimension greater than about 10 or 15 nm. Thus, it may be difficult to achieve a low surface peak-to-valley height and/or a low overburden thickness using the nanoparticle-based material.

Figure 11:
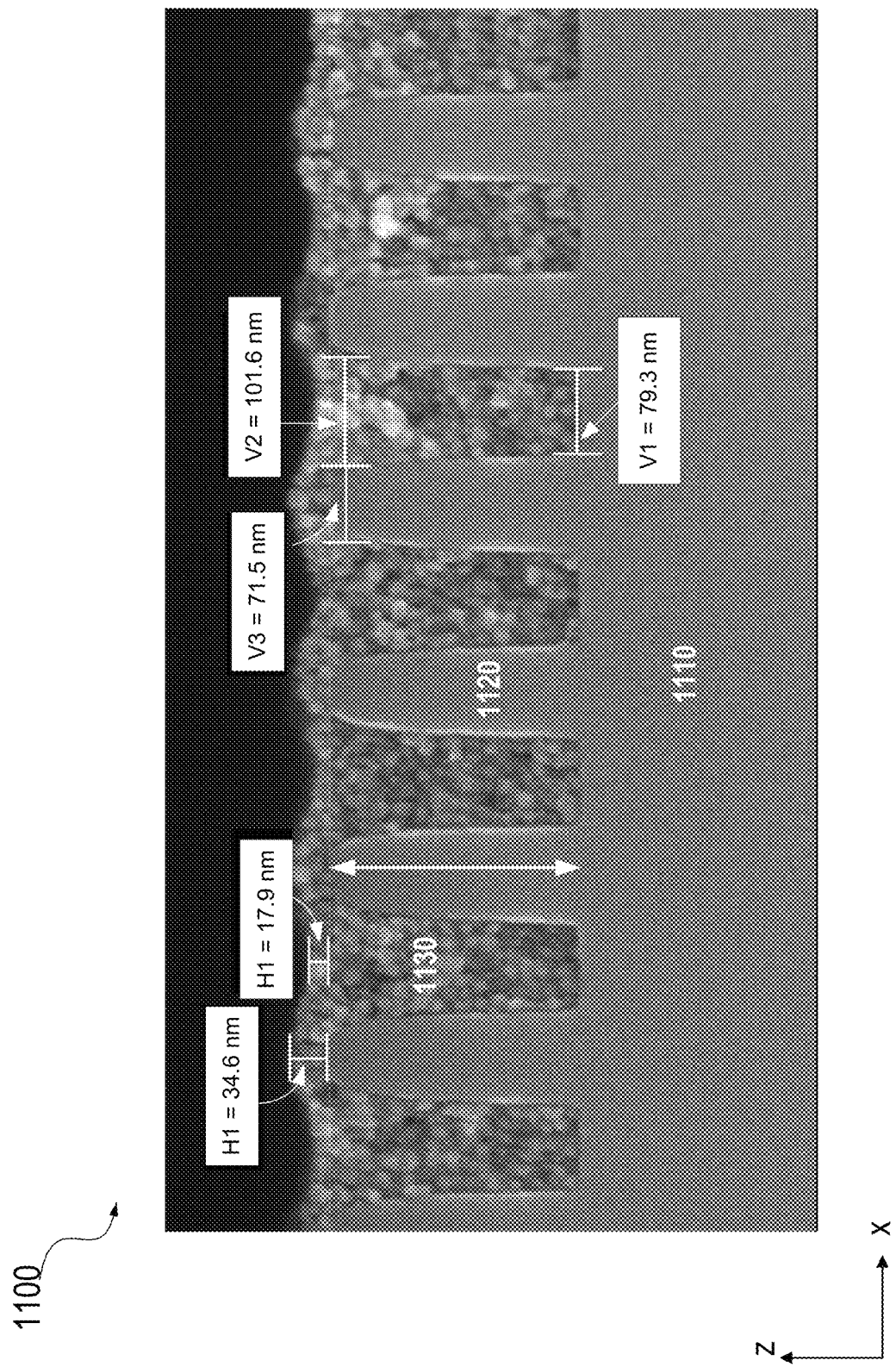
FIG. 11 is a cross-sectional view of another example of a surface-relief grating including an overcoat layer.

FIG. 11 is a cross-sectional view of another example of a surface-relief grating 1100 including an overcoat layer 1130. Surface-relief grating 1100 may include substantially vertical grating ridges 1120 etched or otherwise formed in a substrate 1110 (e.g., a waveguide described above). In the illustrated example, the grating period of surface-relief grating 1100 may be about 170 nm, the width of the grating grooves at the bottom of the grating grooves may be about 80 nm, and the height of grating ridges 1120 (or the depth of the grating grooves) is greater than about 220 nm. Overcoat layer 1130 may include a nanoparticle-based material spun on or inkjeted on grating ridges 1120 and substrate 1110. The nanoparticle-based material may include high refractive index nanoparticles immersed in a base resin, and may have a high effective refractive index, such as greater than about 1.8 or 1.9, in order to increase the refractive index contrast between the grating ridges and overcoat layer 1030 for a better system performance. Overcoat layer 1130 may fill the grating grooves and may also be on top of grating ridges 1120. The nanoparticle-based material may have a low flowability or a high viscosity, and thus may not flow freely to achieve a flat top surface. Therefore, the top surface of overcoat layer 1130 may not be planar after the nanoparticle-based material is cured to crosslink the base resin. For example, in the example shown in FIG. 11, the thickness of the portion of overcoat layer 1130 above grating ridges 1120 (i.e., the overburden) may be about 35 nm in the regions of grating ridges 1120 and may be about 18 nm in the regions of the grating grooves. Thus, the surface peak-to-valley height may be greater than about 17 nm. As described above, the high refractive index nanoparticles in the nanoparticle-based material may have a linear dimension greater than about 10 or 15 nm. Thus, it may be difficult to achieve a low surface peak-to-valley height and/or a low overburden thickness using the nanoparticle-based material.

Figure 12:
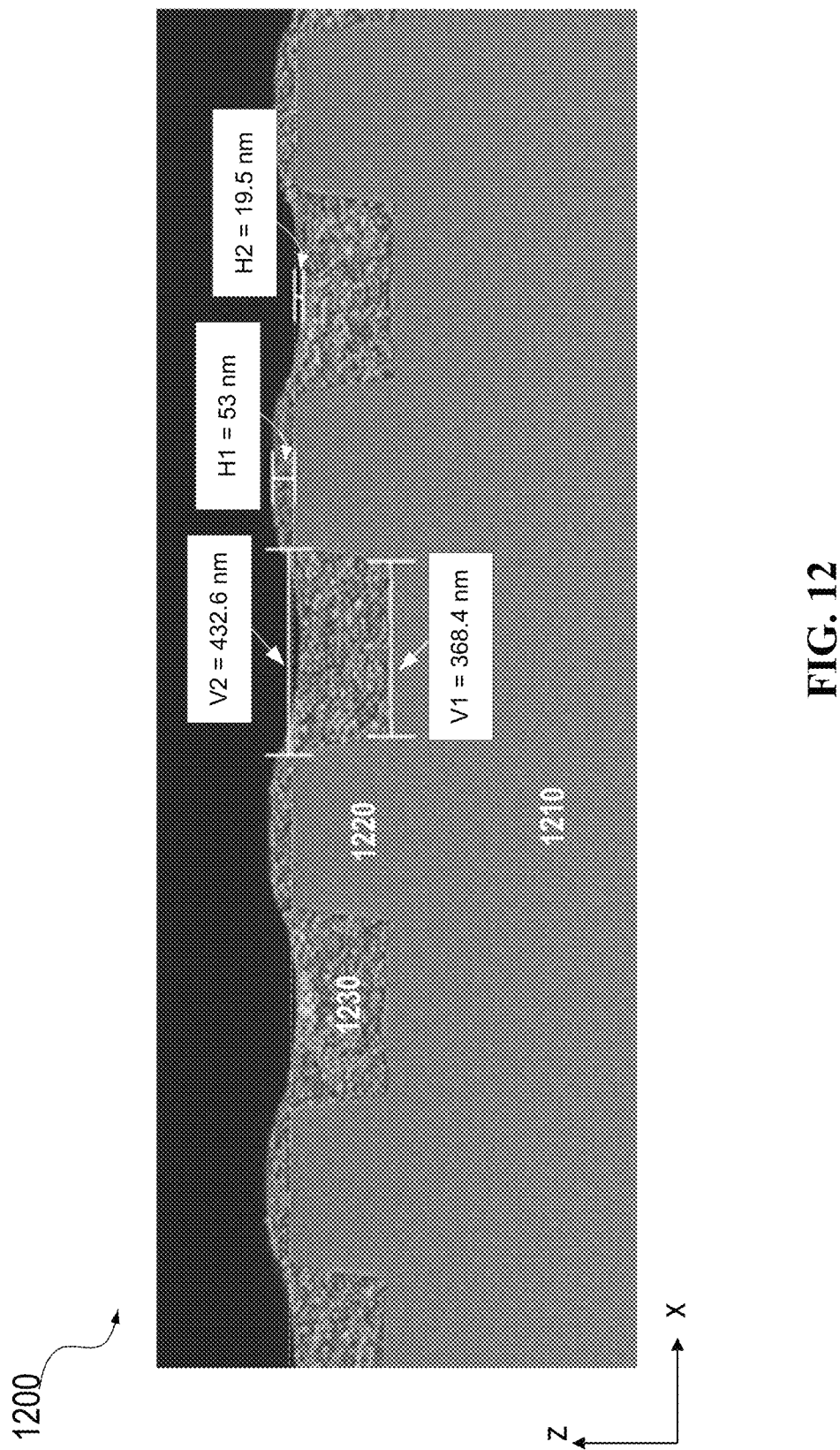
FIG. 12 is a cross-sectional view of another example of a surface-relief grating including an overcoat layer.

FIG. 12 is a cross-sectional view of another example of a surface-relief grating 1200 including an overcoat layer 1230. Surface-relief grating 1200 may include substantially vertical grating ridges 1220 etched or otherwise formed in a substrate 1210 (e.g., a waveguide described above). In the illustrated example, the grating period of surface-relief grating 1200 may be about 800 nm, the width of the grating grooves at the bottom may be about 368 nm, and the height of grating ridges 1220 (or the depth of the grating grooves) is greater than about 200 nm. Overcoat layer 1230 may include a nanoparticle-based material spun on or inkjeted on grating ridges 1220 and substrate 1210. The nanoparticle-based material may include high refractive index nanoparticles immersed in a base resin, and may have a high effective refractive index, such as greater than about 1.8 or greater than about 1.9, in order to increase the refractive index contrast between the grating ridges and overcoat layer 1230 for a better system performance. Overcoat layer 1230 may fill the grating grooves and may also be on top of grating ridges 1220. As described above, the nanoparticle-based material may have a low flowability or a high viscosity, and thus may not flow freely to achieve a flat top surface. Therefore, the top surface of overcoat layer 1230 may not be flat after the nanoparticle-based material is cured to crosslink the base resin. For example, in the example shown in FIG. 12, the thickness of the portion of overcoat layer 1230 above grating ridges 1220 may be about 53 nm in the regions of grating ridges 1220 and may be about −20 nm (below the top surfaces of grating ridges 1220) in the regions of the grating grooves. Thus, the surface peak-to-valley height of overcoat layer 1230 may be greater than about 70 nm, which is much larger than the peak-to-valley height of the overcoat layer in surface-relief grating 1000 or 1100 where the width of grating grooves is smaller.

Thus, the thickness of the resultant overcoat layer applied on a surface-relief structure using spin-on techniques or other deposition techniques may vary across the surface-relief structure, and the top surface of the overcoat layer may not be planar because the deposited material may follow the topography of the underlying surface-relief structures, which may have varying slant angles, duty cycles, depths, and the like. For example, the top surface of the overcoat layer at grating grooves may be lower than the top surface of the overcoat layer at grating ridges. The uneven surface of the overcoat layer may degrade the performance of the surface-relief grating, such as causing stray light, reducing the coupling efficiency, increasing display leakage, and the like. In many artificial reality applications, it may be desirable to precisely control the thickness and the surface roughness of the overcoat layer to improve the performance of the surface-relief grating and the display system. For example, it may be desirable that the thickness of the overburden of the overcoat layer (e.g., the portion of the overcoat layer above the grating ridges) is low, such as less than about less than about 50 nm, less than about 30 nm, or less than about 20 nm, and the surface peak-to-valley height is less than about 5 nm (e.g., less than about 4 nm, less than about 3 nm, or less than about 2 nm). It can be challenging to achieve a uniform overcoat layer when the surface to be coated include some surface-relief structures (e.g., surface-relief gratings) formed thereon, and it may be even more difficult to achieve a uniform overcoat layer when the configuration of the surface-relief structures is non-uniform across the surface, or when some surfaces are shadowed by other surfaces and/or structures.

Some techniques, such as chemical mechanical polishing (CMP) techniques or etching techniques (e.g., slanted etching or gray scale etching), may be used to planarize the top surface of the overcoat layer on the surface-relief grating. However, the CMP techniques may not precisely control the thickness of the overcoat layer on top of the surface-relief grating (the overburden). In addition, CMP may not achieve the desired results (e.g., with surface peak-to-valley height less than about 5 nm) for hybrid overcoat materials that include organic materials mixed with nanoparticles (e.g., having a linear dimension greater than about 10 nm to about 15 nm, which is greater than the desired surface peak-to-valley height or surface roughness), and may also increase the complexity and the cost. Etching techniques may not precisely control the thickness of the overburden either. In addition, the etching process may not properly etch hybrid overcoat materials that include organic materials mixed with nanoparticles. For example, the nanoparticles and other residues may accumulate at the etched surface.

According to certain embodiments, a first resin material that includes a base resin, nanoparticles, a crosslink initiator, and/or a solvent may be dispensed on the surface-relief grating by, for example, spin-on coating or inkjet printing. The first resin material may have a high refractive index, such as greater than about 1.8, greater than about 1.9, greater than about 2.0, or greater than about 2.05. The amount of the first resin material dispensed on the surface-relief grating may be determined based on the dimensions of the grating grooves. In some surface-relief gratings, the grating parameters may be non-uniform across an area of the surface-relief grating, and thus different amounts of first resin material may need to be dispensed at different regions of a surface relief grating. The dispensed first resin material may or may not cover the top of the grating ridges. In some embodiments, the dispensed first resin material may be baked to remove the solvent and/or trapped air (e.g., bubbles) in the first resin material (e.g., in the grating grooves). The overcoat layer may then be cured (e.g., using UV light) to crosslink and fix the base resin in the first resin material to form a first overcoat layer. The top surface of the first overcoat layer may not be flat. A second resin material having a lower viscosity and a higher flowability may be dispensed over the first overcoat layer. The second resin material may include a base resin, and fewer and/or smaller nanoparticles or no nanoparticles (and thus smaller grains and better mobility), and may have a refractive index close to but lower than that of the first resin material. For example, the refractive index of the second resin material may be greater than about 1.4, such as greater than about 1.5, or greater than about 1.7. The amount of the second resin material dispensed on the first overcoat layer may be determined based on the height profile of the first overcoat layer (or dimensions of the grating grooves) and the desired thickness of the overburden. The second resin material may be thermally annealed to allow the second resin material to flow and form a flat top surface. The second resin material may then be cured to crosslink and fix the base resin in the second resin material to form a second overcoat layer that has a planarized top surface. In some embodiments, the thickness of the overcoat layer on top of the grating ridges may be equal to or less than about 50 nm, less than about 30 nm, or thinner. A surface peak-to-valley height of the top surface of the second overcoat layer may be equal to or less than about 5 nm or lower.

Figure 13A:
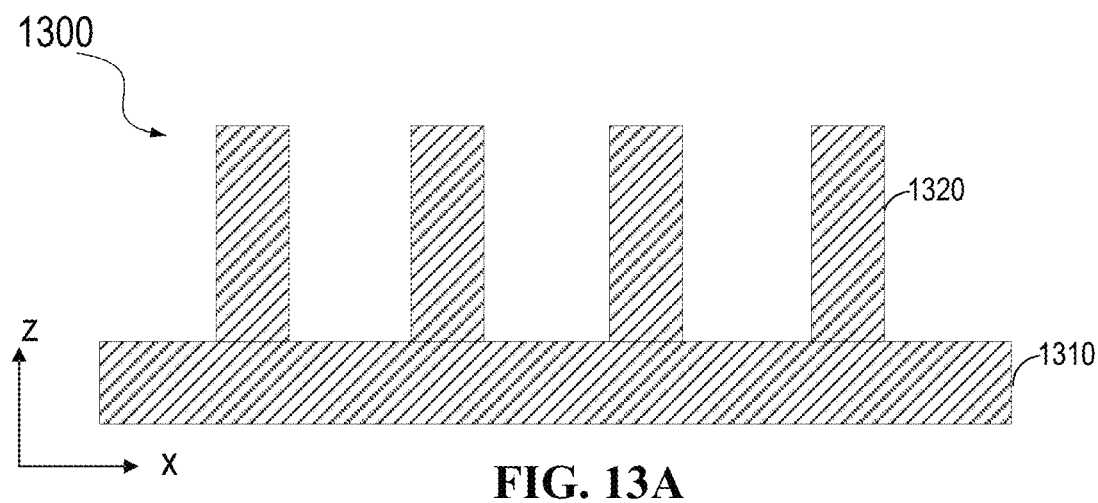
FIGS. 13A-13C illustrate an example of a method of forming a planarized overcoat layer on a surface-relief grating according to certain embodiments.
Figure 13B:
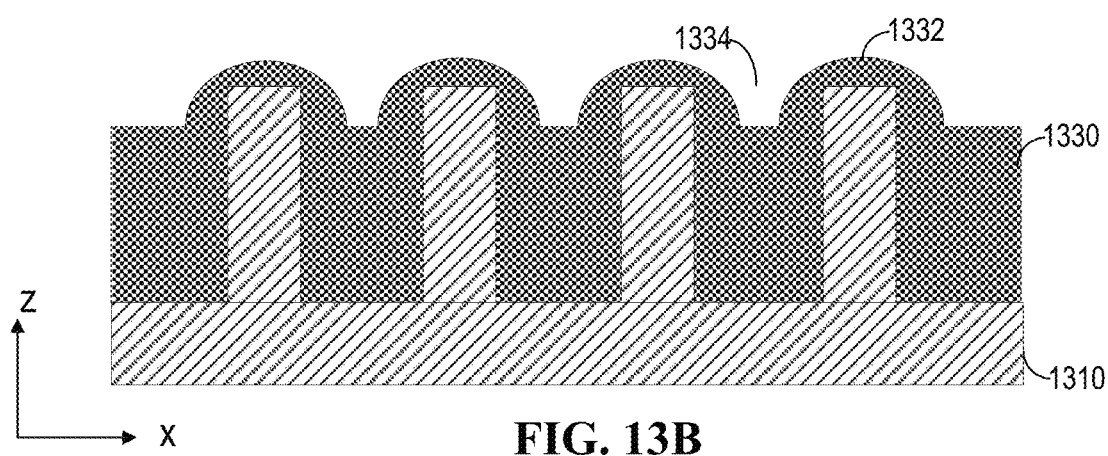
Figure 13C:
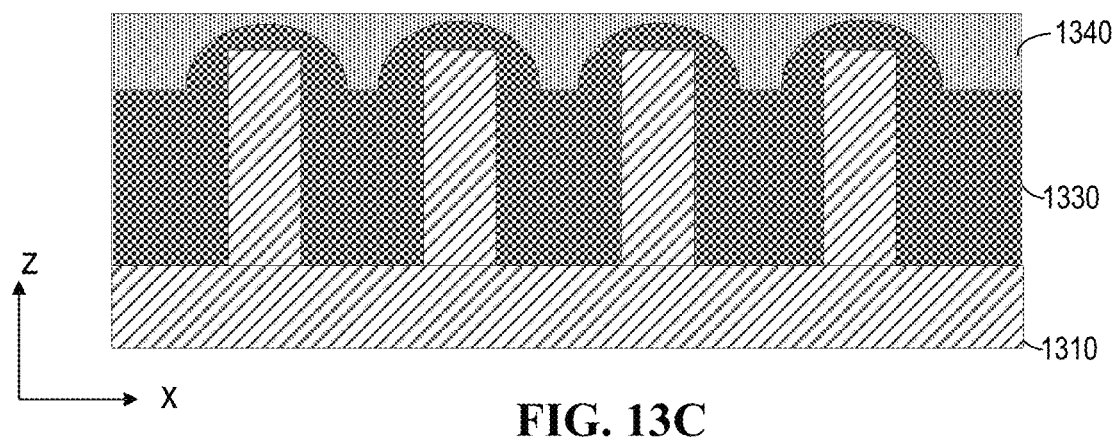

FIGS. 13A-13C illustrate an example of a method of forming a planarized overcoat layer on a surface-relief grating according to certain embodiments. FIG. 13A shows a surface-relief grating 1300 that includes a plurality of grating ridges 1320 formed in a grating material layer 1310 (e.g., a substrate or a material layer formed on a substrate). As described above, grating material layer 1310 may include, for example, silicon containing materials (e.g., $SiO_2$, $Si_3N_4$, SiC, $SiO_xN_y$, or amorphous silicon), organic materials (e.g., spin on carbon (SOC) or amorphous carbon layer (ACL) or diamond like carbon (DLC)), inorganic metal oxide layers (e.g., $TiO_x$, $AlO_x$, $TaO_x$, $HfO_x$, $NbO_x$, etc.), or the like. Even though FIG. 13A shows uniform, substantially vertical grating ridges 1320, in some embodiments, surface-relief grating 1300 may be slanted gratings and/or may have grating parameters (e.g., period, duty cycle, depth, slant angle, etc.) that may vary across the grating. For example, the period of surface-relief grating 1300 may be in the range of tens of nanometers to a few micrometers, and may vary from one area to another on surface-relief grating 1300, or may vary from one period to another (i.e., chirped) on surface-relief grating 1300. Surface-relief grating 1300 may have a duty cycle ranging, for example, from about 10% to about 90% or greater. In some embodiments, the duty cycle may vary from period to period or from region to region. In some embodiments, the depth of the grating grooves or the height of grating ridges 1320 may vary across the grating and may be greater than about 50 nm, 100 nm, 200 nm, 300 nm, 400 nm, or higher. The slant angles of the leading edges of grating ridges 1320 and the slant angles of the trailing edges of grating ridges 1320 with respect to a surface normal direction of grating material layer 1310 (e.g., z direction) may vary across the grating and may be greater than about 10°, 20°, 30°, 45°, 60°, or higher. In some embodiments, the leading edge and training edge of each grating ridge of grating ridges 1320 may be parallel to each other. In some embodiments, the difference between the slant angle of the leading edge of a grating ridge 1320 and the slant angle of the trailing edge of the grating ridge 1320 may be less than 20%, 10%, 5%, 1%, or less.

FIG. 13B shows a first overcoat layer 1330 deposited on surface-relief grating 1300 according to certain embodiments. Techniques for forming first overcoat layer 1330 on surface-relief grating 1300 may include, for example, spin-coating a layer of a first resin material on the surface-relief grating, or dispensing a plurality of drops of the first resin material on the surface-relief grating. In some embodiments, the plurality of grating grooves may have at least one of a non-uniform depth, a non-uniform pitch, a non-uniform width, or a non-uniform slant angle, where dispensing the layer of the first resin material on the surface-relief grating may include dispensing different amounts of the first resin material on two or more different regions the surface-relief grating, for example, inkjeting techniques.

In some embodiments, the first resin material may be curable by electromagnetic (e.g., UV or visible light) or thermal radiation. The first resin material may include a base resin that may be crosslinked or polymerized. In some embodiments, the first resin material may include a mixture of one or more resins. In some embodiments, the first resin material may include certain additives (e.g., for modifying the properties of the resin material) and/or a solvent (e.g., for facilitating the mixing of the various components and/or changing the flowability or viscosity of the first resin material). The additives may include, for example, nanoparticles for changing the refractive index of the first resin material. In some embodiments, the first resin material may be made by mixing various components, such as one or more resins, nanoparticles, one or more radical and/or acid generators, one or more crosslinking agents, one or more optional additives, and/or one or more solvents, at least some of which may be solid at room temperature prior to the mixing. The mixture may become liquid or flowable at room temperature.

In some embodiments, the first resin material may include a base resin, nanoparticles with ligands decoration, and a solvent blend including one or more solvents. The base resin may be cured by electromagnetic or thermal radiation to crosslink or polymerize. In some embodiments, the base resin may include, for example, a high refractive index resin (e.g., an acrylate or epoxy resin), a crosslinker, a surface cure modifier, a fluorinated additive, a photo-initiator, or a combination thereof. The high refractive index resin may have a refractive index between about 1.6 and about 1.8, such as about 1.7. The type and/or number of nanoparticles that have high refractive indices in the first resin material may be selected to tune the index of first resin material to, for example, greater than about 1.8 or greater than about 1.9. When the first resin material include more nanoparticles, the refractive index of the first resin material may be higher and the flowability of the first resin material may be lower. The solvent blend may be used to mix the base resin and the nanoparticles and improve the flowability of the first resin material.

In one example, the base resin of the first resin material may include an acrylate resin including a photo radical generator or a thermal radical generator and having a refractive index about 1.7. The photo radical generator may include a photo-initiator that creates reactive species (e.g., free radicals, cations, or anions) when exposed to radiation (e.g., UV or visible light). The photo-initiator may include, for example, Diphenyl(2,4,6 trimethylbenzoyl)phosphine oxide and/or 2-Hydroxy-2-methylpropiophenone. The nanoparticles may include, for example, about 90 weight percentage (90 wt. %) loading of $TiO_x$, $ZrO_x$, and/or $NbO_x$ nanoparticles with acrylate and/or non-functional ligands decoration. The solvent may include, for example, propylene glycol methyl ether acetate (PGMEA) or dipropylene glycol methyl ether. In some embodiments, the solvent may have a boiling point greater than about 160° C. The nanoparticles may be dispersed in the PGMEA solvent.

In another example, the base resin may include an epoxy resin with a photo acid generator or thermal acid generator and having a refractive index between about 1.6 and about 1.8. The photo acid generator may initiate cationic photo-polymerization and may include, for example, triphenylsulfonium triflate or other triflates. The nanoparticles may include TiOx nanoparticles with epoxy and non-functional ligands. The solvent may include, for example, propylene glycol methyl ether acetate (PGMEA) or dipropylene glycol methyl ether. In some embodiments, the solvent may have a boiling point greater than about 160° C. The nanoparticles may be dispersed in the PGMEA solvent. Many other base resin, nanoparticles, and solvent may be used in the second resin material. More examples of the base resin, nanoparticles, and the solvent that may be used in the first resin material are described below.

After the deposition, the first resin material may be cured to crosslink or polymerize the base resin and form first overcoat layer 1330 on surface-relief grating 1300. In some embodiments, the base resin may be light-sensitive and may undergo a process upon exposure to light (e.g., UV or visible light) that may change one or more properties of the base resin. In some embodiments, the base resin may undergo a crosslinking and/or polymerizing process that hardens the base resin upon exposure to light. In some embodiments, the base resin may be chemically curable, heat curable, electron beam curable, and/or light curable.

In some embodiments, the base resin may be cured for a duration that is between 1 second and 10 seconds, between 10 seconds and 30 seconds, between 30 seconds and 1 minute, between 1 minute and 2 minutes, between 2 minutes and 5 minutes, between 5 minutes and 10 minutes, between 10 minutes and 30 minutes, between 30 minutes and 1 hour, or more than 1 hour. In some embodiments, the base resin is cured for about 10 seconds, about 20 seconds, about 30 seconds, about 40 seconds, about 50 seconds, or about 1 minute.

In some embodiments, the curing may be performed at room temperature (e.g., between 15 and 25° C.). In some alternative embodiments, heat may be applied to the first resin material and/or to the substrate during the curing (e.g., crosslinking or polymerization) of the first resin material. In some embodiments, the curing may be performed at a temperature between 25 and 40° C., between 40 and 80° C., between 80 and 120° C., between 120 and 200° C., or higher than 200° C. In some embodiments, the curing may be performed at a temperature between 100° C. and 150° C., between 100° C. and 140° C., or between 110° C. and 140° C. In some embodiments, thermal treatment may be additionally implemented so as to reduce the viscosity of the first resin material to facilitate the flow of the first resin material on the surface-relief grating.

In the example shown in FIG. 13B, due to the underlying surface-relief structure, the limit flowability of the first resin material, and the nanoparticles in the first resin material, the top surface of first overcoat layer 1330 may not be flat after the curing. For example, the top surface of first overcoat layer 1330 may have peaks in regions 1332 corresponding to grating ridges 1320 and may have valleys in regions 1334 corresponding to grating grooves.

FIG. 13C show a second overcoat layer 1340 formed on first overcoat layer 1330 according to certain embodiments. Techniques for forming second overcoat layer 1340 on first overcoat layer 1330 may include, for example, spin-on coating or inkjeting a layer of a second resin material on first overcoat layer 1330. In some embodiments, regions 1334 may have at least one of a non-uniform depth, a non-uniform pitch, or a non-uniform width, where dispensing the layer of the second resin material on the surface-relief grating may include dispensing different amounts of the second resin material on two or more different regions of the first overcoat layer. The amount of the second resin material dispensed on the first overcoat layer may be determined based on the height profile of the first overcoat layer (or dimensions of the grating grooves) and/or the desired thickness of the overburden.

The second resin material may include a high flowability curable resin material that includes a base resin, fewer and/or smaller (or no) nanoparticles, and a solvent blend. The base resin may be similar to the base resin used in the first resin material. The second resin material may have a refractive index close to but lower than that of the first resin material. For example, the refractive index of the second resin material may be greater than 1.4, such as greater than about 1.5, or greater than about 1.7. The second resin material may have smaller grains and/or a lower viscosity (or a higher flowability). For example, the second resin material may have a room temperature viscosity less than about 400 cps, less than about 200 cps, less than about 100 cps, less than about 60 cps, less than about 50 cps, less than about 40 cps, less than about 30 cps, less than about 20 cps, less than about 10 cps, less than about 5 cps, less than about 4 cps, less than about 3 cps, less than about 2 cps, or less than about 1 cps.

In one example, the second resin material may include an epoxy resin (e.g., grade PG-100 fluorene epoxy resin) with a refractive index about 1.6 or greater and linked with a photo acid generator (e.g., CPI-310B that may generates a low corrosive borate anion), and a solvent blend including one or more solvents having a boiling point greater than about 160° C., such as dipropylene glycol methyl ether. In another example, the second resin material may include an acrylate resin with a photo radical generator and a solvent blend. Many other base resin, nanoparticles (if used), and solvent may be used in the second resin material as described below.

In some embodiments, the second resin material may be thermally annealed at between about 100° C. to about 250° C. for about 1 minute to about 30 minutes, such as at about 200° C. for about 2 minutes, to allow the second resin material to flow and form a flat top surface. The second resin material may then be cured (e.g., using UV light or heat) to crosslink and fix the base resin in the second resin material to form second overcoat layer 1340 that has a planar top surface. In some examples, the thickness of the overcoat layer (including first overcoat layer 1330 and second overcoat layer 1340) on top of grating ridges 1320 (i.e., the overburden) may be equal to or less than about 50 nm, less than about 30 nm, less than about 20 nm, or thinner. The surface peak-to-valley height of the top surface of the overcoat layer (e.g., the second overcoat layer) may be equal to or less than about 5 nm, less than about 4 nm, less than about 3 nm, less than about 2 nm, or lower.

Event though not shown in FIGS. 13A-13C, in some embodiments, a third resin material have a higher flowability may be applied on second overcoat layer 1340 and may be annealed and/or cured to form a thin third overcoat layer with a top surface having an even lower surface peak-to-valley height or surface roughness.

Figure 14:
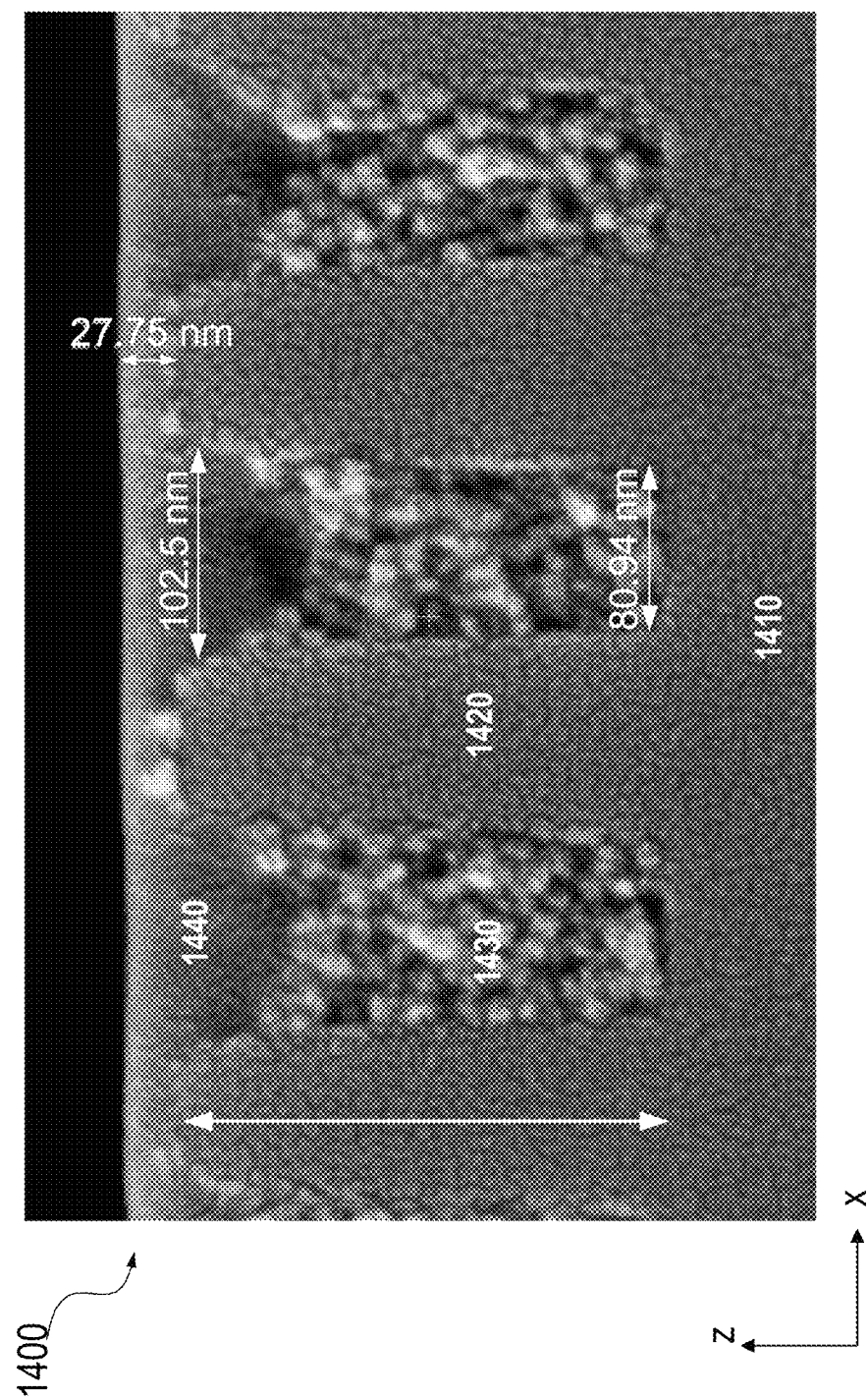
FIG. 14 is a cross-sectional view of an example of a surface-relief grating including a planarized overcoat layer according to certain embodiments.

FIG. 14 is a cross-sectional view of an example of a surface-relief grating 1400 including a planarized overcoat layer according to certain embodiments. Surface-relief grating 1400 may be fabricated using the process described above with respect to FIGS. 13A-13C and materials described above and below. Surface-relief grating 1400 may include substantially vertical grating ridges 1420 etched or otherwise formed in a grating material layer 1410 (e.g., a substrate or a material layer formed on the substrate). In one example, grating material layer 1410 may include $SiO_2$ and may have a refractive index between about 1.4 and 1.7, such as about 1.5 or about 1.6. In another example, grating material layer 1410 may have a refractive index between about 2.4 and about 2.8. In the illustrated example, the grating period of surface-relief grating 1400 may be about 180 nm, the width of a grating groove at the bottom may be about 80 nm, and the height of grating ridges 1420 (or the depth of the grating grooves) may be about 250 nm. Surface-relief grating 1400 may include an overcoat layer that includes a first overcoat layer 1430 and a second overcoat layer 1440.

First overcoat layer 1430 may include a first resin material that has been cured and may at least partially fill the grating grooves. In some embodiments, first overcoat layer 1430 may include some first resin material on top of grating ridges 1420. As described above and below, the first resin material may include a base resin and nanoparticles that have high refractive indices, and thus first overcoat layer 1430 may have a high refractive index, such as greater than about 1.8 or 1.9, which may help to achieve a lower refractive index contrast in surface-relief gratings made of high-index materials. As described above, the first resin material may have a low flowability after solvent evaporation with high viscosity (e.g., >1000 cps) such that the first resin material on grating material layer 1410 may not be able to move even within a small region, such as between about tens and about hundreds of nanometers. The base resin in the first resin material may be optically or thermally cured to crosslink or polymerize and form first overcoat layer 1430. The nanoparticles may have a refractive index between about 1.7 and about 3.4, between about 1.75 and about 3.4, or between about 1.8 and about 3.4. The nanoparticles may have a linear dimension about a few nanometers, a few tens of nanometers, or a few hundreds of nanometers. In the illustrated example, the nanoparticles may have a linear dimension between about 10 nm and about 15 nm. As shown by the illustrated example, the top surface of first overcoat layer 1430 may not be flat.

Second overcoat layer 1440 may be formed by depositing a second resin material as described above and below on first overcoat layer 1430, and annealing and curing the second resin material. The second resin material may include a base resin in a solvent blend. The second resin material may have a refractive index close to but lower than that of the first resin material. For example, the refractive index of the second resin material may be greater than 1.4, such as greater than about 1.5, greater than about 1.6, or greater than about 1.7. The second resin material may not include nanoparticles with higher refractive indices, or may include fewer and/or smaller nanoparticles than the first resin material. The second resin material may have small grains, a lower viscosity, and a higher flowability. For example, the second resin material may have a viscosity less than about 400 cps, less than about 200 cps, less than about 100 cps, less than about 60 cps, less than about 50 cps, less than about 40 cps, less than about 30 cps, less than about 20 cps, less than about 10 cps, less than about 5 cps, less than about 4 cps, less than about 3 cps, less than about 2 cps, or less than about 1 cps. As described above, second overcoat layer 1440 may be annealed at an elevated temperature such that the second resin material may be allowed to flow and form a planar top surface, and may then be cured to crosslink or polymerize to form second overcoat layer 1440. In the illustrated example, the overburden of the overcoat layer (including second overcoat layer 1440 and/or first overcoat layer 1430) on surface-relief grating 1400 may be about 28 nm, and the top surface of second overcoat layer 1440 is substantially planar. For example, the surface unevenness may be less than about 5 nm, less than about 3 nm, less than about 2 nm, or lower. A thinner overburden may be achieved by, for example, dispensing less second overcoat material.

Figure 15:
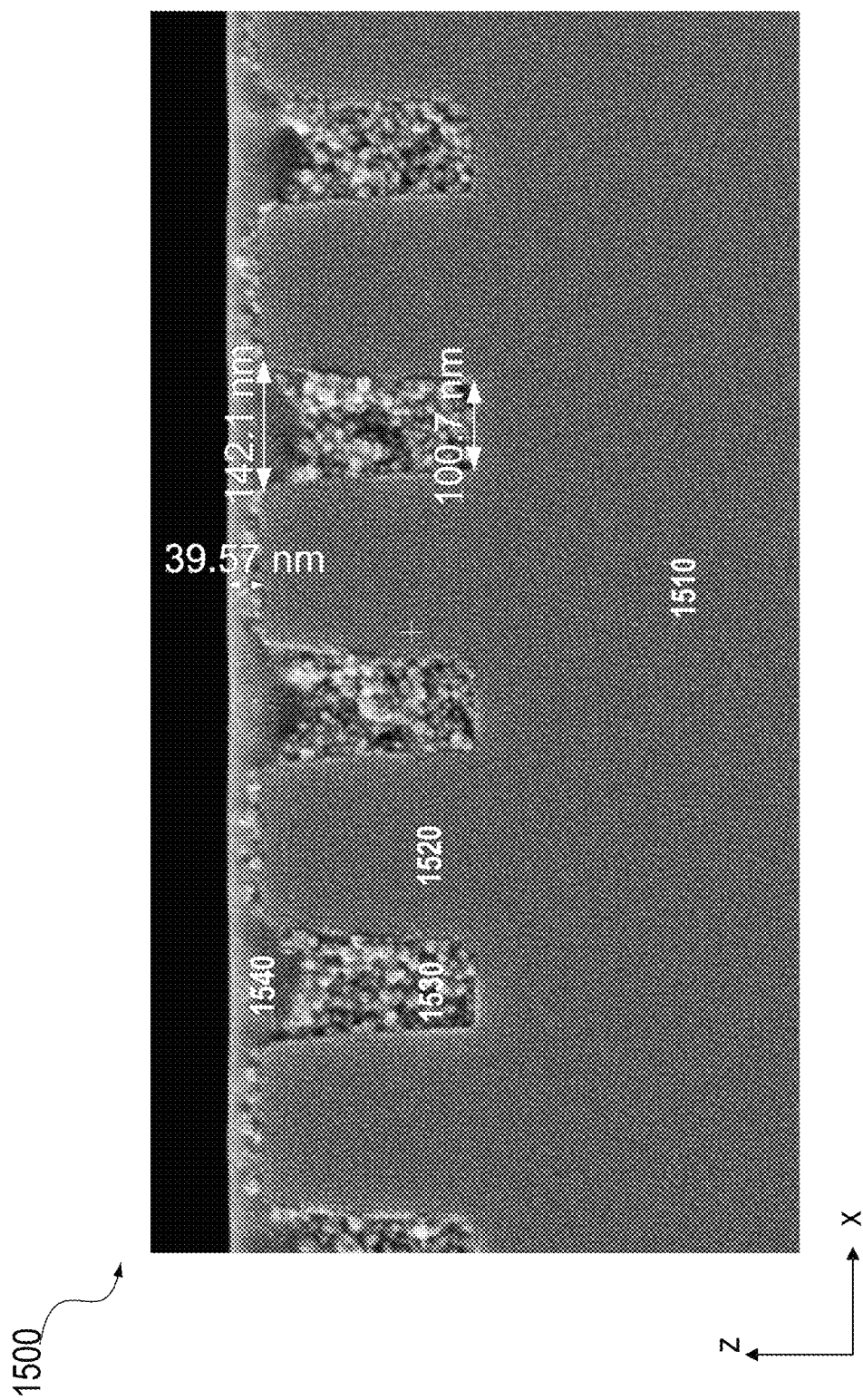
FIG. 15 is a cross-sectional view of another example of a surface-relief grating including a planarized overcoat layer according to certain embodiments.

FIG. 15 is a cross-sectional view of another example of a surface-relief grating 1500 including a planarized overcoat layer according to certain embodiments. Surface-relief grating 1500 may be fabricated using the process described above with respect to FIGS. 13A-13C and materials described above and below. Surface-relief grating 1500 may include substantially vertical grating ridges 1520 etched or otherwise formed in a grating material layer 1510 (e.g., a substrate or a material layer formed on the substrate). In one example, grating material layer 1510 may include $SiO_2$ and may have a refractive index between about 1.4 and 1.7, such as about 1.5 or about 1.6. In another example, grating material layer 1510 may have a refractive index between about 2.4 and about 2.8. In the illustrated example, the grating period of surface-relief grating 1500 may be about 240 nm, the width of a grating groove at the bottom may be about 100 nm, and the height of grating ridges 1520 (or the depth of the grating grooves) may be about 250 nm. Surface-relief grating 1500 may include an overcoat layer that includes a first overcoat layer 1530 and a second overcoat layer 1540.

First overcoat layer 1530 may include a first resin material that has been cured and may at least partially fill the grating grooves. In some embodiments, first overcoat layer 1530 may include some first resin material on top of grating ridges 1520. As described above and below, the first resin material may include a base resin and nanoparticles that have high refractive indices, and thus first overcoat layer 1530 may have a high refractive index, such as greater than about 1.8 or 1.9, which may help to achieve a lower refractive index contrast in surface-relief gratings made of high-index materials. As described above, after solvent evaporation, the first resin material may have a low flowability or a high viscosity (e.g., >1000 cps) such that the first resin material deposited on grating material layer 1510 may not be able to move even within a small region, such as between tens to hundreds nanometers. The base resin in the first resin material may be optically or thermally cured to crosslink or polymerize and form first overcoat layer 1530. The nanoparticles may have a refractive index between about 1.7 and about 3.4, between about 1.75 and about 3.4, or between about 1.8 and about 3.4. The nanoparticles may have a linear dimension about a few nanometers, a few tens of nanometers, or a few hundreds of nanometers. In the illustrated example, the nanoparticles may have a linear dimension between about 10 nm and about 15 nm. As shown by the illustrated example, the top surface of first overcoat layer 1530 may not be flat.

Second overcoat layer 1540 may be formed by depositing a second resin material as described above and below on first overcoat layer 1530, and annealing and curing the second resin material. The second resin material may include a base resin in a solvent blend. The second resin material may have a refractive index close to but lower than that of the first resin material. For example, the refractive index of the second resin material may be greater than 1.4, such as greater than about 1.5, greater than about 1.6, or greater than about 1.7. The second resin material may not include nanoparticles with higher refractive indices, or may include fewer and/or smaller nanoparticles than the first resin material. Thus, the second resin material may have small gains, a lower viscosity, and a higher flowability. For example, the second resin material may have a viscosity less than about 400 cps, less than about 200 cps, less than about 100 cps, less than about 60 cps, less than about 50 cps, less than about 40 cps, less than about 30 cps, less than about 20 cps, less than about 10 cps, less than about 5 cps, less than about 4 cps, less than about 3 cps, less than about 2 cps, or less than about 1 cps. As described above, the second overcoat layer may be annealed at an elevated temperature such that the second resin material may be allowed to flow and form a planar top surface, and may then be cured to crosslink or polymerize to form second overcoat layer 1540. In the illustrated example, the overburden of the overcoat layer (including second overcoat layer 1540 and/or first overcoat layer 1530) on surface-relief grating 1500 may be about 40 nm, and the top surface of the overcoat layer (more specifically, second overcoat layer 1540) is substantially planar. For example, the surface unevenness may be less than about 5 nm, less than about 3 nm, less than about 2 nm, or lower. A thinner overburden may be achieved by, for example, dispensing less second overcoat material.

Figure 16:
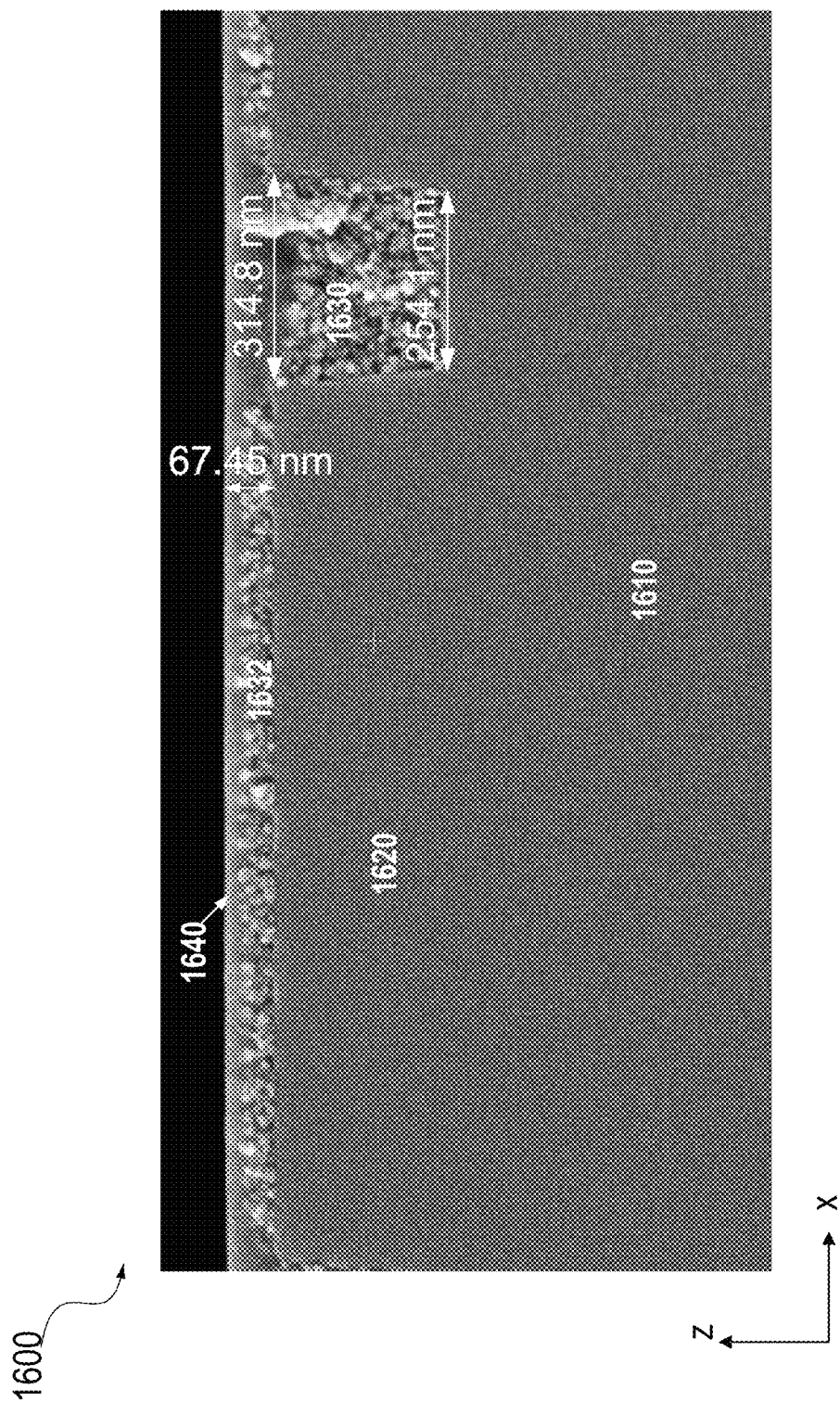
FIG. 16 is a cross-sectional view of another example of a surface-relief grating including a planarized overcoat layer according to certain embodiments.

FIG. 16 is a cross-sectional view of another example of a surface-relief grating 1600 including a planarized overcoat layer according to certain embodiments. Surface-relief grating 1600 may be fabricated using the process described above with respect to FIGS. 13A-13C and materials described above and below. Surface-relief grating 1600 may include substantially vertical grating ridges 1620 etched or otherwise formed in a grating material layer 1610 (e.g., a substrate or a material layer formed on the substrate). In one example, grating material layer 1410 may include $SiO_2$ and may have a refractive index between about 1.4 and 1.7, such as about 1.5 or about 1.6. In another example, grating material layer 1610 may have a refractive index between about 2.4 and 2.8. In the illustrated example, the grating period of surface-relief grating 1600 may be about 1.5 m, the width of a grating groove at the bottom may be about 250 nm, and the height of grating ridges 1620 (or the depth of the grating grooves) may be about 250 nm. Surface-relief grating 1600 may include an overcoat layer that includes a first overcoat layer 1630 and a second overcoat layer 1640.

First overcoat layer 1630 may include a first resin material that has been cured and may at least partially fill the grating grooves. In some embodiments, first overcoat layer 1630 may include some first resin material on top of grating ridges 1620. As described above and below, the first resin material may include a base resin and nanoparticles that have high refractive indices, and thus first overcoat layer 1630 may have a high refractive index, such as greater than about 1.8 or 1.9, which may help to achieve a lower refractive index contrast in surface-relief gratings made of high-index materials. As described above, after solvent evaporation, the first resin material may have a low flowability or a high viscosity (e.g., >1000 cps) such that the first resin material deposited on grating material layer 1610 may not be able to move even within a very small region, such as between about tens and hundreds nanometers. The base resin in the first resin material may be optically or thermally cured to crosslink or polymerize and form first overcoat layer 1630. The nanoparticles may have a refractive index between about 1.7 and about 3.4, between about 1.75 and about 3.4, or between about 1.8 and about 3.4. The nanoparticles may have a linear dimension about a few nanometers, a few tens of nanometers, or a few hundreds of nanometers. In the illustrated example, the nanoparticles may have a linear dimension between about 10 nm and about 15 nm. As shown by the illustrated example, the top surface of first overcoat layer 1630 may not be flat.

Second overcoat layer 1640 may be formed by depositing a second resin material as described above and below on first overcoat layer 1630, and annealing and curing the second resin material. The second resin material may include a base resin in a solvent blend. The second resin material may have a refractive index close to but lower than that of the first resin material. For example, the refractive index of the second resin material may be greater than 1.4, such as greater than about 1.5, greater than about 1.6, or greater than about 1.7. The second resin material may not include nanoparticles with higher refractive indices, or may include fewer and/or smaller nanoparticles than the first resin material. The second resin material may have small gains, a lower viscosity, and a higher flowability. For example, the second resin material may have a viscosity less than about 400 cps, less than about 200 cps, less than about 100 cps, less than about 60 cps, less than about 50 cps, less than about 40 cps, less than about 30 cps, less than about 20 cps, less than about 10 cps, less than about 5 cps, less than about 4 cps, less than about 3 cps, less than about 2 cps, or less than about 1 cps. As described above, second overcoat layer 1640 may be annealed at an elevated temperature such that the second resin material may be allowed to flow and form a planar top surface, and may then be cured to crosslink or polymerize to form second overcoat layer 1640. In the illustrated example, the overburden of the overcoat layer on surface-relief grating 1600 may be about 40 nm, and the top surface of the overcoat layer is substantially planar. For example, the surface unevenness may be less than about 5 nm, less than about 3 nm, less than about 2 nm, or lower. A thinner overburden may be achieved by, for example, dispensing less second overcoat material.

The following section describes some examples of the base resin, nanoparticles (if used), and solvents that may be used in the curable first resin material that has a high refractive index and in the curable second resin material that has a slightly lower refractive index but a higher flowability than the first resin material.

The base resin used in the first resin material and the second resin material may generally include monomers, oligomers, or polymers. In some embodiments, the base resin may include a light-sensitive or light-curable base resin that may include monomers, oligomers, or polymers having one or more aromatic and thio-aromatic units, such as monomers, oligomers, or polymers of one or more derivatives from bisfluorene, dithiolane, thianthrene, biphenol, o-phenylphenol, phenoxy benzyl, bisphenol A, bisphenol F, benzyl, phenol, and the like. In some embodiments, the base resin may include at least one actinic light curable moiety, such as acrylate, epoxide, vinyl, thiols, allyls, vinylether, allylethers, epoxyacrylates, urethane acrylates, polyester acrylates, or a combination thereof. In some embodiments, the light-sensitive base resin may include a crosslinking group. The crosslinking group may include, for example, an ethylenically unsaturated group or an oxirane ring. In some embodiments, the base resin may include a photo radical generator or a photo acid generator. In one example, a base resin may include acrylate monomers, a acrylate crosslinker, a surface cure modifier, a fluorinated additive, and a photoinitiator.

In some embodiments, the base resin of the first resin material and the second resin material may include carbon-based organic base resin. The organic base resin may also include hydrogen, sulfur, oxygen, nitrogen, or various other elements. The organic base resin may include, for example, one or more derivatives from acrylate, vinyl (e.g., olefin or heterocyclic) group, bisfluorene, dithiolane, thianthrene, biphenol, o-phenylphenol, phenoxy benzyl, bisphenol A, bisphenol F, benzyl, phenol, and the like, such as butyl acrylate, ethyl acrylate, methyl acrylate, 2-ethylhexylacrylate, methyl methacrylate, butyl methacrylate, or the like. The organic base resin may have a refractive index greater than or about 1.45, greater than or about 1.5, greater than or about 1.55, greater than or about 1.57, greater than or about 1.58, greater than or about 1.6, greater than or about 1.65, or greater than or about 1.7. In some embodiments, the base resin may include inorganic or metal elements, such as silicone-based base resin materials that include an inorganic silicon-oxygen backbone chain.

In some embodiments, the base resin may include one or more reactive molecules, monomers, oligomers, and/or polymers. In some embodiments, the base resin may include 1, 2, 3, 4, 5, 6, 7, 8, 9, 10, or more than 10 unique types of reactive molecules, monomers, oligomers, and/or polymers. For example, in some embodiments, the base resin may include one or more crosslinkable monomers, one or more polymerizable monomers, or both. In some embodiments, the crosslinkable monomers or the polymerizable monomers may include one or more crosslinkable or polymerizable moieties. In some embodiments, the base resin may include two or more unique types of crosslinkable or polymerizable moieties.

In some embodiments, the one or more resins in the base resin may be selected based on, for example, the refractive index, interaction with other components, and/or associated processing techniques or curing mechanisms (e.g., crosslinking or polymerizing). In some embodiments, the base resin described herein may be curable by UV light, by light wavelengths ranging from about 254 nm to about 415 nm, or by other curing methods (e.g., electron beam curing). In some examples, the crosslinkable or polymerizable moieties may include an ethylenically unsaturated group, an oxirane ring, a heterocyclic group, or a combination thereof. A base resin including an oxirane ring may have a higher refractive index than a base resin including an ethylenically unsaturated group. In some embodiments, the crosslinkable or polymerizable moieties may include vinyl, allyl, epoxide, acrylate, methacrylate, or a combination thereof. In some embodiments, the crosslinkable or polymerizable moieties are selected from optionally substituted alkenyl, optionally substituted cycloalkenyl, optionally substituted alkynyl, optionally substituted acrylate, optionally substituted methacrylate, optionally substituted styrene, optionally substituted epoxide, optionally substituted thiirane, optionally substituted lactone, and optionally substituted carbonate.

In some embodiments, the crosslinkable monomers or the polymerizable monomers may include one or more moieties selected from optionally substituted alkyl, optionally substituted heteroalkyl, optionally substituted alkenyl, optionally substituted alkynyl, optionally substituted cycloalkyl, optionally substituted heterocycloalkyl, optionally substituted aryl, optionally substituted arylalkyl, optionally substituted heteroaryl, and optionally substituted heteroarylalkyl. In some embodiments, the crosslinkable monomers or the polymerizable monomers may include one or more moieties selected from fluorene, cardo fluorene, spiro fluorene, thianthrene, thiophosphate, anthraquinone, and lactam. In some embodiments, the crosslinkable monomers or the polymerizable monomers may include one or more linking groups selected from —$C_{1-10}$ alkyl-, —O—$C_{1-10}$ alkyl-, —$C_{1-10}$ alkenyl-, —O—$C_{1-10}$ alkenyl-, —$C_{1-10}$ cycloalkenyl-, —O—$C_{1-10}$ cycloalkenyl-, —$C_{1-10}$ alkynyl-, —O—$C_{1-10}$ alkynyl-, —$C_{1-10}$ aryl-, —O—$C_{1-10}$—, -aryl-, —O—, —S—, —C(O)—, —C(O)O—, —OC(O)—, —OC(O)O—, —N($R^b$)—, —C(O)N($R^b$)—, —N($R^b$)C(O)—, —OC(O)N($R^b$)—, —N($R^b$)C(O)O—, —SC(O)N($R^b$)—, —N($R^b$)C(O)S—, —N($R^b$)C(O)N($R^b$)—, —N($R^b$)C(N$R^b$)N($R^b$)—, —N($R^b$)S(O)$_w$—, —S(O)$_w$N($R^b$)—, —S(O)$_w$O—, —OS(O)$_w$—, —OS(O)$_w$O—, —O(O)P(O$R^b$)O—, (O)P(O—)$_3$, —O(S)P(O$R^b$)O—, and (S)P(O—)$_3$, where w is 1 or 2, and $R^b$ is independently hydrogen, optionally substituted alkyl, or optionally substituted aryl.

In some embodiments, the crosslinkable monomers or the polymerizable monomers may include one or more terminal groups selected from optionally substituted thiophenyl, optionally substituted thiopyranyl, optionally substituted thienothiophenyl, and optionally substituted benzothiophenyl. In some embodiments, the base resin may include one or more derivatives of bisfluorene, dithiolane, thianthrene, biphenol, o-phenylphenol, phenoxy benzyl, bisphenol A, bisphenol F, benzyl, phenol, or a combination thereof. In some embodiments, the base resin may include one or more of (2,7-bis[(2-acryloyloxyethl)-sulfanyl]thianthrene), benzyl methacrylate, 1,6-hexanediol diacrylate, 1,4-butanediol diacrylate, acryloxypropylsilsesquioxane, methylsilsesquioxane, or any combination thereof.

In some embodiments, the base resin may include one or more of trimethylolpropane (EO)n triacrylate, caprolactone acrylate, polypropylene glycol monomethacrylate, cyclic trimethylolpropane formal acrylate, phenoxy benzyl acrylate, 3,3,5-trimethyl cyclohexyl acrylate, isobornyl acrylate, o-phenylphenol EO acrylate, 4-tert-butylcyclohexyl acrylate, benzyl acrylate, benzyl methacrylate, biphenylmethyl acrylate, lauryl acrylate, lauryl methacrylate, tridecyl acrylate, lauryl tetradecyl methacrylate, isodecyl acrylate, isodecyl methacrylate, phenol (EO) acrylate, phenoxyethyl methacrylate, phenol (EO)2 acrylate, phenol (EO)4 acrylate, tetrahydrofurfuryl acrylate, tetrahydrofurfuryl methacrylate, nonyl phenol (PO)2 acrylate, nonyl phenol (EO)4 acrylate, nonyl phenol (EO)8 acrylate, ethoxy ethyl acrylate, stearyl acrylate, stearyl methacrylate, methoxy PEG600 methacrylate, 1,6-hexanediol diacrylate, 1,6-hexanediol dimethacrylate, 1,6-hexanediol (EO)n diacrylate, polypropylene glycol 400 diacrylate, 1,4-butanediol dimethacrylate, polypropylene glycol 700 (EO)6 dimethacrylate, 1,6-Hexanediol (EO)n diacrylate, hydroxy pivalic acid neopentyl glycol diacrylate, bisphenol A (EO)10 diacrylate, bisphenol A (EO)10 dimethacrylate, neopentyl glycol dimethacrylate, neopentyl glycol (PO)2 diacrylate, tripropylene glycol diacrylate, ethylene glycol dimethacrylate, dipropylene glycol diacrylate, bisphenol A (EO)30 diacrylate, bisphenol A (EO)30 dimethacrylate, diethylene glycol dimethacrylate, triethylene glycol diacrylate, triethylene glycol dimethacrylate, tetraethylene glycol dimethacrylate, bisphenol A (EO)4 diacrylate, bisphenol A (EO)4 dimethacrylate, bisphenol A (EO)3 diacrylate, bisphenol A (EO)3 dimethacrylate, 1,3-butylene glycol dimethacrylate, tricyclodecane dimethanol diacrylate, tetraethylene glycol diacrylate, polyethylene glycol 400 diacrylate, polyethylene glycol 400 dimethacrylate, polyethylene glycol 200 diacrylate, polyethylene glycol 200 dimethacrylate, polyethylene glycol 300 diacrylate, polyethylene glycol 600 diacrylate, polyethylene glycol 600 dimethacrylate, bisphenol F (EO)4 diacrylate, trimethylolpropane triacrylate, trimethylolpropane trimethacrylate, trimethylolpropane (EO)3 triacrylate, trimethylolpropane (EO)15 triacrylate, trimethylolpropane (EO)6 triacrylate, trimethylolpropane (EO)9 triacrylate, glycerine (PO)3 triacrylate, pentaerythritol triacrylate, trimethylolpropane (PO)3 triacrylate, tris(2-hydroxyethyl)isocyanurate triacrylate, pentaerythritol (EO)n tetraacrylate, ditrimethylolpropane tetraacrylate, pentaerythritol tetraacrylate, dipentaerythritol pentaacrylate, and dipentaerythritol hexaacrylate.

In some embodiments, the base resin may include a phosphate methacrylate, an amine acrylate, an acrylated amine synergist, a carboxylethyl acrylate, a modified epoxy acrylate, a bisfluorene diacrylate, a modified bisphenol fluorene diacrylate, a modified bisphenol fluorene type, a butadiene acrylate, an aromatic difunctional acrylate, an aliphatic multifunctional acrylate, a polyester acrylate, a trifunctional polyester acrylate, a tetrafunctional polyester acrylate, a phenyl epoxy acrylate, a bisphenol A epoxy acrylate, a water soluble acrylate, an aliphatic alkyl epoxy acrylate, a bisphenol A epoxy methacrylate, a soybean oil epoxy acrylate, a difunctional polyester acrylate, a trifunctional polyester acrylate, a tetrafunctional polyester acrylate, a chlorinated polyester acrylate, a hexafunctional polyester acrylate, an aliphatic difunctional acrylate, an aliphatic difunctional methacrylate, an aliphatic trifunctional acrylate, an aliphatic trifunctional methacrylate, an aromatic difunctional acrylate, an aromatic tetrafunctional acrylate, an aliphatic tetrafunctional acrylate, an aliphatic hexafunctional acrylate, an aromatic hexafunctional acrylate, an acrylic acrylate, a polyester acrylate, a sucrose benzoate, a caprolactone methacrylate, a caprolactone acrylate, a phosphate methacrylate, an aliphatic multifunctional acrylate, a phenol novolac epoxy acrylate, a cresol novolac epoxy acrylate, an alkali strippable polyester acrylate, a melamine acrylate, a silicone polyester acrylate, a silicone urethane acrylate, a dendritic acrylate, an aliphatic tetrafunctional methacrylate, a water dispersion urethane acrylate, a water soluble acrylate, an aminated polyester acrylate, a modified epoxy acrylate, a trifunctional polyester acrylate, or a combination thereof.

In some embodiments, the base resin may include one or more fluorinated compounds. The one or more fluorinated compounds may include, for example, 2,2,3,3,4,4,5,5,6,6,7, 7-dodecafluoroheptyl acrylate, 3,3,4,4,5,5,6,6,7,7,8,8,9,9, 10,10,11,11,12,12,12-heneicosafluorododecyl acrylate, 3,3, 4,4,5,5,6,6,7,7,8,8,9,9,10,10,10-heptadecafluorodecyl methacrylate, 2,2,3,3,4,4,4-heptafluorobutyl acrylate, 2,2,3, 3,4,4,4-heptafluorobutyl methacrylate, 2,2,3,4,4,4-hexafluorobutyl acrylate, 2,2,3,4,4,4-hexafluorobutyl methacrylate, 1,1,1,3,3,3-hexafluoroisopropyl acrylate, 1,1,1,3,3,3-hexafluoroisopropyl methacrylate, 2,2,3,3,4,4,5,5-octafluoropentyl acrylate, 2,2,3,3,4,4,5,5-octafluoropentyl methacrylate, 2,2,3,3,3-pentafluoropropyl acrylate, 2,2,3,3,3-pentafluoropropyl methacrylate, 1H,1H,2H,2H-perfluorodecyl acrylate, 2,2,3,3-tetrafluoropropyl methacrylate, 3,3,4,4,5,5,6,6,7,7,8,8,8-tridecafluorooctyl acrylate, 3,3,4,4,5,5,6,6,7,7,8,8,8-tridecafluorooctyl methacrylate, 2,2,2-trifluoroethyl methacrylate, 2-[(1',1',1'-trifluoro-2'-(trifluoromethyl)-2'-hydroxy)propyl]-3-norbornyl methacrylate, or a combination thereof.

In some embodiments, the one or more resins in the base resin may include commercially available compounds. In some embodiments, the one or more resins in the base resin may be synthesized by various methods. In some embodiments, the one or more resins in the base resin may be synthesized such that the resultant resin has the desired parameters disclosed herein (e.g., refractive index, viscosity, functional groups, etc.).

In some embodiments, the base resin may include a photo radical generator, a photo acid generator, or both. In some embodiments, depending on the crosslinking functional group or groups that the base resin has, the base resin may be crosslinked or polymerized via radical photopolymerization (e.g., free radical photopolymerization or controlled radical photopolymerization), acid photopolymerization, ionic photopolymerization (e.g., cationic photopolymerization or anionic photopolymerization), or a combination thereof. For example, a base resin including an ethylenically unsaturated group may be crosslinked or polymerized via radical photopolymerization (e.g., free radical photopolymerization). To facilitate the polymerization of a base resin containing the ethylenically unsaturated group, the first resin material or second resin material may further include one or more photo radical generators (PRGs). Under UV radiation, the PRGs generate radicals that initiate the polymerization or crosslinking process of the ethylenically unsaturated group of the base resin molecules. In another example, a base resin comprising an oxirane ring can be crosslinked or polymerized via ionic photopolymerization (e.g., cationic photopolymerization). To facilitate the polymerization of the base resin comprising the oxirane ring, the first resin material or the second resin material may further include one or more photo acid generators (PAGs). Under UV radiation, the PAGs generate cations or acid that initiate the polymerization or crosslinking process of the oxirane ring of the base resin molecules.

In some embodiments, the light-curable optical material may include a photo-initiator. The photo-initiator causes light-initiated crosslinking or polymerization of the photoactive polymerizable material (e.g., light-initiated curing) upon exposure to a wavelength of light that activates the photo-initiator (e.g., a photo-initiating light source). In some embodiments, the light-sensitive material may include a combination of components, some of which individually are not light-sensitive, yet in combination are capable of activating the photoactive monomer or polymer (e.g., a dye/amine, a sensitizer/iodonium salt, a dye/borate salt, etc.). In some embodiments, a light-sensitive material may include a single photo-initiator or a combination of two or more photo-initiators. For example, in some embodiments, two or more photo-initiators may be used to allow light-initiated crosslinking or polymerization of the photoactive monomer or polymer upon exposure to two or more different wavelengths of light. In some embodiments, a light-sensitive material comprises a photoactive polymerizable material that comprises one or more functional groups that undergo curing. In some embodiments, a light-sensitive material comprises one or more photoactive polymerizable materials that are also photo-initiators (e.g., N-methylmaleimide, derivatized acetophenones, etc.).

In some embodiments, the base resin may include one or more inhibitors. The one or more inhibitors may include one or more compositions, compounds, or molecules that are capable of inhibiting or substantially inhibiting the crosslinking or polymerization of the crosslinkable or polymerizable component when the photo-initiating light source is on or off. In some embodiments, the one or more inhibitors may stabilize the base resin to prevent crosslinking or polymerization prior to the curing. In some embodiments, the one or more inhibitors may include monomethyl ether hydroquinone, 4-tert-butylcatechol, or both.

In some embodiments, the base resin may include carbon elements as well as other non-carbon elements. For example, in some embodiments, the base resin comprises silicone-based base resins that include an inorganic silicon-oxygen backbone chain. In some embodiments, the base resin may include one or more siloxane derivative compounds. In some embodiments, the base resin may include one or more surfactants. In some implementations, the base resin may include a surfactant that comprises a main chain of a siloxane skeleton comprising an inorganic silicon-oxygen backbone chain (e.g., X-12-2430C fluorine contained type), a high number of functional groups, and at least one fluorine. The surfactant may provide increased durability against heat and light, high hardness, anti-stain properties, and/or water and oil repellency. In some embodiments, the weight percentage (wt. %) of the surfactant to the base resin is between 0.1% and 5%. In some embodiments, the one or more surfactants may include a fluorinated surfactant, a crosslinkable surfactant, a non-crosslinkable surfactant, or a combination thereof. In some embodiments, the one or more surfactants may include a crosslinkable, fluorinated acrylic, such as 2,2,3,3,4,4,5,5,6,6,7,7-Dodecafluoroheptyl acrylate; 3,3,4,4,5,5,6,6,7,7,8,8,9,9,10,10,11,11,12,12,12-Heneicosafluorododecyl acrylate; 3,3,4,4,5,5,6,6,7,7,8,8,9,9,10, 10,10-Heptadecafluorodecyl methacrylate containing MEHQ as inhibitor; 2,2,3,3,4,4,4-Heptafluorobutyl acrylate; 2,2,3,3,4,4,4-Heptafluorobutyl methacrylate; 2,2,3,4,4,4-Hexafluorobutyl acrylate; 2,2,3,4,4,4-Hexafluorobutyl methacrylate; 1,1,1,3,3,3-Hexafluoroisopropyl acrylate; 1,1, 1,3,3,3-Hexafluoroisopropyl methacrylate; 2,2,3,3,4,4,5,5-Octafluoropentyl acrylate containing 100 ppm monomethyl ether hydroquinone as inhibitor; 2,2,3,3,4,4,5,5-Octafluoropentyl methacrylate containing 100 ppm MEHQ as inhibitor; 2,2,3,3,3-Pentafluoropropyl acrylate containing 100 ppm 4-tert-butylcatechol as inhibitor; 2,2,3,3,3-Pentafluoropropyl methacrylate containing 100 ppm 4-tert-butylcatechol as inhibitor; 1H,1H,2H,2H-Perfluorodecyl acrylate containing 100 ppm tert-butylcatechol as inhibitor; 2,2,3,3-Tetrafluoropropyl methacrylate; 3,3,4,4,5,5,6,6,7,7,8,8,8-Tridecafluorooctyl acrylate containing inhibitor; 3,3,4,4,5,5, 6,6,7,7,8,8,8-Tridecafluorooctyl methacrylate containing 100 ppm 4-tert-butylcatechol as inhibitor; 2,2,2-Trifluoroethyl methacrylate containing 50-200 ppm MEHQ as inhibitor; and/or 2-[(1',1',1'-Trifluoro-2'-(trifluoromethyl)-2'-hydroxy)propyl]-3-norbornyl methacrylate.

In some embodiments, the refractive index of the base resin ranges from 1.4 to 1.8, from 1.45 to 1.7, and/or from 1.5 to 1.7. In some embodiments, the refractive index ranges from 1.52 to 1.73, from 1.52 to 1.71, from 1.52 to 1.70, from 1.55 to 1.77, from 1.58 to 1.77, from 1.55 to 1.73, from 1.50 to 1.73, from 1.58 to 1.73, from 1.60 to 1.77, and/or from 1.60 to 1.73. In some embodiments, the refractive index ranges from 1.50 to 1.80, from 1.55 to 1.80, from 1.57 to 1.80, from 1.58 to 1.77, from 1.58 to 1.70, or from 1.60 to 1.70. In some embodiments, the refractive index of the base resin may be affected by the functional groups of the base resin. For example, in some embodiments, different base resin materials comprising a common base material but different functional groups can have different refractive indices. For example, a base resin material may include one or more functional groups, including but not limited to, crosslinking functional groups, such as ethylenically unsaturated group, oxirane ring, or the like. A base resin containing the oxirane ring may generally have a higher refractive index than a base resin containing the ethylenically unsaturated group.

A base resin material may be selected based on its refractive index, its interaction with other components of the overcoat material, the associated processing techniques or mechanisms for crosslinking or curing the base resin, and the like. Although the base resin materials described herein can generally be cured by UV light or light having wavelengths ranging from about 254 nm to about 415 nm or other curing methods (e.g., electron beam curing, etc.), the base resin materials having different functional groups may be cured or crosslinked using different crosslinking mechanisms and/or under different operating conditions, and thus may be selected based on the various processing parameters for forming the overcoat layer.

As described above, the first resin material may include nanoparticles for increasing the refractive index of the overcoat material and increasing the refractive index contrast of the surface-relief grating. The nanoparticles may have refractive indices higher than the refractive index of the base resin. In some embodiments, the nanoparticles may include one or more metal oxides having relatively high refractive indices, such as titanium oxide, zirconium oxide, hafnium oxide, tungsten oxide, other metal oxide, or any derivative or combination thereof. In some embodiments, the nanoparticles may include zinc tellurium, gallium phosphide, any derivative thereof, or any combination thereof. Depending on the materials and/or the composition, when more than one type of nanoparticles is used to form a blend of nanoparticles, the nanoparticles may have a refractive index between about 1.7 and about 3.4, between about 1.75 and about 3.4, or between about 1.8 and about 3.4.

In some embodiments, the weight percentage loading (wt. %) of the nanoparticles to the first resin material may range from about 40 wt. % to about 95 wt. %, from about 50 wt. % to about 90 wt. %, or from about 55 wt. % to about 85 wt. %. In some embodiments, the weight percentage loading of the nanoparticles to the first resin material is about 55%, about 56%, about 57%, about 58%, about 59%, about 60%, about 61%, about 62%, about 63%, about 64%, about 65%, about 66%, is about 67%, about 68%, about 69%, about 70%, about 71%, about 72%, about 73%, about 74%, about 75%, about 76%, is about 77%, about 78%, about 79%, about 80%, about 81%, about 82%, about 83%, about 84%, about 85%, or about 90%. In general, increasing the loading (e.g., the weight or mass percentage) of high refractive index nanoparticles may further increase the refractive index of the first resin material.

In some embodiments, the nanoparticles may include a plurality of surface-modified nanoparticles, a plurality of capped nanoparticles, or both. In some embodiments, the surface-modified nanoparticles, the capped nanoparticles, or both, may include a substantially inorganic core and a substantially organic shell. In some embodiments, the nanoparticles may include one or more crosslinkable or polymerizable moieties (e.g., metal oxide ligands) capable of reacting with the crosslinkable or polymerizable moieties of the base resin. In some embodiments, the reactivity of the crosslinkable or polymerizable moieties of the nanoparticles with the corresponding crosslinkable or polymerizable moieties of the base resin may allow the nanoparticles to crosslink or polymerize with the base resin during the curing step, resulting in a cured material with high mechanic strength sufficient to withstand the various steps of the subsequent process. In some embodiments, the first resin material may include non-reactive nanoparticles where the nanoparticles are suspended in but do not crosslink or polymerize with the base resin. In some such embodiments, the crosslinkable or polymerizable ligands may include acrylate, methyl acrylate and derivatives, vinyl groups (e.g., olefin or heterocyclic) and derivatives, and/or a mixture thereof.

For example, nanoparticles including an acrylate group may, in some embodiments, crosslink with a base resin including acrylate. A byproduct of nanoparticle synthesis is the presence of functional groups on the surface of the nanoparticle, such as the presence of —OH groups caused by hydrolysis and condensation during the synthesis of titanium oxide nanoparticles. These —OH groups can be functionalized with other functional groups (e.g., silane) that are subsequently bound to crosslinkable or polymerizable moieties (e.g., acrylate and/or methacrylate). By modifying the reactivity of the ligands present on the surface of the nanoparticles, the crosslinkable or polymerizable moieties of the nanoparticles (e.g., acrylate and/or methacrylate) are able to form covalent bonds with the crosslinkable or polymerizable moieties in the base resin (e.g., acrylate and/or methacrylate) upon exposure to electromagnetic radiation (e.g., a wavelength of UV light).

In some embodiments, the functional groups that link the substantially organic shell of the nanoparticles with the crosslinkable or polymerizable moieties may be selected based on their reactivity (e.g., ability to form covalent bonds) with the crosslinkable or polymerizable moieties. In some embodiments, the crosslinkable or polymerizable moieties of the substantially organic shell of the nanoparticles may be selected based on their reactivity with the crosslinkable or polymerizable moieties of the base resin. In some embodiments, the crosslinkable or polymerizable ligands may include two or more unique types of crosslinkable or polymerizable functional groups.

For example, in some embodiments, the crosslinkable or polymerizable moieties may include an ethylenically unsaturated group, an oxirane ring, a heterocyclic group, or a combination thereof. In some embodiments, the crosslinkable or polymerizable moieties may include vinyl, allyl, epoxide, acrylate, methacrylate, or a combination thereof.

In some embodiments, the crosslinkable or polymerizable moieties comprise one or more of optionally substituted alkenyl, optionally substituted cycloalkenyl, optionally substituted alkynyl, optionally substituted acrylate, optionally substituted methacrylate, optionally substituted styrene, optionally substituted epoxide, optionally substituted thiirane, optionally substituted lactone, optionally substituted carbonate, or a combination thereof.

In some embodiments, the crosslinkable or polymerizable moieties may include one or more linking groups selected from —Si(—O—)$_3$, —C$_{1-10}$ alkyl-, —O—C$_{1-10}$ alkyl-, —C$_{1-10}$ alkenyl-, —O—C$_{1-10}$ alkenyl-, —C$_{1-10}$ cycloalkenyl-, —O—C$_{1-10}$ cycloalkenyl-, —C$_{1-10}$ alkynyl-, —O—C$_{1-10}$ alkynyl-, —C$_{1-10}$ aryl-, —O—C$_{1-10}$—, -aryl-, —O—, —S—, —C(O)—, —C(O)O—, —OC(O)—, —OC(O)O—, —N(R$^b$)—, —C(O)N(R$^b$)—, —N(R$^b$)C(O)—, —OC(O)N(R$^b$)—, —N(R$^b$)C(O)O—, —SC(O)N(R$^b$)—, —N(R$^b$)C(O)S—, —N(R$^b$)C(O)N(R$^b$)—, —N(R$^b$)C(NR$^b$)N(R$^b$)—, —N(R$^b$)S(O)$_w$—, —S(O)$_w$N(R$^b$)—, —S(O)$_w$O—, —OS(O)$_w$—, —OS(O)$_w$O—, —O(O)P(OR$^b$)O—, (O)P(O—)$_3$, —O(S)P(OR$^b$)O—, and (S)P(O—)$_3$, where w is 1 or 2, and R is independently hydrogen, optionally substituted alkyl, or optionally substituted aryl.

In some embodiments, the substantially organic shell may include one or more of an organosilane or a corresponding organosilanyl substituent, an organoalcohol or a corresponding organoalkoxy substituent, or an organocarboxylic acid or a corresponding organocarboxylate substituent. In some embodiments, the organosilane is selected from n-propyltrimethoxysilane, n-propyltriethoxysilane, n-octyltrimethoxysilane, n-octyltriethoxysilane, phenylrimethoxysilane, 2-methoxy(polyethyleneoxy)propyl-trimethoxysilane, methoxy(triethyleneoxy)propyltrimethoxysilane, 3-aminopropyltrimethoxysilane, 3-mercaptopropyltrimethoxysilane, 3-(methacryloyloxy)propyl trimethoxysilane, 3-isocyanatopropyltriethoxysilane, 3-isocyanatopropyltrimethoxysilane, and glycidoxypropyltrimethoxysilane. In some embodiments, the organoalcohol is selected from heptanol, hexanol, octanol, benzyl alcohol, phenol, ethanol, propanol, butanol, oleylalcohol, dodecylalcohol, octadecanol, and triethylene glycol monomethyl ether. In some embodiments, the organocarboxylic acid is selected from octanoic acid, acetic acid, propionic acid, 2-2-(2-methoxyethoxy)ethoxyacetic acid, oleic acid, and benzoic acid.

In some embodiments, the substantially organic shell may include one or more of 3-(methacryloyloxy)propyl trimethoxysilane, 3-(methacryloyloxy)propyl dimethoxysilyl, 3-(methacryloyloxy)propyl methoxysiloxyl, or a combination thereof.

In some embodiments, the diameter of a substantially inorganic core may range from about 1 nm to about 25 nm. In some embodiments, the diameter of a substantially inorganic core is selected from about 1 nm, about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, and about 25 nm. In some embodiments, the diameter of a substantially inorganic core is between 0.1 nm to 1 nm. In some embodiments, the diameter of a substantially inorganic core is between 25 nm and 1 μm.

In some embodiments, the diameter of a surface-modified nanoparticle, a capped nanoparticle, or both, including a substantially organic shell, may range from about 5 nm to about 100 nm. In some embodiments, the diameter of a surface-modified nanoparticle, a capped nanoparticle, or both, including a substantially organic shell, may range from about 10 nm to about 50 nm. In some embodiments, the diameter of a surface-modified nanoparticle, a capped nanoparticle, or both, including a substantially organic shell, may be between 0.1 nm and 5 nm. In some embodiments, the diameter of a surface-modified nanoparticle, a capped nanoparticle, or both, including a substantially organic shell, may be between 100 nm and 1 μm.

In some embodiments, the diameter of a surface-modified nanoparticle, a capped nanoparticle, or both, including a substantially organic shell, may be about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, and about 25 nm, about 26 nm, about 27 nm, about 28 nm, about 29 nm, about 30 nm, about 31 nm, about 32 nm, about 33 nm, about 34 nm, about 35 nm, about 36 nm, about 37 nm, about 38 nm, about 39 nm, about 40 nm, about 41 nm, about 42 nm, about 43 nm, about 44 nm, about 45 nm, about 46 nm, about 47 nm, about 48 nm, about 49 nm, or about 50 nm.

In some embodiments, the diameter of a substantially inorganic core or a nanoparticle (e.g., a surface-modified nanoparticle, a capped nanoparticle, or both, including a substantially organic shell) may be measured by transmission electron microscopy (TEM), dynamic light scattering (DLS), laser diffraction, field flow fractionation, particle tracking analysis, size exclusion chromatography, centrifugal sedimentation, and atomic force microscopy, X-ray diffraction, hydrodynamic chromatography, static light scattering, multiangle light scattering, nephelometry, laser-induced breakdown detection, ultraviolet-visible spectroscopy, near-field scanning optical microscopy, confocal laser scanning microscopy, capillary electrophoresis, ultracentrifugation, cross-flow filtration, small-angle X-ray scattering, and differential mobility analysis. In some embodiments, the diameter and/or size of a substantially inorganic core or a nanoparticle (e.g., a surface-modified nanoparticle, a capped nanoparticle, or both, including a substantially organic shell), is calculated from physical properties such as settling velocity, diffusion rate or coefficient, and electrical mobility, or from measured parameters, such as Feret diameter, Martin diameter, and projected area diameters.

In some embodiments, the volume fraction of the substantially inorganic core in the surface-modified nanoparticles, the capped nanoparticles, or both, is selected from about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, and about 90%. In some embodiments, the volume fraction of the substantially inorganic core in the surface-modified nanoparticles, the capped nanoparticles, or both, is less than 60% or greater than 90%.

In some embodiments, the volume fraction of the substantially organic shell in the surface-modified nanoparticles, the capped nanoparticles, or both, is selected from about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, and about 40%. In some embodiments, the volume fraction of the substantially organic shell in the surface-modified nanoparticles, the capped nanoparticles, or both, is less than 10% or greater than 40%.

In some embodiments, the first resin material and/or the second resin material may include one or more solvents. In some embodiments, the one or more solvents may include 2-(1-methoxy)propyl acetate, propylene glycol monomethyl ether acetate, propylene glycol methyl ether, ethyl acetate, xylene, toluene, or a combination thereof. In some embodiments, the solvents may include propylene glycol methyl ether acetate (PGMEA) or dipropylene glycol methyl ether. The addition of solvents may decrease the viscosity of the resin material and make the resin material flowable at room temperature. In some embodiments, the solvents may be removed from the resin material after the resin material is applied to the surface-relief grating, for example, by a thermal treatment process (e.g., baking). In some embodiments, the percentage of solvent remaining in the resin material after the overcoating and the removal of the solvent is less than 5%.

In general, the base resin material, the functional group of the base resin material, the nanoparticle material, and/or the loading of the nanoparticles can be selected to tune the refractive index of the cured overcoat material. In some embodiments, the cured overcoat material may include a refractive index between about 1.7 and about 2.2, depending on the overcoat material composition. For example, the overcoat layer may have a refractive index greater than or about 1.78, greater than or about 1.8, greater than or about 1.85, greater than or about 1.9, greater than or about 1.95, greater than or about 2, or greater.

Figure 17:
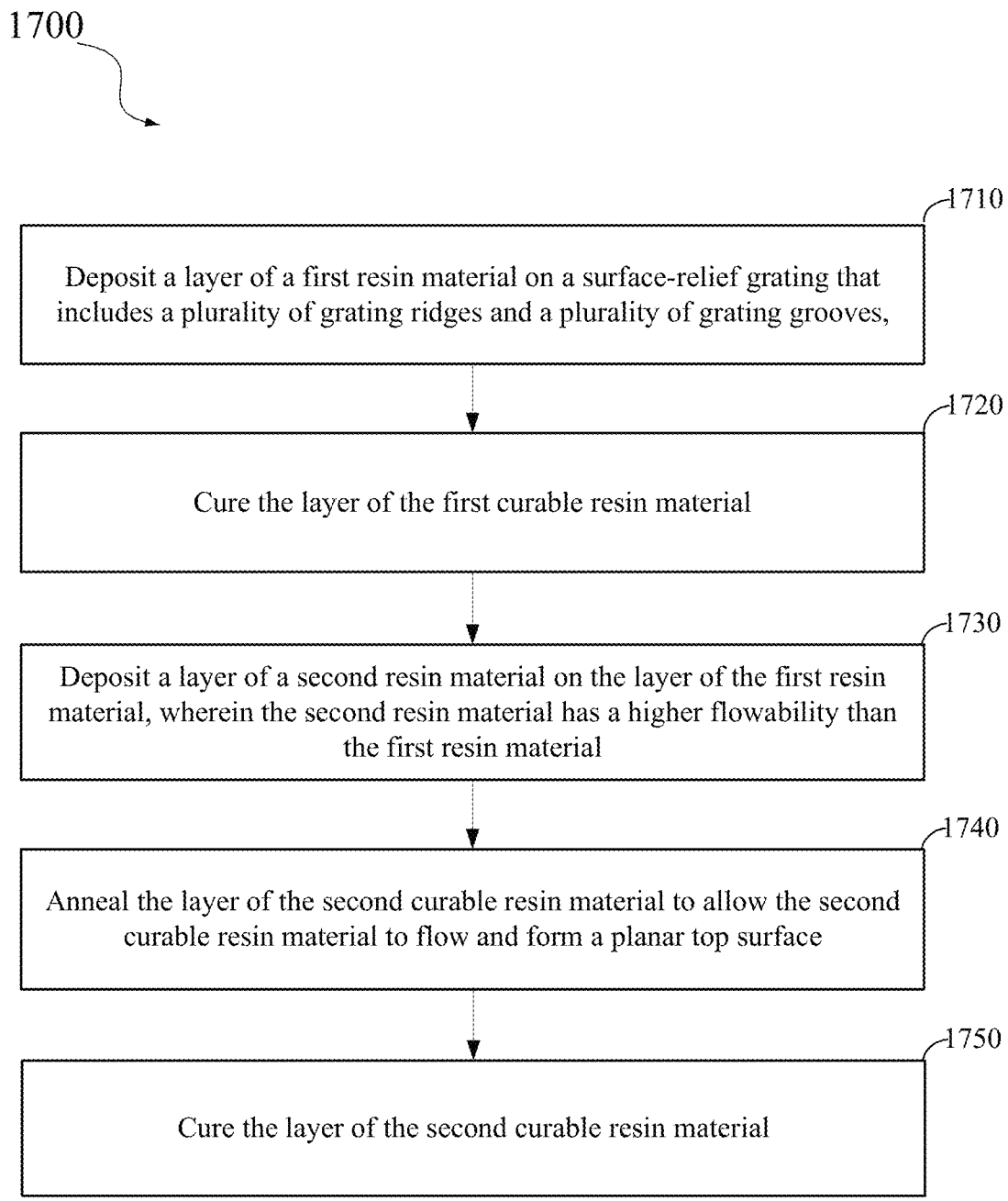
FIG. 17 is a flowchart illustrating an example of a process for forming a planarized overcoat layer on a surface-relief grating according to certain embodiments.

FIG. 17 is a flowchart 1700 illustrating an example of a process for forming a planarized overcoat layer on a surface-relief grating according to certain embodiments. The operations described in flowchart 1700 are for illustration purposes only and are not intended to be limiting. In various implementations, modifications may be made to flowchart 1700 to add additional operations, to omit some operations, or to change the order of the operations. The operations described in flowchart 1700 may be performed by, for example, one or more semiconductor fabrication systems, inkjet printing system, 3-D printing system, and the like.

The operation at block 1710 may include depositing a layer of a first resin material on a surface-relief grating that includes a plurality of grating ridges and a plurality of grating grooves, where the first resin material may be curable by heat or electromagnetic radiation and at least partially fills the plurality of grating grooves. In some embodiments, the first resin material may be characterized by a first refractive index greater than about 1.8 or greater than about 1.9 for visible light. The first resin material may include any of the first resin material described in this disclosure, and may include a first base resin, nanoparticles, and a first solvent. For example, the first base resin may include actinic light curable moiety including acrylate, epoxide, vinyl, thiols, allyls, vinylether, allylethers, epoxyacrylates, urethane acrylates, polyester acrylates, or a combination thereof. In some embodiments, the first base resin may include an acrylate resin (e.g., characterized by a refractive index equal to or greater than about 1.7) and a photo radical or thermal radical generator, and the nanoparticles may include nanoparticles of titanium oxide, zirconium oxide, hafnium oxide, tungsten oxide, zinc tellurium, gallium phosphide, or a combination thereof, where the nanoparticles may include acrylate and non-functional ligands. In some embodiments, the nanoparticles may be characterized by a linear dimension greater than 10 nm or greater than about 15 nm. In some embodiments, the first base resin may include an epoxy resin (e.g., characterized by a refractive index between about 1.6 and about 1.8) and a photo acid or thermal acid generator, and the nanoparticles may include nanoparticles of titanium oxide, zirconium oxide, hafnium oxide, tungsten oxide, zinc tellurium, gallium phosphide, or a combination thereof, where the nanoparticles may include epoxy and non-functional ligand decoration. In some embodiments, the first solvent may include propylene glycol methyl ether acetate (PGMEA), dipropylene glycol methyl ether, or both.

In some embodiments, depositing the layer of the first resin material on the surface-relief grating may include spin-coating the layer of the first resin material on the surface-relief grating, or dispensing a plurality of drops of the first resin material on the surface-relief grating. In some embodiments, the plurality of grating grooves may be characterized by at least one of a non-uniform depth, a non-uniform pitch, a non-uniform width, or a non-uniform slant angle, and depositing the layer of the first resin material on the surface-relief grating may include dispensing different amounts of the first resin material on two or more different regions of the surface-relief grating.

The operation at block 1720 may include curing the layer of the first resin material, for example, by heat or electromagnetic radiation, such as UV light curing. As described above, the curing may be performed at room temperature or an elevated temperature for any suitable time duration. The curing may cause the crosslinking or polymerization of the base resin in the first resin material to solidify the first resin material, thereby forming a first overcoat layer on the surface relief grating.

The operation at block 1730 may include depositing a layer of a second resin material on the layer of the first resin material, where the second resin material is curable by heat or electromagnetic radiation and has a higher flowability than the first resin material. In some embodiments, depositing the layer of the second resin material on the surface-relief grating may include spin-coating the layer of the second resin material on the first overcoat layer, or dispensing a plurality of drops of the second resin material on the first overcoat layer. In some embodiments, the second resin material may be characterized by a second refractive index within a range from about 1.5 to about 1.7 for visible light. The second resin material may include a second base resin and a second solvent. In some embodiments, the second resin material may include fewer nanoparticles and/or smaller nanoparticles (e.g., less than about 10 nm or less than about 5 nm) described above. In some embodiments, the second base resin may include actinic light curable moiety including acrylate, epoxide, vinyl, thiols, allyls, vinylether, allylethers, epoxyacrylates, urethane acrylates, polyester acrylates, or a combination thereof. In some embodiments, the second base resin may include an epoxy resin and a photo acid generator, where the epoxy resin may be characterized by a refractive index greater than about 1.5. In some embodiments, the second base resin may include an acrylate resin and a photo radical generator. In some embodiments, the second solvent may include propylene glycol methyl ether acetate (PGMEA), dipropylene glycol methyl ether, or both. In some embodiments, the second resin material may have a low viscosity or a high flowability at about room temperature (e.g., between about 15° C. and about 50° C.). For example, the second resin material may have a viscosity at about room temperature less than about 400 cps, less than about 200 cps, less than about 100 cps, less than about 60 cps, less than about 50 cps, less than about 40 cps, less than about 30 cps, less than about 20 cps, less than about 10 cps, less than about 5 cps, less than about 4 cps, less than about 3 cps, less than about 2 cps, or less than about 1 cps. In some embodiments, the second resin material may be a solid material at room temperature, and may have a low viscosity at an elevated temperature above its melting point.

The operation at block 1740 may include annealing the layer of the second resin material to allow the second resin material to flow and form a planar top surface. The annealing may be performed at an elevated temperature, such as at or above the glass transition temperature or melting temperature of the second resin material, such that the viscosity of the second resin material may be reduced and the flowability of the second resin material may be improved.

The operation at block 1750 may include curing the layer of the second resin material, for example, by heat or electromagnetic radiation, such as UV light curing. The curing may be performed at room temperature or an elevated temperature for any suitable time duration. The curing may cause the crosslinking or polymerization of the base resin in the second resin material to solidify the second resin material, thereby forming a second overcoat layer on the first overcoat layer.

In some examples, the thickness of the overcoat layer (including the first overcoat layer and the second overcoat layer) on top of the grating ridges (i.e., the overburden) may be equal to or less than about 50 nm, less than about 30 nm, less than about 20 nm, or thinner. The surface peak-to-valley height of the top surface of the overcoat layer (e.g., the second overcoat layer) may be equal to or less than about 5 nm, less than about 4 nm, less than about 3 nm, less than about 2 nm, or lower.

Figure 18A:
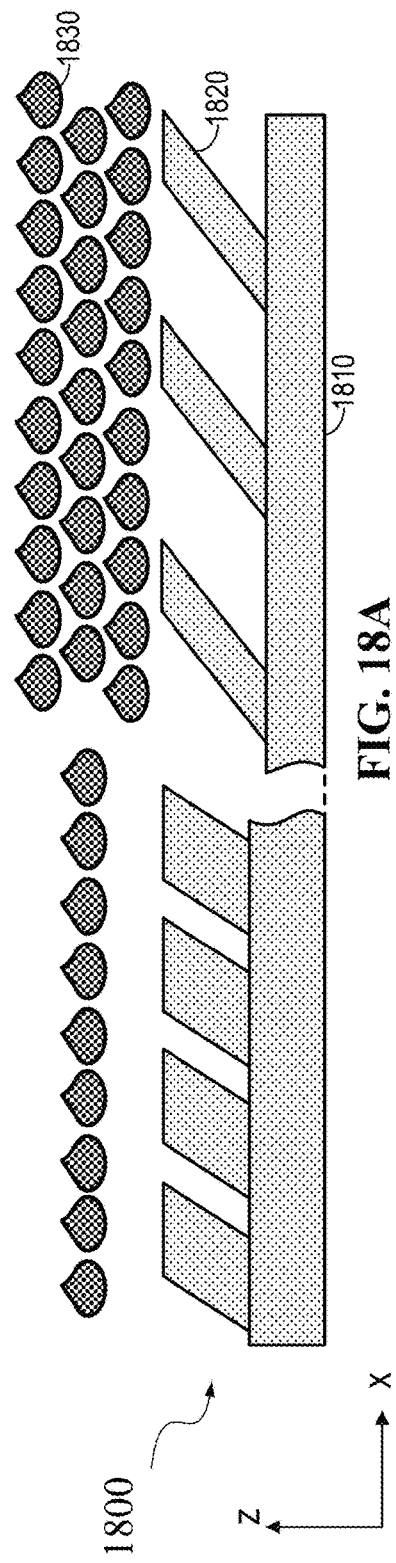
FIGS. 18A-18C illustrate an example of a method of forming a planarized overcoat layer on a non-uniform slanted surface-relief grating according to certain embodiments.
Figure 18B:
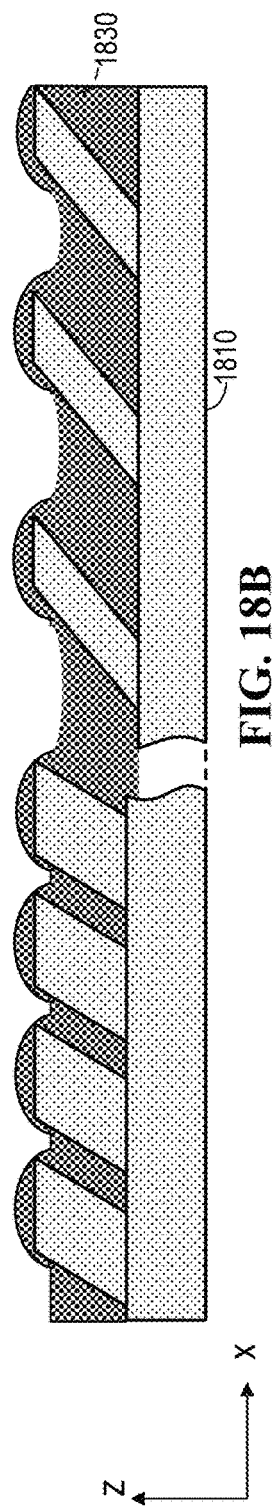
Figure 18C:
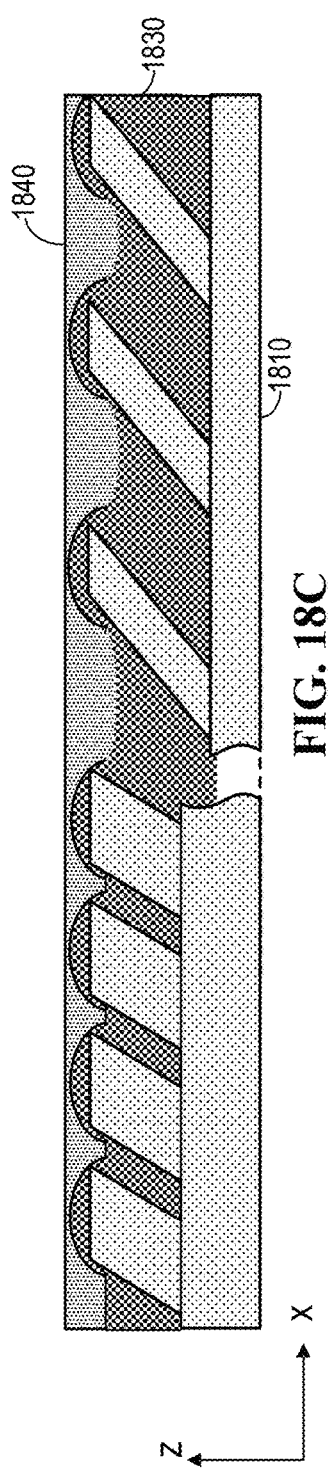

FIGS. 18A-18C illustrate an example of a method of forming a planarized overcoat layer on a non-uniform slanted surface-relief grating according to certain embodiments. The method of forming the planarized overcoat layer on the non-uniform slanted surface-relief grating may be an example of the process described above with respect to FIGS. 13 and 17. FIG. 18A shows a slanted surface-relief grating 1800 that includes grating ridges 1820 or grating grooves formed in a grating material layer 1810. Slanted surface-relief grating 1800 may have non-uniform grating parameters, such as grating period, duty cycle, grating groove depth, slant angle, and the like. Therefore, different amounts of a first resin material 1830 having a high refractive index as described above may be dispensed at different regions of slanted surface-relief grating 1800 by, for example, inkjeting or 3D printing. FIG. 18B shows that first resin material 1830 deposited on slanted surface-relief grating 1800 may be cured to form a first overcoat layer that may have an uneven top surface on slanted surface-relief grating 1800. FIG. 18C shows that a second resin material 1840 having a higher flowability as described above may be dispensed on the first overcoat layer, and may be annealed and cured as described above to form a second overcoat layer that has a planar top surface.

Embodiments of the invention may include or be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 19:
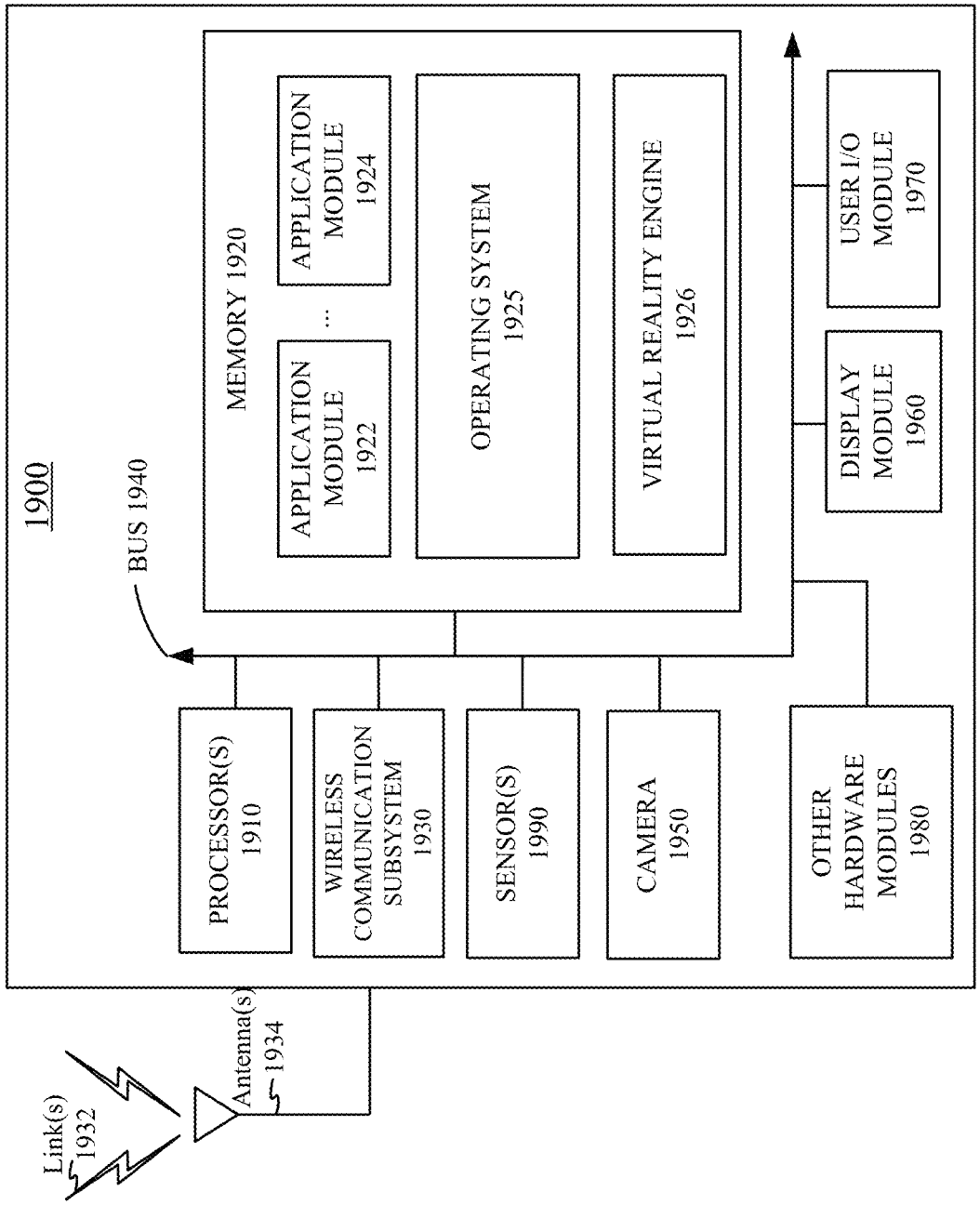
FIG. 19 is a simplified block diagram of an example electronic system of an example near-eye display for implementing some of the examples disclosed herein.

FIG. 19 is a simplified block diagram of an example electronic system 1900 of an example near-eye display (e.g., HMD device) for implementing some of the examples disclosed herein. Electronic system 1900 may be used as the electronic system of an HMD device or other near-eye displays described above. In this example, electronic system 1900 may include one or more processor(s) 1910 and a memory 1920. Processor(s) 1910 may be configured to execute instructions for performing operations at a number of components, and can be, for example, a general-purpose processor or microprocessor suitable for implementation within a portable electronic device. Processor(s) 1910 may be communicatively coupled with a plurality of components within electronic system 1900. To realize this communicative coupling, processor(s) 1910 may communicate with the other illustrated components across a bus 1940. Bus 1940 may be any subsystem adapted to transfer data within electronic system 1900. Bus 1940 may include a plurality of computer buses and additional circuitry to transfer data.

Memory 1920 may be coupled to processor(s) 1910. In some embodiments, memory 1920 may offer both short-term and long-term storage and may be divided into several units. Memory 1920 may be volatile, such as static random access memory (SRAM) and/or dynamic random access memory (DRAM) and/or non-volatile, such as read-only memory (ROM), flash memory, and the like. Furthermore, memory 1920 may include removable storage devices, such as secure digital (SD) cards. Memory 1920 may provide storage of computer-readable instructions, data structures, program modules, and other data for electronic system 1900. In some embodiments, memory 1920 may be distributed into different hardware modules. A set of instructions and/or code might be stored on memory 1920. The instructions might take the form of executable code that may be executable by electronic system 1900, and/or might take the form of source and/or installable code, which, upon compilation and/or installation on electronic system 1900 (e.g., using any of a variety of generally available compilers, installation programs, compression/decompression utilities, etc.), may take the form of executable code.

In some embodiments, memory 1920 may store a plurality of application modules 1922 through 1924, which may include any number of applications. Examples of applications may include gaming applications, conferencing applications, video playback applications, or other suitable applications. The applications may include a depth sensing function or eye tracking function. Application modules 1922-1924 may include particular instructions to be executed by processor(s) 1910. In some embodiments, certain applications or parts of application modules 1922-1924 may be executable by other hardware modules 1980. In certain embodiments, memory 1920 may additionally include secure memory, which may include additional security controls to prevent copying or other unauthorized access to secure information.

In some embodiments, memory 1920 may include an operating system 1925 loaded therein. Operating system 1925 may be operable to initiate the execution of the instructions provided by application modules 1922-1924 and/or manage other hardware modules 1980 as well as interfaces with a wireless communication subsystem 1930 which may include one or more wireless transceivers. Operating system 1925 may be adapted to perform other operations across the components of electronic system 1900 including threading, resource management, data storage control and other similar functionality.

Wireless communication subsystem 1930 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1900 may include one or more antennas 1934 for wireless communication as part of wireless communication subsystem 1930 or as a separate component coupled to any portion of the system. Depending on desired functionality, wireless communication subsystem 1930 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1930 may permit data to be exchanged with a network, other computer systems, and/or any other devices described herein. Wireless communication subsystem 1930 may include a means for transmitting or receiving data, such as identifiers of HMD devices, position data, a geographic map, a heat map, photos, or videos, using antenna(s) 1934 and wireless link(s) 1932. Wireless communication subsystem 1930, processor(s) 1910, and memory 1920 may together comprise at least a part of one or more of a means for performing some functions disclosed herein.

Embodiments of electronic system 1900 may also include one or more sensors 1990. Sensor(s) 1990 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 1990 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 1900 may include a display module 1960. Display module 1960 may be a near-eye display, and may graphically present information, such as images, videos, and various instructions, from electronic system 1900 to a user. Such information may be derived from one or more application modules 1922-1924, virtual reality engine 1926, one or more other hardware modules 1980, a combination thereof, or any other suitable means for resolving graphical content for the user (e.g., by operating system 1925). Display module 1960 may use liquid crystal display (LCD) technology, light-emitting diode (LED) technology (including, for example, OLED, ILED, LED, AMOLED, TOLED, etc.), light emitting polymer display (LPD) technology, or some other display technology.

Electronic system 1900 may include a user input/output module 1970. User input/output module 1970 may allow a user to send action requests to electronic system 1900. An action request may be a request to perform a particular action. For example, an action request may be to start or end an application or to perform a particular action within the application. User input/output module 1970 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1900. In some embodiments, user input/output module 1970 may provide haptic feedback to the user in accordance with instructions received from electronic system 1900. For example, the haptic feedback may be provided when an action request is received or has been performed.

Electronic system 1900 may include a camera 1950 that may be used to take photos or videos of a user, for example, for tracking the user's eye position. Camera 1950 may also be used to take photos or videos of the environment, for example, for VR, AR, or MR applications. Camera 1950 may include, for example, a complementary metal-oxide-semiconductor (CMOS) image sensor with a few millions or tens of millions of pixels. In some implementations, camera 1950 may include two or more cameras that may be used to capture 3-D images.

In some embodiments, electronic system 1900 may include a plurality of other hardware modules 1980. Each of other hardware modules 1980 may be a physical module within electronic system 1900. While each of other hardware modules 1980 may be permanently configured as a structure, some of other hardware modules 1980 may be temporarily configured to perform specific functions or temporarily activated. Examples of other hardware modules 1980 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 1980 may be implemented in software.

In some embodiments, memory 1920 of electronic system 1900 may also store a virtual reality engine 1926. Virtual reality engine 1926 may execute applications within electronic system 1900 and receive position information, acceleration information, velocity information, predicted future positions, or some combination thereof of the HMD device from the various sensors. In some embodiments, the information received by virtual reality engine 1926 may be used for producing a signal (e.g., display instructions) to display module 1960. For example, if the received information indicates that the user has looked to the left, virtual reality engine 1926 may generate content for the HMD device that mirrors the user's movement in a virtual environment. Additionally, virtual reality engine 1926 may perform an action within an application in response to an action request received from user input/output module 1970 and provide feedback to the user. The provided feedback may be visual, audible, or haptic feedback. In some implementations, processor(s) 1910 may include one or more GPUs that may execute virtual reality engine 1926.

In various implementations, the above-described hardware and modules may be implemented on a single device or on multiple devices that can communicate with one another using wired or wireless connections. For example, in some implementations, some components or modules, such as GPUs, virtual reality engine 1926, and applications (e.g., tracking application), may be implemented on a console separate from the head-mounted display device. In some implementations, one console may be connected to or support more than one HMD.

In alternative configurations, different and/or additional components may be included in electronic system 1900. Similarly, functionality of one or more of the components can be distributed among the components in a manner different from the manner described above. For example, in some embodiments, electronic system 1900 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or a combination of A, B, and/or C, such as AB, AC, BC, AA, ABC, AAB, ACC, AABBCCC, or the like.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. An optical device comprising:
a surface-relief grating formed on or in waveguide, the surface-relief grating including a plurality of ridges and a plurality of grooves; and
an overcoat layer filling the plurality of grooves and on top of the surface-relief grating, the overcoat layer comprising:
a first overcoat material layer including a first resin material characterized by a first refractive index equal to or greater than 1.8; and
a second overcoat material layer on the first overcoat material layer and including a second resin material,
wherein a thickness of the overcoat layer on top of and in contact with the plurality of ridges of the surface relief grating is equal to or less than 67.45 nm.

2. The optical device of claim 1, wherein the thickness of the overcoat layer on top of the plurality of ridges is equal to or less than 50 nm.

3. The optical device of claim 1, wherein:
the second resin material includes an acrylate resin or an epoxy resin; and
a second refractive index of the second resin material is greater than 1.5.

4. The optical device of claim 1, wherein the first resin material includes:
a resin comprising acrylate or epoxy and characterized by a third refractive index greater than 1.6; and
nanoparticles crosslinked with or dispersed in the resin, the nanoparticles including titanium oxide, zirconium oxide, hafnium oxide, tungsten oxide, zinc tellurium, gallium phosphide, a derivative thereof, or a combination thereof.

5. The optical device of claim 4, wherein the nanoparticles are characterized by:
a linear dimension greater than 10 nm; and
a fourth refractive index greater than the third refractive index of the resin.

6. The optical device of claim 1, wherein a depth of the plurality of grooves is greater than 200 nm.

7. The optical device of claim 1, wherein the plurality of grooves is characterized by a non-uniform depth, a non-uniform pitch, a non-uniform width, a non-uniform slant angle, or a combination thereof.

8. The optical device of claim 1, wherein a surface peak-to-valley height of a top surface of the second overcoat material layer is equal to or less than 5 nm.

* * * * *